United States Patent [19]
Aruga et al.

[11] Patent Number: 5,558,927
[45] Date of Patent: Sep. 24, 1996

[54] COLOR FILTER FOR LIQUID CRYSTAL DISPLAYS AND FILM-FORMING APPARATUS

[75] Inventors: Hisashi Aruga, Suwa; Keiji Takizawa, Nagano-ken; Ryuji Sawata, Nagano-ken; Takashi Kobayashi, Nagano-ken, all of Japan

[73] Assignee: Seiko Epson Corporation, Tokyo, Japan

[21] Appl. No.: 244,033

[22] PCT Filed: Sep. 17, 1993

[86] PCT No.: PCT/JP93/01337

§ 371 Date: Jun. 30, 1994

§ 102(e) Date: Jun. 30, 1994

[87] PCT Pub. No.: WO94/07158

PCT Pub. Date: Mar. 3, 1994

[30] Foreign Application Priority Data

| Sep. 17, 1992 | [JP] | Japan | 4-248177 |
| Dec. 2, 1992 | [JP] | Japan | 4-323381 |
| Feb. 19, 1993 | [JP] | Japan | 5-30608 |
| May 6, 1993 | [JP] | Japan | 5-105576 |

[51] Int. Cl.⁶ .................................................. B32B 09/00
[52] U.S. Cl. .............................. 428/195; 428/1; 428/207; 428/323; 430/7; 359/891; 359/589
[58] Field of Search .......................... 348/79; 204/181.1, 204/181.6; 428/201, 207, 209, 210, 323, 336, 432, 433, 434, 469, 470, 697, 699, 701, 702, 913, 1; 430/7; 359/360, 580, 359, 581, 582, 585, 589, 885, 891

[56] References Cited

U.S. PATENT DOCUMENTS

| 5,204,739 | 4/1993 | Domenicali | 348/79 |
| 5,242,558 | 9/1993 | Matsushima | 204/181.1 |
| 5,395,678 | 3/1995 | Matsushima | 428/201 |

FOREIGN PATENT DOCUMENTS

| 58-122505 | 7/1983 | Japan . |
| 61-002131 | 5/1986 | Japan . |
| 62-83572 | 5/1987 | Japan . |
| 63-60426 | 3/1988 | Japan . |
| 63-119876 | 5/1988 | Japan . |
| 64-36072 | 3/1989 | Japan . |
| 1-293306 | 11/1989 | Japan . |
| 2-804 | 1/1990 | Japan . |
| 2-24603 | 1/1990 | Japan . |
| 2-166404 | 6/1990 | Japan . |
| 2-211402 | 8/1990 | Japan . |
| 4-413 | 1/1992 | Japan . |
| 4-401 | 1/1992 | Japan . |
| 4-37804 | 2/1992 | Japan . |
| 4-110058 | 4/1992 | Japan . |
| 4-190362 | 7/1992 | Japan . |
| 4-194943 | 7/1992 | Japan . |
| 5-31423 | 2/1993 | Japan . |

*Primary Examiner*—Patrick Ryan
*Assistant Examiner*—Patrick Jewik
*Attorney, Agent, or Firm*—Oliff & Berridge

[57] ABSTRACT

A color filter for a liquid crystal display which comprises an optically transparent supporting member (100), a transparent conductive layer (500) formed upon said supporting member (100), and a color layer (200) in which are disposed in specified patterns red, blue and green picture elements formed upon said transparent conductive layer (500), wherein the color layer (200) employs pigments as coloring agents which form said picture elements, the relative dielectric constant of the color layer (200) is at least 2.0 under measurement conditions of the application thereto of an alternating current of 5 V and a frequency of 1 kHz to 100 kHz, and moreover, the red, blue and green picture elements of which the color layer is composed have relative dielectric constant of within a range of ±25% of the mean value for the relative dielectric constant of said color layer. The color layer (200) is 0.4 μm to 1.0 μm thick. The electro-optical properties of the picture elements of the color filter are almost identical, and the color filter in spite of adopting electrode lower-mounted structure (COI structure) enables the provision of a liquid crystal display which can provide sufficient effective voltage and good color adjustment.

22 Claims, 43 Drawing Sheets

COLOR FILTER FOR LIQUID CRYSTAL DISPLAYS AND FILM-FORMING APPARATUS

Field of Technology

This invention relates to colour filters employed in colour liquid crystal display apparatuses and to a film-forming apparatus suitable for the manufacture of such colour filters.

Background Art

A known method of colouring liquid crystal display devices is the employment of a display in which a colour filter layer (colour layer) is disposed within a cell which has a pair of transparent electrodes disposed in parallel. The known general compositions of colour filters are of the types illustrated in FIG. 4 and FIG. 5, for example.

The colour filter illustrated in FIG. 4 includes a colour layer 200 upon a supporting member 100 which is composed of a transparent ass substrate, a film or the like. The colour layer 200 consists of picture elements of three colours, red (R), green (G), and blue (B), 200a, 200b, and 200c, which form a specified pattern (such as mosaic type, triangular type, striped type, etc.) that corresponds to the area of the driven picture elements. A black matrix layer 300 is formed between the picture elements 200a, 200b, and 200c. Moreover, a protective layer 400 consisting of transparent resin or the like is formed upon the colour layer 200, while a transparent conductive layer 500 consisting of for example indium tin oxide(ITO) is formed upon the protective layer 400. Colour filters formed in such manner are commonly combined with substrates possessing thin film transistor(TFT) elements in order to form liquid crystal displays for colour displays.

FIG. 5 illustrates the structure of a colour filter that is employed in a liquid crystal display apparatus that employs the super-twisted nematic (STN) mode or alternatively the driver mode with metal-insulator-metal (MIM) elements. Such colour filter has a similar structure to the aforementioned colour filter, in a structure of a supporting member 100, a colour layer 200, a black matrix layer 300, and a protective layer 400. The transparent conductive layer (ITO layer) 500 possesses a pattern which corresponds to the picture elements 200a, 200b, and 200c which form the colour layer 200.

As the embodiments of colour filters described in the foregoing are formed of transparent conductive layers 500 upon colour layers 200, such embodiments are known as upper-ITO mode or alternatively ITO on Colour Filter (IOC) mode.

It is rather difficult to manufacture at low cost large-sized colour filters that employ such IOC mode, and more particularly the type of colour filter illustrated in FIG. 5, and which exceed 10 inches diagonally. This is because of problems with the formation of the patterns in the ITO layer which is formed upon the uppermost layer.

The ITO layer is normally etched with a composition consisting of a mixture of hydrochloric acid, nitric acid, and pure water at a composition temperature of approximately from 40° C. to 60° C., whereupon resist stripping is performed at a composition temperature of approximately from 40° C. to 60° C. by employing a stripping agent consisting of potassium hydroxide, an organic alkaline composition or the like in order to perform patterning. For this purpose, the protective layer 400 that is formed upon the colour layer 200 must have sufficient resistance to acidity and resistance to alkalinity. Moreover, the material of which the aforementioned protective layer 400 is formed must have a transmittance of at least 95% at all wavelengths and must be resistant to heat of at least 230° C. The protective layer 400 is required to have high resistance to heat because the resistivity of the ITO layer 500 must be decreased as the display is made larger, such that a high temperature of at least approximately 230° C. is required in order to form the film for the ITO layer. Thus the material that is employed in order to form the protective layer 400 is required to have excellent resistance to acidity, resistance to alkalinity, transparency, and resistance to heat, such that the selection of organic materials which meet such requirements is restricted.

Furthermore, IOC type colour filters are formed by the formation of an inorganic ITO layer 500 upon the protective layer 400 which is formed of organic polymers, and hence there is a high probability of the occurrence of electrical disconnection from the ITO layer caused by the discrepancies in the coefficients of linear thermal expansion between the two layers, to cause the problem of reduced yields.

In order to resolve such problems of IOC type colour filters, the lower-ITO or colour filter on ITO (COI) mode has been developed wherein an ITO layer is formed upon the surface of the supporting member, and furthermore a colour layer is formed upon the ITO layer. With such COI colour filters there is no need for action to overcome the problem of patterning of the ITO layer as in the method of manufacture of IOC colour filters as described in the foregoing, and hence the range of materials from which the protective material may be selected is expanded, and moreover such mode has the advantage that it permits the prevention of the occurrence of electrical disconnection of the ITO layer caused by the discrepancies in the coefficients of linear thermal expansion between the ITO layer and the protective layer.

However, a problem of the COI colour filter is that the colour layer acts as an insulating film. Thus the electrical capacitance of the colour layers that form the colour filter is of significant magnitude in comparison with the electrical capacitance of the liquid crystal layer, such that the voltage between the electrodes is divided between the liquid crystal layer and the colour layer. As a result of this, sufficient effective voltage is not applied to the liquid crystal layer to cause decrease in contrast, increase in the threshold voltage of the device, or loss of sharpness in rising edge of the transmittance-voltage characteristic curve.

The following is a description of the background to the film-forming apparatus for the formation of colour layers in colour filters.

In the manufacturing process for colour filters for liquid crystal displays, and in the process for forming the photoresist layer on semi-conductors, a uniform thin coated layer is produced; spin coating is a typical example of the methods employed to form such film. In the spin coating method, the coating composition is dripped into the center of the rotating member to be coated and the coating composition is applied to the entire surface by centrifugal force, while the excess coating composition is removed and a uniform coated layer is formed. However when such method is employed, as centrifugal force is applied to the coating composition, discoid objects may be coated, but if rectangular objects are to be coated, the thickness of the film cannot be controlled at the corners of such rectangular objects, and hence it is impossible to utilize the whole material of which surface to be coated. Moreover such method is unsuited to inline processing.

For this reason, the transfer film forming process which is commonly used with sheen form members to be coated has been considered. The roll coater method is a typical example of a transfer film-forming process, and when this method is applied to the manufacturing process for colour filters, as illustrated in FIG. 52, the resist 202 which is contained in the resist storage tank 201 is carried upwards by the fountain roller 203, whereupon the resist 202 is passed through the relay roller 204 and transported to the coating roller 205 Next the surface to be coated of the glass substrate 206 is transported under a specified pressure to the roller surface of the coating roller 205 and the resist is transferred to the surface to be coated of the glass substrate 206 by the pressure applied thereto in such a manner as to coat the surface of the glass substrate 206 with a resist film 202a. Thus the coating may be formed upon the entire surface of the rectangular glass substrate 206, and moreover such process may be performed continuously.

However, when the roll coater method is employed, the thickness of the resist film 202a is affected by many factors such as the pressure that is applied to the glass substrate 206, the speed with which the glass substrate 206 is transported, and the speed with which the coating roller 205 is rotated, and moreover such factors are difficult to control. When pressure is applied to the glass substrate 206 to the direction of the roller surface 205a of the coating roller 205, the resist adheres to the surface of the glass substrate 206 in response to such pressure and is then sheared through the separation of the roll surface 205a and the glass substrate 206. The position at which such shearing occurs is reflected in the thickness of the film, while such position is determined by the balance among the adhesive strength of the resist to the roll surface 205a, the surface tension of the resist, and the adhesive strength of the resist to the glass substrate 206. Of such factors, the adhesive strength of the resist to the roll surface 205a is particularly subject to variation over area and time caused by the pressure that is applied to the glass substrate 206 and by the surface conditions of the roll surface 205a. Thus the thickness of the film is highly subject to variation which renders such film unsuitable for the manufacture of colour filters, semi-conductor apparatus, or the like.

The first objective of the present invention is to provide colour filters having high capacitance colour layers which are capable of supplying an effective voltage sufficient to provide high contrast while providing sufficiently thin films for COI mode colour filters.

The second objective of the present invention is to provide an appropriate film-forming apparatus for the formation of the colour layers of the aforementioned colour filters, which is able to form thin films of uniform thickness without being subject to those unstable factors which affect the film thickness of coated layers.

DISCLOSURE OF THE INVENTION

Colour filter

The colour filter for liquid crystal displays provided by the present invention includes an optically transparent supporting member, and a transparent electrically conductive layer that is formed upon the supporting member, and a colour layer having red, green and blue picture elements (pixels) disposed in given patterns upon the transparent electrically conductive layer. Pigments are employed as the colouring agents in order to form the picture elements of the colour layer. Such colour layer has a relative dielectric constant of at least 2.0 under measurement conditions of 5 V A.C., 1 kHz to 100 kHz being applied to it. Moreover, each of the red, green and blue picture elements provides a relative dielectric constant of ±25% of the mean value for the relative dielectric constant under the aforementioned measurement conditions.

Colour layers

The inventors have confirmed that liquid crystal display apparatuses which employ COI colour filters provide satisfactory white balance in the colour filters, but nevertheless the colour adjustment for displays which employ such colour filters is not satisfactory. Upon investigation of the causes of this, the inventors concluded that, in order to obtain good colour characteristics in displays which employ COI colour filters, it is not sufficient simply to adjust the white balance of the colour filter, but that the capacitance of the red (R), green (G) and blue (B) picture elements must be adjusted also. Moreover the inventors concluded that when pigments are employed as the colouring agents, the type of pigment selected greatly influences the relative dielectric constant of the colour layer. For this reason, the present invention is characterised by the selection of relative dielectric constant of pigments within specified ranges in order to adjust the capacitances of the R, G and B picture elements, so that the relative dielectric constant of the colour layer which include the pigments are equal.

The appropriate relative dielectric constant will be described in more detail subsequently on the basis of data to be presented, but when a 5 V, 1 kHz to 100 kHz alternating current is applied, the dielectric constant of the colour layer should be at least 2.0, and moreover the R, G and B colour picture elements which form the colour layer must have relative dielectric constant of within a range of ±25% of the aforementioned mean value for relative dielectric constant. Moreover, the relative dielectric constant of the R, G and B colour picture elements should preferably be as similar as possible, and each of the picture elements should preferably have relative dielectric constant of within a range of ±20% of the aforementioned mean value for relative dielectric constant. By making the relative dielectric constant of each of the picture elements similar, the thicknesses of each of the picture element films are also made uniform. Differences in height between the picture elements of the colour layer cause such problems as incorrect alignments in an alignment layer formed thereon and incorrect cell gaps. Moreover, when the relative dielectric constant of the colour layer is specified at specific frequencies, when a voltage of 5 V and a frequency of 1 kHz is applied, the relative dielectric constant of each of the R, G, and B picture elements should preferably be within the range of 3.5±0.5, and moreover at a voltage of 5 V and at a frequency of 100 kHz the relative dielectric constant of each of the R, G, and B picture elements should preferably be within the range of 3.0±0.5.

Moreover it is of great importance that the film that forms the aforementioned colour layer in the colour filter for liquid crystal displays in the present invention be very thin, having a thickness of from 0.4 μm to 1.0 μm, and preferably a thickness of from 0.6 μm to 0.9 μm.

By the formation of a very thin film colour layer having a thickness of 1 μm or less, the capacity division of the colour layer which functions as an insulating film is minimized such as to permit a sufficient effective voltage to be applied to the liquid crystal layer. In this manner it is possible to provide a high capacitance thin film colour filter with which it is possible to achieve a contrast of at least 50:1 in TFT and MIM driven liquid crystal apparatuses, and it is possible to achieve a contrast of at least 20:1 in STN type liquid crystal apparatuses.

Moreover, the difference in the thickness of the R, G, and B colour cells should preferably be as small as possible as described in the foregoing, and for example should preferably be not more than approximately 0.25 μm.

The colour filters for liquid crystal displays of the present invention should preferably contain from 40 percent by weight to 50 percent by weight of pigment in the colour layers. The colour filters for liquid crystal displays of the present invention are formed of very thin films having thicknesses of from 0.4 μm to 1.0 μm as described in the foregoing. In order to achieve satisfactory colouration characteristics in such a thin colour layer, the colour layer must contain a rather higher than normal proportion of pigment. Thus colour layers containing pigment of the prior art normally contain from 20 percent by weight to 30 percent by weight of pigment and such colour layer films are approximately from 1.7 μm to 2.0 μm in thickness, whereas the colour layer films of the present invention are less than 1.0 μm in thickness and the levels of pigment are quite high, being from 40 percent by weight to 50 percent by weight which is approximately double the levels used in the prior art.

Pigments are employed as the colouring agent in the present invention because they provide improved resistance to light, and more especially to ultraviolet light, and because they provide improved resistance to heat. If dyestuffs are employed as the colouring agent, dyestuffs are relatively more chemically active than pigments and hence are degraded by ultraviolet light and the like, and therefore do not possess adequate resistance to light and resistance to heat.

Pigments

The following is a description of the pigments that are employed in the present invention. It is a characteristic of the present invention that the relative dielectric constant of the R, G and B picture elements of the colour layer of the present invention should be uniform, but this is not readily achieved. It is know that the relative dielectric constant of the picture element is more greatly influenced by the relative dielectric constant of the pigment itself than by the relative dielectric constant of the components such as the polymers, copolymers, crosslinking agents, crosslinking initiators contained together with the pigment. However, in practice it is very difficult to select pigments having completely identical relative dielectric constant because the R, G and B pigments have different chemical compositions and different electrical properties. This is because there are at present relatively few types of pigment that are employed in such colour filters. A further factor which restricts the selection of pigments is the problem of the depolarising effect possessed by pigments. The depolarizing effect is : as pigments consist of relatively larger molecules than dyestuffs, light projected onto pigment molecules is polarised by the elliptical polarisation effect, and when the colour filter is inserted between two polarising plates, from several percent to several tens of percent of the projected light vanishes in the colour layer. The extent of such depolarisation effect varies from pigment to pigment, but in practice there are very few pigments with low levels of the depolarisation effect.

For the purposes of the present invention, many pigments were examined for their relative dielectric constant and for their depolarisation effects, and the plurality of pigments described in the following were successfully selected.

The most difficult of the pigments to select was the green pigment. The green pigments have higher relative dielectric constant than the red pigments or the blue pigments such that the selection of the green pigments presented great difficulty.

The green pigments are described first.

The preferred green pigment is a partially brominated phthalocyanine green which is prepared by the introduction of from one to thirteen bromine atoms into a copper phthalocyanine. Moreover the aforementioned partially brominated phthalocyanine green may preferably be a brominated chlorinated phthalocyanine green into which chlorine atoms have been introduced in addition to the bromine atoms. The brominated chlorinated phthalocyanine green 6Y (C.I. Pigment Green 36) described by the following formula (I) is the most preferable embodiment of such brominated chlorinated phthalocyanine green:

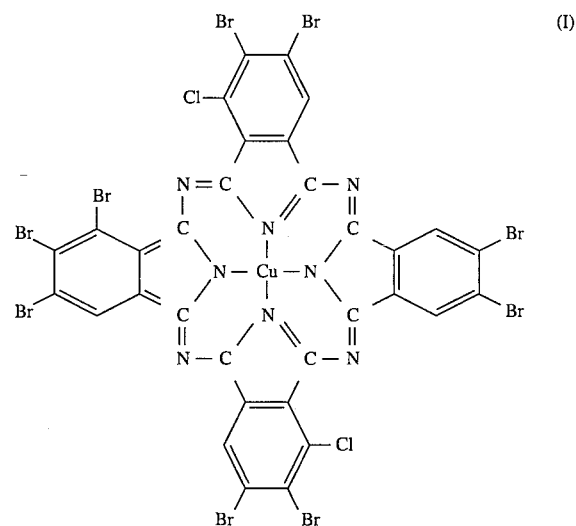

The phthalocyanine green (C.I. Pigment Green 7, C.I. 74260) described by the following formula (II) which consists of a copper phthalocyanine into which 15 chlorine atoms have been introduced is also a preferred embodiment in addition to the aforementioned partially brominated phthalocyanine green.

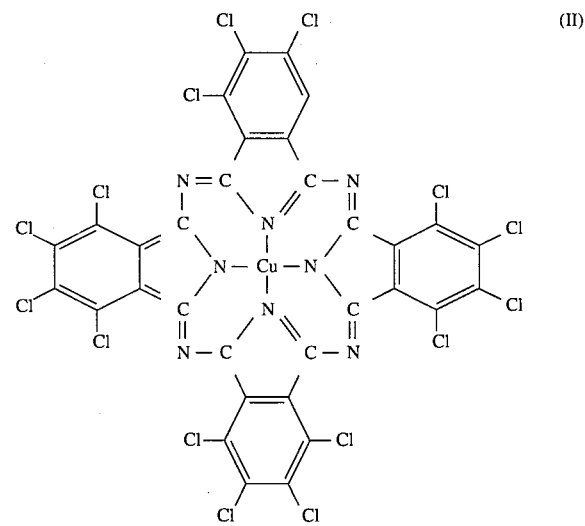

Such pigments are characterised by the provision of green colours with good transparency. However, chlorinated phthalocyanine greens are known to have greater dielectric constants than the relative dielectric constant of the red and blue pigments. In general, anthraquinone type pigments are used for the red pigment, and phthalocyanine blue the pigments are used for the blue pigments. Small amounts of yellow pigment are often added to the red pigment and small amounts of violet pigment are often added to the blue pigment, but the amounts so added are small, and the effects of the addition of such pigments on the relative dielectric constant of the pigment as a whole are small. It has been confirmed experimentally that when such red or blue pigments are employed and when a 5 V AC, 1-kHz current is applied, the relative dielectric constant of such pigments are approximately between 3 and 4, while the relative dielectric constant of the aforementioned chlorinated phthalocyanine green is approximately double that of such pigments, being between 6 and 8. Consequently, when the aforementioned phthalocyanine green is employed as a green pigment, the capacitance of each of the picture elements can only be made uniform if a green colour film approximately twice as thick as the films of the red or blue colour layer is formed.

On the other hand, if the aforementioned brominated chlorinated phthalocyanine green 6Y (C.I. Pigment Green 36) is employed, it has been confirmed that the relative dielectric constant of such film is approximately within the range of from 3.0 to 4.0 at a frequency of around 1 kHz. Consequently, the use of such partially brominated phthalocyanine preen 6Y makes possible uniform relative dielectric constant for the red, blue and green picture elements which form the colour layer Even though the partially brominated phthalocyanine green 6Y has a low relative dielectric constant, it has slightly reduced transmittance. And hence a mixture of the partially brominated phthalocyanine green 6Y with chlorinated phthalocyanine green (C.I. Pigment Green 7), which has a high transparency, is preferred. When both partially brominated phthalocyanine green 6Y and chlorinated phthalocyanine green (C.I. Pigment Green 7) are mixed together, the relative dielectric constant can be reduced to within the range envisaged by the present invention without compromising on the transparency of the picture elements. Such chlorinated phthalocyanine green should preferably be mixed together with the partially brominated phthalocyanine green 6Y in a ratio of from 1:1 to 1:2.

Moreover a yellow pigment having a low relative dielectric constant may be mixed with the chlorinated phthalocyanine green (Pigment Green 7 C.I. 4260) in place of the partially brominated phthalocyanine green to form the green pigment. In such case, the yellow pigment selected should have a relative dielectric constant of from 2.0 to 3.0 under for example 5 V and 1 kHz. When the yellow pigment is mixed with the chlorinated phthalocyanine green, the ratio of blending should preferably be adjusted to within a CIE standard chrorimetric system of $0.31 \leq x$ and $y \geq 40$ when preparing a film of from 0.8 μm to 1.0 μm thick, in order to adjust the relative dielectric constant of the green picture elements to between 3.0 and 4.0. Yellow pigments generally have a high depolarisation effect such that large amounts of yellow pigments should preferably not be added. Hence disazo yellow HR (Pigment Yellow 83 C.I. 21108) which has a low depolarisation effect should preferably be employed as the yellow pigment.

The following is a description of exemplifications of the red and blue pigments.

It is necessary to employ red and blue pigments that have low depolarisation effects. There are few such pigments, however such red pigments include for example PV Red HF 2B (Pigment Red 208, C.I. 12514) and disazo yellow HR (Pigment Yellow 83, C.I. 21108), and such pigments should preferably be mixed together. Blue pigments include for example phthalocyanine blue R (Pigment Blue 15:1 and 15:2, C.I. 74160 and C.I. 74250) or alternatively phthalocyanine blue G (Pigment Blue 15:3 and 15:4, C.I. 74160), and dioxazine violet (Pigment Violet 23 C.I. 51319), and such pigments should preferably be mixed together. Moreover, for blue pigments, one or a plurality selected from phthalocyanine blue R and phthalocyanine blue G should preferably be mixed together with dioxazine violet.

The pigments described in the foregoing may preferably be employed as the pigments for the present invention for reasons of their relative dielectric constant and for their depolarisation effects.

Black matrix layer

The following is a description of the black matrix layer that is formed between the red, green and blue picture elements.

In COI colour filters, a black matrix layer is formed between the transparent conductive layer and the liquid crystal layer, and such black matrix layer functions as an insulating layer in the same manner as the aforementioned colour layer and is one of the factors that determine the contrast of the liquid crystal display. For this reason it is important to regulate the relative dielectric constant, the resistivity, and the thickness of the film in order to control the drop in the effective voltage in the same manner as for the aforementioned colour layer.

First, the resistivity is examined. The black matrix layer must have a certain degree of conductivity in order to reduce the voltage drop in the black matrix layer and in order to improve the relay characteristics for the voltage to the liquid crystal layer, such that it is necessary to specify an upper limit for resistivity. However, if the resistivity of the black matrix layer is too low, two problems arise, namely, first, short circuit problems arise between adjoining transparent electrodes in the colour filter which forms the patterns for the transparent conductive layer, and secondly, short circuit problems may arise between the opposing electrodes which enclose the liquid crystal layer. More particularly, if the thickness of the black matrix layer film is relatively greater than the thickness of the colour layer film, the gap between the black matrix layer and the wiring electrodes in the opposed element substrate may be narrowed which may readily lead to short circuit problems. For this reason it is necessary to specify a lower limit for the resistivity of the black matrix layer. The research performed by the inventors of the present invention has shown that the optimum range for the resistivity of the black matrix Layer is from $1.0 \times 10^2$ Ω·m to $1.2 \times 10^6$ Ω·m under an alternating current of 5 V and with a frequency of between 100 Hz and 100 kHz.

In order to obtain a resistivity within the range specified in the foregoing, the conductivity of the black matrix layer must be controlled by the addition of carbon as well as such colored pigments as the red, green, blue which form the black pigment. For this purpose, from 10 percent by weight to 20 percent by weight to the total solids component of the pigment resist should be added in carbon.

Carbon has been added as a black pigment to the black matrix Layer in the prior art, but such carbon has been added to the black matrix layer essentially in order to improve the shading property of the black matrix layer. Normally, 30 percent by weight of the material of the black matrix layer in terms of carbon has been added in order to achieve such objective. In practice, if any greater amount of carbon is added, pattern film residue is caused at development, and problems are caused with the adhesion of the black matrix Layer to the supporting member. Therefore, carbon is added as much amount as possible in order to improve shading properly without causing problems in patterning to form black matrix resist in general use these days. However the addition of carbon as in the prior art is not intended to improve the electrical properties, and more particularly the electrical conductivity of the black matrix layer, as is envisaged by the present invention.

The electrical conductivity of the black matrix layer is greatly influenced by the amount of carbon that is added, but it has also been confirmed that the firing temperature also affects the electrical conductivity of the black matrix layer. For this reason, the material that forms the black matrix layer should be fired at a temperature of from 180° C. to 250° C.

The relative dielectric constant of the black matrix layer should preferably be at least 3.0, for the same reasons as stated in the foregoing for the colour layer, namely in order to prevent capacity division due to the black matrix layer. Moreover, the thickness of the black matrix layer should preferably differ by not more than 0.5 μm from the thickness of the films of the red, green and blue picture elements of the colour layer.

By the specification in this manner of the range of relative dielectric constant of the colour layer and the range of relative dielectric constant of the black matrix layer, it is possible to achieve a liquid crystal display in which decline of effective voltage is restrained, and which provides good write characteristics with adequate contrast.

The following is a description of the colour filter which is characterised by the form of the black matrix layer.

In a COI colour filter wherein a colour layer is formed upon a transparent conductive layer, as distinct from an IOC colour filter wherein a transparent conductive layer is formed upon a colour layer, no resin layer referred to as a protective layer or a leveling layer is formed in order to prevent an interposition of an insulating layer between the liquid crystal layer and the transparent conductive layer as far as possible. For this reason, the colour layer is either disposed in direct contact wish the alignment layer, or a thin film of several hundred Angstrom in thickness is formed between the alignment layer and the colour layer in order to improve the film-forming properties of the alignment layer. As a result, the irregularities of the surfaces of the colour layer and the black matrix layer opposite to the liquid crystal layer are allowed to remain in COI colour filters. The presence of such irregularities prevents the rubbing medium from reaching at spots where height changes in the irregular regions thereby prohibiting good alignment treatment, while foreign matter and dirt generated by such rubbing accumulates at the spots where height changes in the irregular regions such as to degrade the alignment, while such differing heights of the irregularities prevent uniform alignment, and so forth.

More particularly, when the resist that contains high concentrations of pigment as described in the present invention is exposed to light, photoreactions occur in a layer to be exposed to light preferentially at the side closest to the photomask as illustrated in FIG. 15A (upper portion of the layer exposed to light), and such portion is sufficiently exposed to the light, but the side more distant from the photomask in the layer to be exposed to light (lower portion of the layer exposed to light) is reached by light to much less extent, such that the hardening reaction of the resist in the direction of the thickness of the layer exposed to light becomes uneven. As a consequence of this, what is known as the reverse taper phenomenon occurs, wherein the lower portion of layer exposed to light is excessively removed with reference to the upper portion when the layer is developed. This phenomenon is particularly prominent when black-coloured resist is employed in the formation of the black matrix layer. As a result of this, the problems of poor alignment described in the foregoing are exacerbated. For example, as illustrated in FIG. 15B, when rubbing treatment is applied in the direction of the arrow X, incorrect alignment is caused in the area A indicated by hatching in the picture elements 200a, 200b and 200c.

Variations in the voltage that is applied to the liquid crystals in a location at which incorrect alignment has occurred result in the molecules of liquid crystal that are arrayed at such parts in which incorrect alignment has occurred to exhibit different behaviour from that of those molecules of liquid crystals that are arrayed at such parts with correct alignments, such that the quality of the display is degraded. Thus when voltage is applied in normally white mode and when voltage is not applied in normally black mode, the light passes through the panel only at those locations at which incorrect alignment has occurred, which leads to a decrease in contrast. Moreover, for the long run, the molecules of liquid crystals which are correctly aligned by the rubbing treatment may be influenced gradually by the molecules of liquid crystals in the locations at which poor alignment has occurred, such that the contrast is gradually decreased to degrade the long term reliability of the panel.

In order to overcome such problems, in the colour filter for liquid crystal displays of the present invention, the incorrect alignments caused by the irregularities that are formed in the colour layer and in the black matrix layer are suppressed by causing the side surfaces which form the black matrix layer (projecting layer) which projects above the colour layer to slant inwards such as to present a tapered appearance. The tapered surfaces which form the side surfaces should preferably be formed at an angle of between 30° and 89°, and more preferably such as to form an angle of between 45° and 70°, with reference to the supporting member. Such tapering of the projecting layer of the black matrix layer may be formed by for example exposure to light with the setting of a light exposure gap of from 200 μm to several millimeters between the layer that is exposed to the light and the photomask.

By means of the formation of tapered surfaces in the projecting layers of the black matrix layer, incorrect alignment of the portions exhibiting differing heights in alignment treatment can be largely suppressed.

Film-forming Apparatus

The following is a description of the film-forming apparatus of the present invention.

The tensile film-forming apparatus envisaged by the present invention is characterised by a transport means which transports in a horizontal direction the member to be coated, and a coating composition supply means which supplies fixed quantities of the coating composition laterally across the transport path and which is disposed below the transport path of the member to be coated, and a separation interval adjustment and maintenance means which adjusts and maintains the separation distance between the coating supply means and a surface of the member to be coated at such an extent as to enable the formation of a layer consisting of a pool of coating composition in the separation, and wherein the coating supply means includes a coating composition supply roller whose roller surface is rotated while passing through the coating composition to raise the coating composition, a coating composition supply regulation means which is disposed adjacent to the coating composition raising side of said coating composition supply roller and which removes from the surface of said coating composition supply roller an amount of coating composition which corresponds to the separation distance between said coating composition supply roller and said coating composition regulation means to regulate the amount of coating composition that is supplied upwards, and a coating composition removal means which is disposed in opposition to the coating composition raising side of said coating composition supply roller, and which removes coating composition from the roller surface of said coating composition supply roller, wherein, while said member to be coated is being transported, said layer consisting of a pool of coating composition is maintained by said separation distance adjustment and maintenance means, and wherein the coating upon the surface of said member to be coated is developed.

Such apparatus is an improvement of the film-forming apparatus which was disclosed in Japanese Patent Application Number 3-192092 (Japanese Patent Application Laid-Open Number 5-31423, laid-open date 9th February 1993). The basic constitution of the apparatus of the present invention is described in the following.

The apparatus illustrated in for example FIG. 16 and FIG. 17 may be employed as such film-forming apparatus. First, a transport means 6 which transports a member to be coated 2 with its surface to be coated 2a facing downwards, a coating composition supply means 4 which is disposed below a transport path 1b for the member to be coated 2 and which supplies a measured amount of coating composition 3 in a lateral direction across the transport path 1b, and an separation distance adjustment and maintenance means which adjusts and maintains a distance $d_1$ such as to enable the formation of a layer consisting of a pool of coating composition 3a between the coating composition supply means 4 and the surface to be coated 2a are provided. Furthermore, a preliminary coating layer formation means form the preliminary coating layer 5a, by making the entire area of a leading side 2b to come into contact with the coating composition 3, when the leading side 2b of the surface to be coated 2a is disposed at the top of the coating composition supply means 4. For example while the specified separation distance $d_1$ between the leading side 2b of the surface to be coated 2a and the coating composition supply means 4 is maintained, the layer consisting of a pool of coating composition is formed there, and the member to be coated 2 is temporarily stopped in this state, while the transport means 6 is temporarily stopped in such a manner that the layer consisting of the pool of coating composition is extended by surface tension between the leading side 2b of the surface to be coated 2a and the coating composition supply means 4. After that, the transport means 6 resumes transporting the member to be coated 2 with the layer consisting of the pool of coating composition 3a, and the primary coating layer 5a is extended to become a coating layer 5b.

An apparatus which comprises a coating composition supply roller whose roller surface rotates while passing through the coating composition and thereby raises the coating composition, and a coating composition supply regulation means which is disposed adjacent to the coating composition raising side of the coating composition supply roller, and which removes from the surface of the coating composition supply roller an amount of the coating composition which corresponds to the separation distance between the coating composition supply regulation means and the coating composition supply roller to regulate the amount of coating composition that is supplied upwards can be employed as the coating composition supply means. Moreover the coating composition supply regulation means may consist of for example a doctor roller which rotates in the same direction as the coating composition supply roller and which is disposed adjacent to the coating composition raising side of the coating composition supply roller, and a doctor blade which is disposed adjacent to the doctor roller and which removes the coating composition from the surface of the roller. In such case, the amount of coating composition supplied may be regulated by the rotation speed of the doctor roller as well as by the separation distance. No restrictions are applied to the number of the doctor rollers and doctor blades which may be disposed, and combinations of pluralities of doctor rollers including transmission rollers and doctor blades can be also employed.

Moreover, a coating composition removal means is disposed opposite to the coating composition raising side of the coating composition supply roller in order to remove the coating composition from the surface of the coating composition supply roller. The coating composition removal means may be formed of a blade or rotatable roller which is capable of removing the coating composition from the roller surface.

The film-forming apparatus of the present invention differs from the film-forming apparatus disclosed in Patent Application No. 3-192092 in possessing the coating composition removal means. The provision of the coating composition removal means enables the more complete control of the layer of resist that is formed upon the surface of the roller of the coating composition supply roller, and more particularly can be appropriately employed in order to form a thin coating film of not more than 1 μm.

In the film-forming apparatus disclosed in Japanese Patent Application No. 3-192092, as shown in FIG. 34, there is a problem of differing thicknesses of the film which is formed upon the glass substrate 21 when the coating member 51 developed the resist upon the glass substrate 21, or when it did not develop the resist upon the glass substrate 21. More particularly, once the advancing glass substrate 21 has come into contact with the resist on the composition supply roller 52, the thickness of the coating formed by the one cycle of the composition supply roller 52 upon the glass substrate is different from the thickness of the coating formed by the subsequent cycle of the composition supply roller 52 upon the glass substrate. That is, the states of the roller surface 52a2 of the composition supply roller 52 immediately before it advances into the composition supply tank 91 are different when the resist has been developed upon the glass substrate 21 and when the resist has not been developed upon the glass substrate 21, and such difference has an affect upon the films of resist that are formed subsequently. Such differences in the thickness of the film are more prominent when a thin film is formed. The factors causing such differences in the thickness of the film are believed to be the fact that when the resist which is developed upon the roller surfaces 52a1 of the composition supply roller 52 is not developed upon the glass substrate 21 (indicated by the dotted line in FIG. 84), and by a film of resist which has a greater viscosity than the resist in the composition supply tank 91 remains on the roller surface 52a2.

The film-forming apparatus of the present invention provides a composition removal means which faces the roller surface 52a2 opposite to the roller surface 52a1 to which the coating composition is adhered, whereby the surface of the composition supply roller 52 which advances into the composition supply tank 91 may be maintained always in a uniform state, such as to prevent the occurrence of the aforementioned unevenness in the coated film.

BEST MODE FOR CARRYING OUT THE INVENTION

First Embodiment

Figure 1:
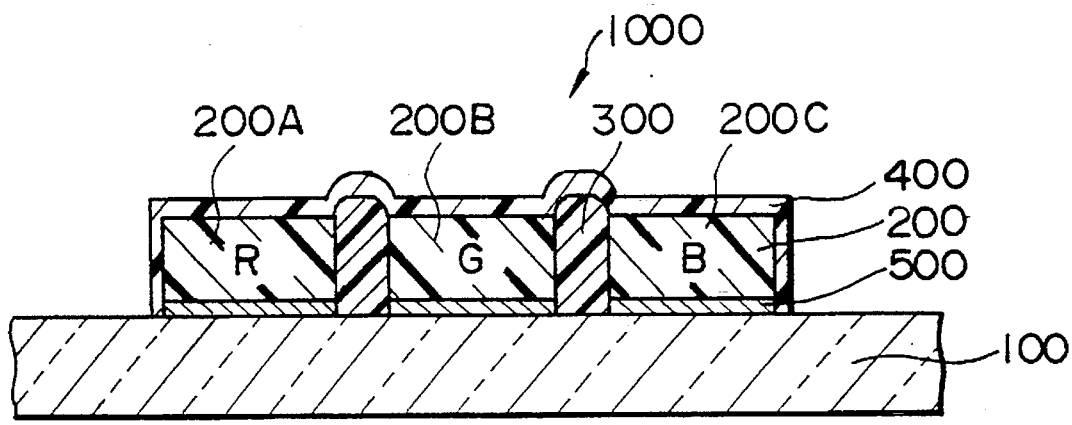
FIG. 1 is a cross-sectional view which illustrates sche matically the COI colour filter of the first embodiment of the present invention.

FIG. 1 is a cross-sectional view which illustrates schematically the colour filter of the present invention.

Such colour filter 1000 consists of a transparent supporting member 100, a transparent conductive layer 500 which is formed upon the supporting member 100, a colour layer 200 which is formed upon the transparent conductive layer 500, a black matrix layer 300, and a protective layer 400 which covers the peripheries of the colour layer 200 and the black matrix layer 300.

The supporting member 100 is formed of a transparent glass substrate (for example, 7059 Glass manufactured by the Corning Company).

The colour layer 200 consists of red (R) picture elements 200A, green (G) picture elements 200B and blue (B) picture elements 200C in specified patterns such as mosaic type, triangular type, and striped type. The picture elements 200A, 200B, and 200C are between 0.4 µm and 1.0 µm in thickness, and preferably between 0.6 µm and 0.9 µm in thickness. If the film is less than 0.4 µm thick, it is impossible to achieve satisfactory colour properties, while if the film is more than 1.0 µm thick, the resistance of the colour layer prevents the achievement of a sufficient effective voltage.

Moreover, the colour layer 200 has a relative dielectric constant of at least 2.0 and preferably between 3.0 and 5.0 when a 5 V alternating current of a frequency of between 1 kHz and 100 kHz is applied. Moreover, the relative dielectric constant of the picture elements 200A, 200B and 200C under the aforementioned conditions should be within a range of ±25% from the mean value for the three picture elements, and preferably within a range of ±20% from the mean value for the three picture elements. The reason for such requirement will be described in greater detail subsequently, however substantial differences in the relative dielectric constant of each of picture elements causes great variation in the capacitance of the picture elements, which prevents good colour adjustment. Moreover, if the relative dielectric constant of the colour layer 200 is less than 2.0, the electrical capacitance of the colour layer becomes very large such that capacity division occurs in the electric field between the picture element electrodes of the substrate on which the picture elements are formed and the picture element electrodes of the colour filter such that the effective voltage in the liquid crystal layer is reduced. This causes a decline in the contrast ratio and causes poorer image quality.

The black matrix layer 300 includes red, green and blue pigments and carbon as colouring agents. When a 5 V alternating current at a frequency of between 100 Hz and 100 kHz is applied to the black matrix layer 300, the resistivity of the black matrix layer 300 is between $1.0 \times 10^2$ Ω·m and $1.2 \times 10^6$ Ω·m and the relative dielectric constant of the black matrix layer 300 when an abovementioned alternating current is applied is at least 3.0. If the resistivity of the black matrix layer 300 is less than $1.0 \times 10^2$ Ω·m, the electrical conductivity of the black matrix layer is increased excessively, and short circuits may occur with adjacent transparent electrodes, or short circuits may occur with other opposed electrodes which sandwich the liquid crystal layer which is not illustrated. Moreover, if the resistivity of the black matrix layer 300 exceeds $1.2 \times 10^6$ Ω·m, excessive voltage drop occurs in the black matrix layer and the addressing characteristics are degraded. More particularly, if the black matrix layer is thicker than the colour layer 200, the gap between the black matrix layer and the opposing wiring electrodes of the picture element substrate becomes narrow, which may readily lead to short circuits.

Moreover, in order to achieve the range of resistivity specified in the foregoing, the proportion of carbon in the black matrix layer 300 should be between 200 percent by weight to 20 percent by weight with reference to the black matrix layer 300, and preferably between 10 percent by weight and 15 percent by weight with reference to the black matrix layer 300.

Moreover, the black matrix layer 300 should preferably be between 0.5 µm and 1.5 µm thick, and more particularly, the difference in thickness between the black matrix layer 300 and the picture elements 200A, 200B and 200C which form the colour layer 200 should preferably not exceed 0.5 µm.

The protective layer 400 is generally formed of a transparent resin such as acrylic resin, and is approximately between 700 Å and 1000 Å thick.

The following describes the method of manufacture of the colour filter 1000 which is illustrated in FIG. 1.

A layer of indium tin oxide (ITO) of approximately between 500 Å and 3000 Å in thickness is formed by employing the spattering method upon the glass supporting member 100. Next, the ITO layer is patterned by normal photolithography, and the transparent conductive layer 500 is formed.

Next, a colour layer 200 is formed by employing photoresist containing dispersed pigments by the normal photolithographic process and by development technology. The red, green and blue colour elements which form the colour layer 200 may be formed in any sequence whatsoever, but the following example describes a method of manufacture in which the picture elements are formed in the sequence red, green and blue.

First, resist containing red pigment is applied to the supporting member 100 and to the transparent conductive layer 500 by means of the spin coat method, or the roll coat method, or alternatively by the film-forming apparatus of the present invention. In this case, the red pigments described in the foregoing may be employed as the red pigment, and more specifically, disazo pigments (for example, Chromophthal Red DRN manufactured by CIBA-Geigy), azo lake pigments (for example, Lake Red C manufactured by Dainichi Seika), or pyrazolone pigments. Once the resist has been applied, the material is prebaked for between 10 minutes and 20 minutes at a temperature of between 60° C. and 70° C., and is then exposed to light through the photomask. The material is exposed to approximately between 100 mJ and 200 mJ of light. Next, the material is developed by showering or by dipping in an alkaline composition. After development, the resist layer is baked for approximately between 30 minutes and 60 minutes at a temperature of approximately between 150° C. and 200° C. with a clean oven, a hot plate or the like.

The green pigment that is employed to form the green picture element 200B may be a green pigment described in the foregoing, and more specifically phthalocyanine green to which bromine atoms has been introduced (Pigment Green 36, C.I. 74265) or the like may appropriately be employed. The coating process, prebake process and the developing process are similar to those employed for the aforementioned red. The green picture elements are exposed to approximately between 250 mJ and 500 mJ of light in the exposure process.

Blue pigments such as copper phthalocyanine pigments and threne pigments (for example, Chromophthal Blue A3R manufactured by CIBA-Geigy) may be employed for the formation of the blue picture element 200C. The blue picture elements are exposed to approximately between 70 mJ and 150 mJ of light in the exposure process. The other manufacturing processes for the blue picture element 200C are similar to those for the red picture element and the green picture element.

Such red, green and blue pigment resists contain from approximately 15 percent by weight to 20 percent by weight of solids with reference to the total volume of resist composition, and preferably between 11 percent by weight and 12 percent by weight of solids with reference to the total volume of resist composition, and such pigments should be comprised preferably from 40 percent by weight to 50 percent by weight of the solids.

The following describes the formation of the black matrix layer 300. The resist that is employed to form the black matrix layer contains from 30 percent by weight to 60 percent by weight of red, green and blue pigments, and from 10 percent by weight to 20 percent by weight of carbon black, with reference to the total solids in the resist composition. The black matrix layer 300 may be formed before the colour layer 200 is formed.

Next, a protective layer 400 is formed by the application by for example the spin coating method of a heat curing acrylic resin, which is then baked for approximately 30 minutes at a temperature of 180° C. Next, a heat curing resin consisting principally of a commercially available polyamic acid type PI is applied upon the protective layer 400 by employing the flexographic method, whereupon the material is baked for from one hour to two hours at a temperature of approximately 190° C. in order to form the alignment film which is not illustrated.

Next, the results of the measurement of the electro-optical properties of the colour filter illustrated in FIG. 1 are described.

Experiment 1

Figure 6:
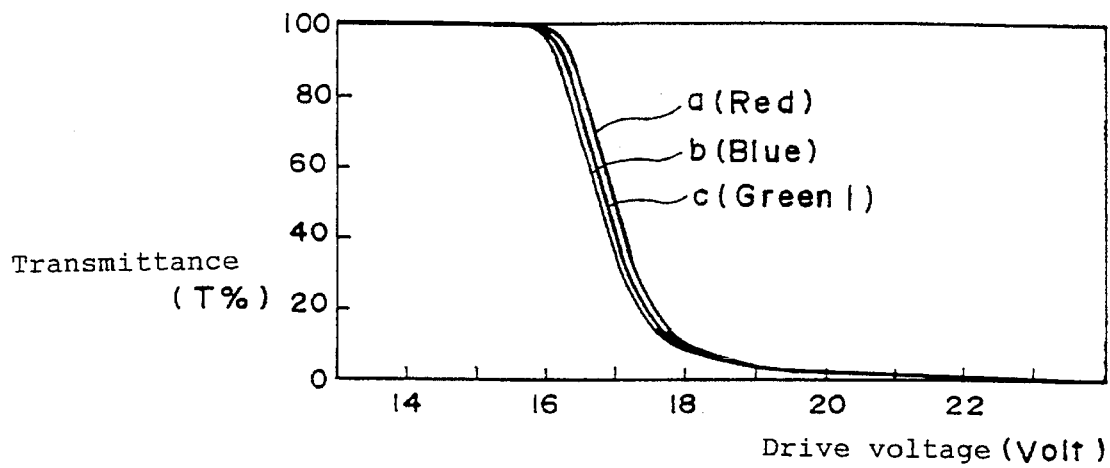
FIG. 6 is a diagram which illustrates the transmittance—drive voltage curve of the colour filter of the first embodiment of the present invention.

First, the correlations between the transmittance and the drive voltages for each of the picture elements 200A, 200B and 200C which form the colour layer 200 in the colour filter 1000 are examined. The results are shown in FIG. 6. The transmittance—drive voltage curves were produced by the measurement of the variations in the transmittance when an LC meter was employed in order to vary the voltage with a liquid crystal panel which employed the colour filter illustrated in FIG. 1 prepared. Table 1 shows the pigments, relative dielectric constant, contents of pigment, and the thickness of the colour layer employed for the samples.

The relative dielectric constant shown in Table 1 are values for a voltage of 5 V and a frequency of 10 kHz. The content of pigment is shown as a proportion of the total solids in the resist compositions (percent by weight).

As can be seen from FIG. 6, the red, green and blue transmittance—drive voltage curves for the liquid crystal apparatus which employed the colour filter of the present invention are nearly identical, and thus it is known that each of the picture elements has almost identical electro-optical properties. Thus good colour characteristics can be obtained because the same transmittance is obtained at a given drive voltage. In the present case, satisfactory colour characteristics were defined as the range that satisfied $x \geq 0.60$ and $y \leq 0.35$ for red $0.33 \geq x \geq 0.29$ and $y \geq 0.58$ for green and $x \leq 0.15$ and $y \leq 0.14$ for blue, when a CIE standard chrorimetric system light source C was employed.

TABLE 1

| Sample | Type of pigment | Relative dielectric constant | Content of pigment (wt %) | Thickness of film (μm) |
|---|---|---|---|---|
| a(Red) | Pigment Red 208 (C.I.12514) | 3.0 | 45 | 0.7 |
| | Pigment Yellow 83 (C.I.21108) | | | |
| b(Blue) | Pigment Blue 15:1 (C.I.74160) | 3.5 | 45 | 0.6 |
| | Pigment Violet 23 (C.I.51319) | | | |
| c(Green 1) | Pigment Green 36 (C.I.74265) | 3.2 | 45 | 0.85 |
| | Pigment Yellow 83 (C.I.21108) | | | |
| d(Green 2) | Pigment Green 7 (C.I.74260) | 4.8 | 45 | 0.85 |
| | Pigment Yellow 83 (C.I.21108) | | | |
| e(Green 3) | Pigment Green 7 (C.I.74260) | 4.2 | 45 | 0.85 |
| | Pigment Green 36 (C.I.74265) | | | |
| | Pigment Yellow 83 (C.I.21108) | | | |

The colour filter of the present invention provides such good electro-optical properties because the colour picture elements, of which the colour layer is formed, have uniform relative dielectric constant.

Comparative Experiment 1

Figure 7:
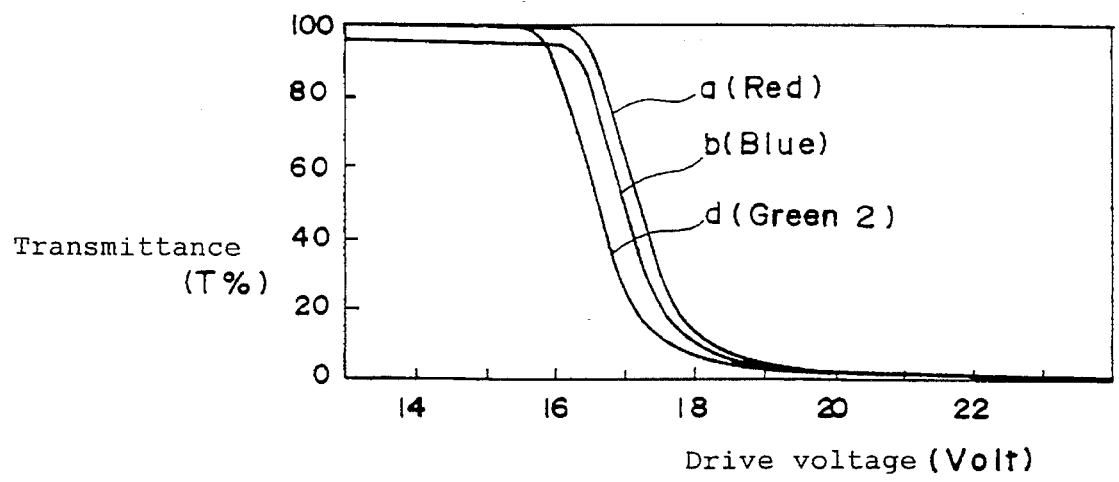
FIG. 7 is a diagram which illustrates the transmittance—drive voltage curve of a comparative colour filter.

Next, the same measurements as were performed for Experiment 1 were performed when the colour layer exceeded the range of ±25% of the mean value for the relative dielectric constant of the colours, and the relationship between the transmittance and drive voltages were measured. The results are shown in FIG. 7. As can be seen from FIG. 7, there is considerable variation in the transmittance—drive voltage curves in the case of the present comparative experiment, such that good electro-optical properties were not obtained. This is because, focusing on curve d which shows the greatest discrepancy from the other curves, the curve indicates that the green picture element had a rather greater relative dielectric constant (in this case, approximately 27% greater than the mean relative dielectric constant) than did the other picture elements: red picture element and blue picture element, which together with the green picture element form the colour layer. When the transmittance—drive voltage curves for the colours red green and blue exhibit such a degree of variability, the transmittance of the picture elements for each colour will vary for a given drive voltage, such that good electro-optical properties cannot be obtained.

Experiment 2

Next, measurements were performed in order to determine how the transmittance—drive voltage curves vary according to type of pigment employed. The types of pigment employed are shown in Table 1.

Figure 8:
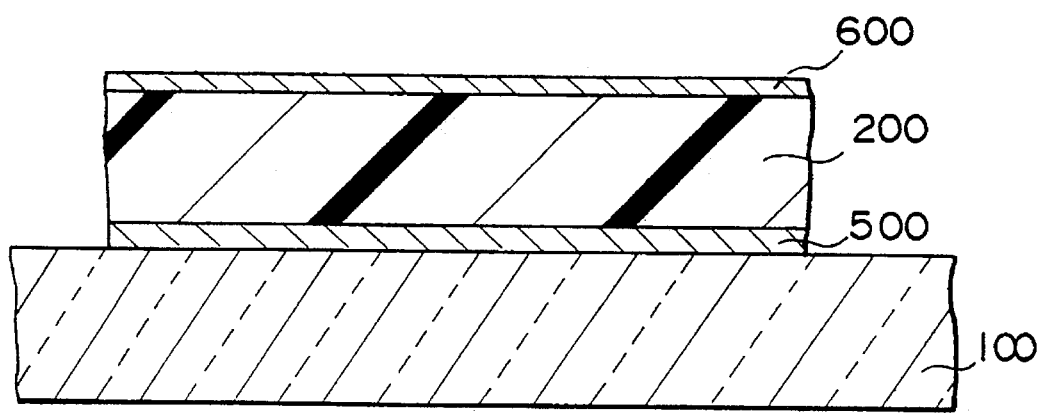
FIG. 8 is a cross-sectional view which illustrates the constitution of the sample employed to determine the relationship between the relative dielectric constant and the frequency.

The method of measurement is described first. FIG. 8 illustrates the sample employed for the purpose of measurement. In the sample illustrated in FIG. 8, an ITO layer 500 with a film thickness of approximately 1000 Å was formed upon the glass substrate 100, and resist containing dispersed pigment was coated upon the ITO layer 500, whereupon the material was subjected to heat treatment for from 10 minutes to 20 minutes at a temperature of approximately from 60° C. to 70° C. in order to cure the resist layer, which formed a colour layer 200 having a thickness of approximately 1.0 μm. Moreover an electrically conductive paste consisting of a mixture of an organic solvent and silver powder was coated upon the colour layer 200, which was then cured in order to form the conductive layer 600. An LCR meter was employed with the samples formed in this manner in order to measure their capacitance. Such measurements and the measurements of the thicknesses of the films upon the sample were employed to calculate the relative dielectric constant of the sample.

Figure 9:
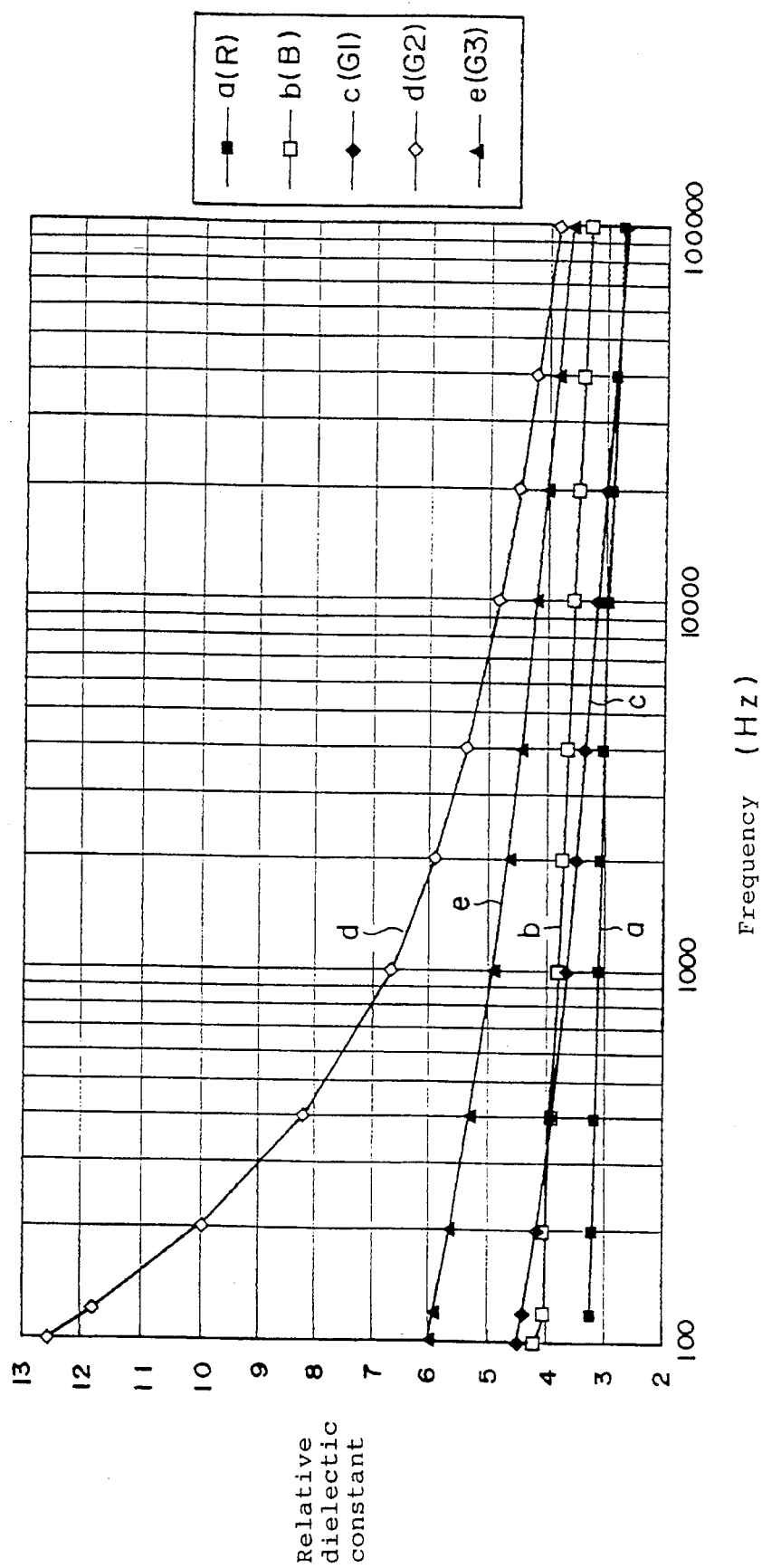
FIG. 9 is a diagram which illustrates the relationship between the relative dielectric constant of colour filters constituted with the employment of different pigments and the frequency.

For such measurements of capacitance, the voltage was set at 5 V and the frequency was varied between 100 Hz and 100 kHz. The results are illustrated in FIG. 9. As can be seen from FIG. 9, the values for each of the pigments declined until approximately a frequency of 10 kHz, whereupon the values showed virtually no change. A most important point that is evident from FIG. 9 is that those samples in which bromine was introduced into the phthalocyanine green (samples c and e) exhibited lower values for relative dielectric constant than did the sample in which bromine was not introduced into the phthalocyanine green (sample d).

Consequently it is confirmed through the present experiment that the employment of phthalocyanine green to which bromine atoms have been introduced enables the establishment of the relative dielectric constant within the range of approximately from 3.0 to 6.0, and that the relative dielectric constant of the three colours R, G and B can be made almost uniform within this range.

Moreover, FIG. 6 and FIG. 9 show that, at a voltage of 5 V and at a frequency of 10 kHz, the relative dielectric constant of the red, green and blue picture elements are within the range 3.5±0.5, and that moreover it is desirable to employ pigments which will provide relative dielectric constant of the red, green and blue picture elements which are within the range 3.5±0.5 at a voltage of 5 V and at a frequency of 100 kHz.

Figure 10:
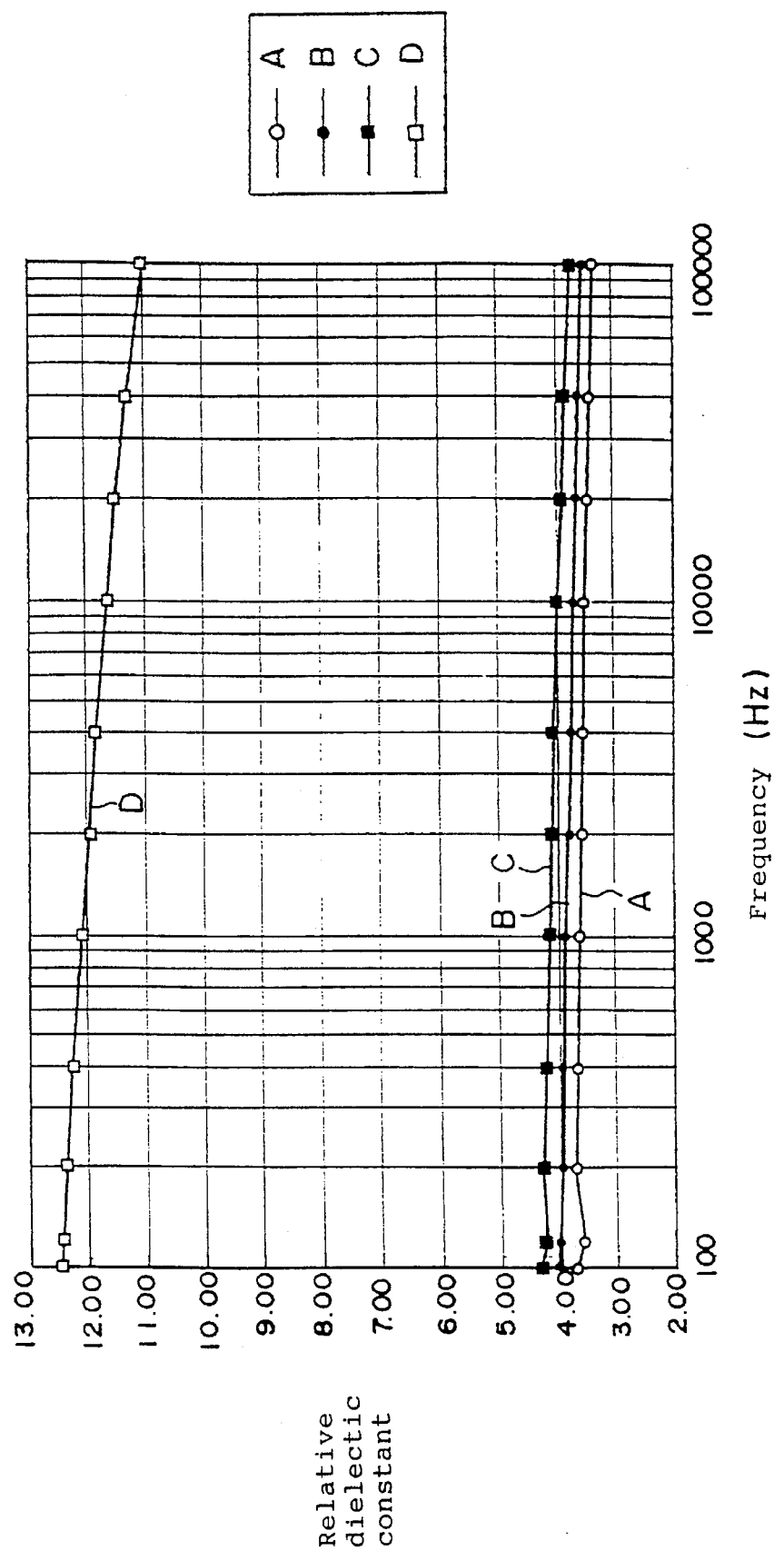
FIG. 10 is a diagram which illustrates the relationship between the relative dielectric constant of the black matrix layer with the employment of different pigments and the frequency.

Next, the relative dielectric constant—frequency characteristics of the black matrix layer were measured. The results are illustrated in FIG. 10. As the method of measurement was identical to that employed for the aforementioned colour layer (see FIG. 8 and FIG. 9), a detailed description of the method of measurement is omitted.

Figure 11:
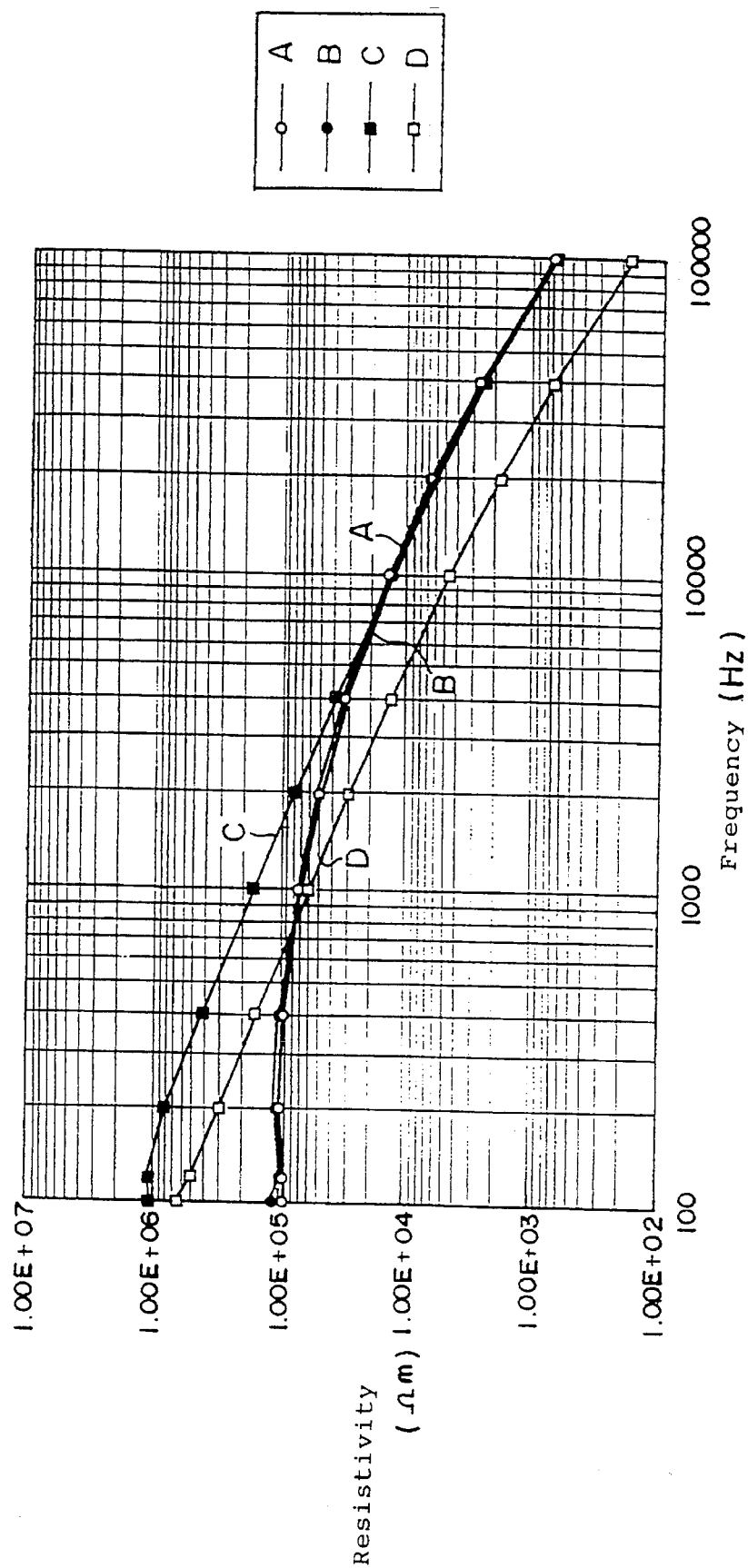
FIG. 11 is a diagram which illustrates the relationship between the resistivity for the pigments employed in FIG. 10 and the frequency.

Four samples A to D were employed for this experiment. A black resist employing an acrylic resin (Black CK 3001 manufactured by Fuji Hanto) was selected for each of the samples A to D. Samples A, B and C had carbon contents of 12 percent by weight, and sample D had a carbon content of 20 percent by weight. When an alternating current of 5 V and a frequency of from 100 Hz to 100 kHz was applied to such samples A to D, they were found to have resistivities of within the range of from $1.0 \times 10^2$ to $1.2 \times 10^6$ Ω·m which is within the range shown by the present invention, as illustrated in FIG. 11. From FIG. 10, it may be considered that a relative dielectric constant for the black matrix layer of at least 3.0 is satisfactory. When samples which employed a black resist with a carbon content of 30 percent by weight were tested, short circuits were observed to occur between opposing electrodes, and such samples were turned out to be unfit for practical use. It can be confirmed that there is such short circuiting by optical defects in the form of dots when electricity is applied to a liquid crystal panel.

Figure 2:
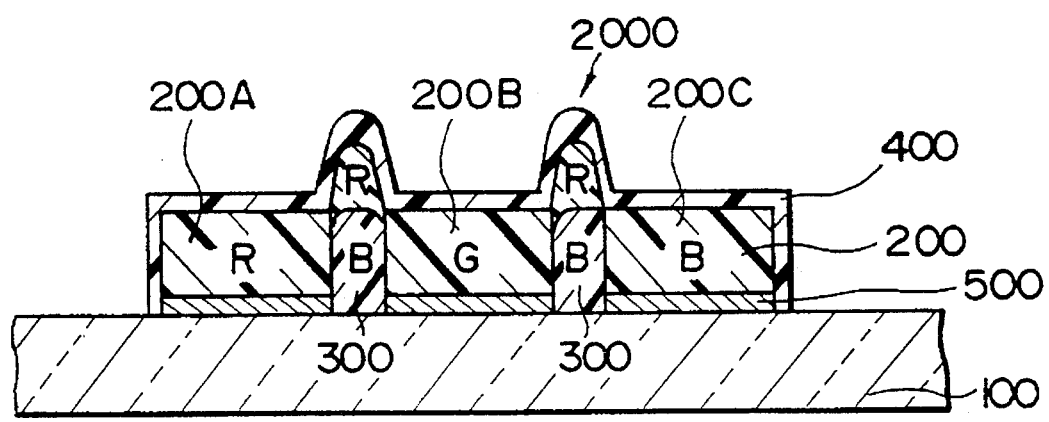
FIG. 2 is a cross-sectional view which illustrates a further example of the constitution of the colour filter of the first embodiment of the present invention.
Figure 3:
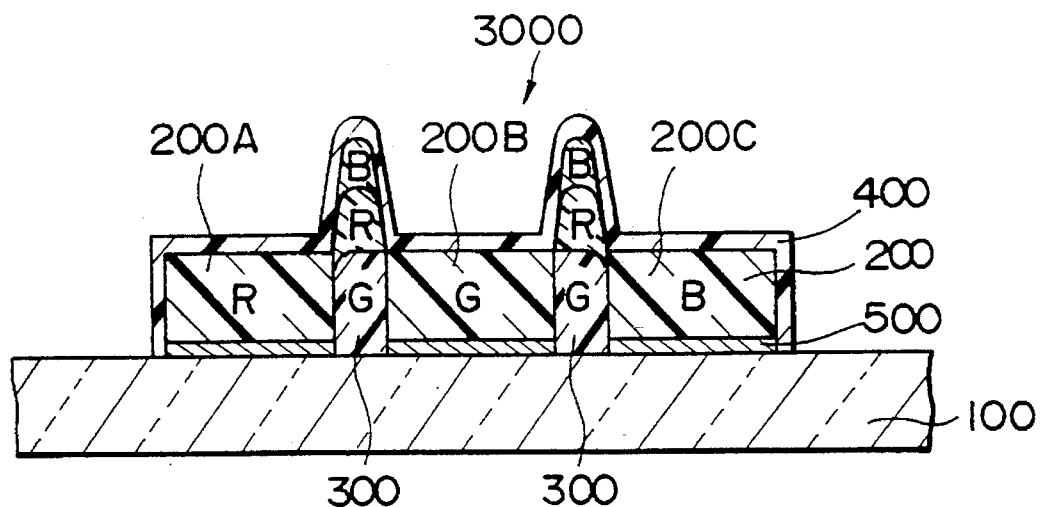
FIG. 3 is a cross-sectional view which illustrates a further example of the constitution of the colour filter of the first embodiment of the present invention.
Figure 4:
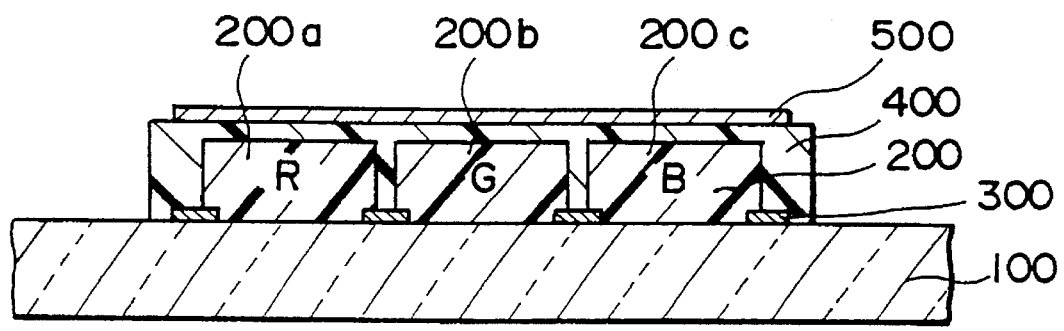
FIG. 4 is a cross-sectional view which illustrates schematically the constitution of an IOC colour filter.
Figure 5:
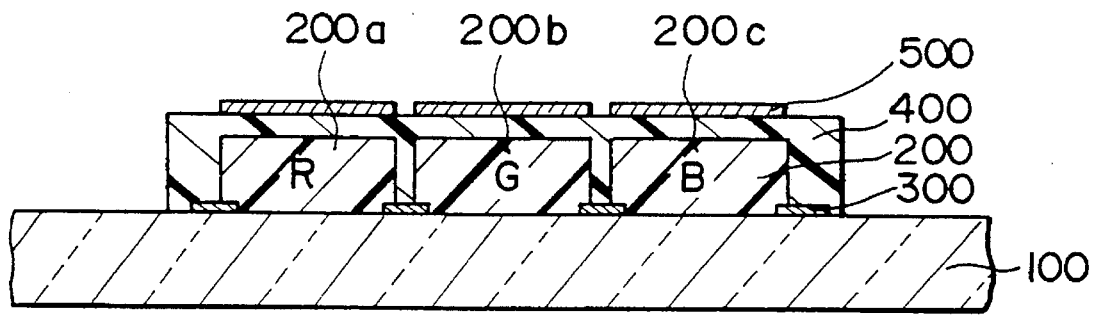
FIG. 5 is a cross-sectional view which illustrates schematically a further constitution of an IOC colour filter.

FIG. 2 and FIG. 3 illustrate variant forms of the colour filter that is illustrated in FIG. 1, and these colour filters differ from the colour filter 1000 in the constitution of the black matrix layer. A colour filter 2000 in FIG. 2 has a black matrix layer 300 which is composed of overlaid blue and red colour layers, while a colour filter 3000 in FIG. 3 has a black matrix layer 300 which is composed of overlaid green, red and blue colour layers.

As the constitutions of the colour filters are in all other regards identical to that of the colour filter illustrated in FIG. 1, no further details of such variant forms of the colour filters are provided.

Second Embodiment

Figure 12:
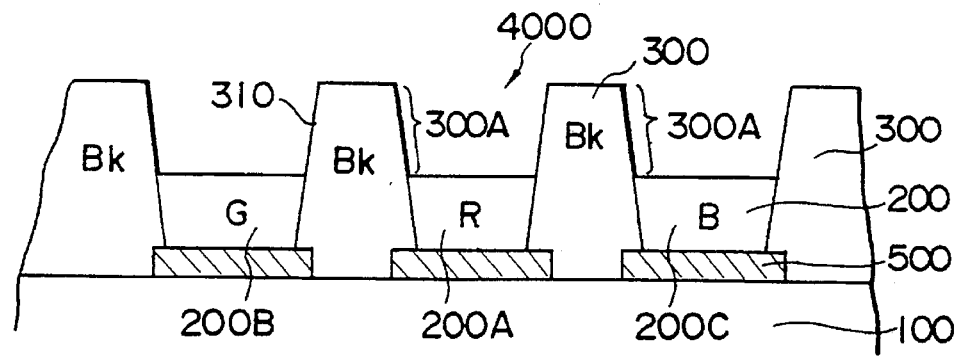
FIG. 12 is a cross-sectional view which illustrates schematically the colour filter of the second embodiment of the present invention.

FIG. 12 is a cross-sectional view which illustrates schematically the colour filter of the second embodiment of the present invention.

A colour filter 4000 possesses a supporting member 100, a transparent conductive layer 500, a colour layer 200, and a black matrix layer 300, and such basic constitution, particularly the basic constitution of the colour layer 200, is identical with that of First Embodiment. Thus the thickness of the colour layer 200 is from 0.4 μm to 1.0 μm, and preferably from 0.8 μm to 0.9 and when an alternating current of 5 V and a frequency of from 1 kHz to 100 kHz is applied to the colour layer, the relative dielectric constant of the colour layer is at least 2.0, and preferably from 3.0 to 5.0. Moreover, the relative dielectric constant of the picture elements 200A, 200B and 200C are all within a range of ±25% of the mean value for the three colour elements, and preferably within a range of ±20% of the mean value for the three colour elements.

The characteristic of Second embodiment is in the projecting portion of the black matrix layer 300, that is to say in the upper layer which forms the black matrix layer 300, a part of the layer (projecting layer) 300A which projects above the colour layer 200 is formed with side surfaces which tapered upwards. Such tapered side surfaces are formed at an angle of from 30° to 89° with reference to the supporting member 100, and preferably at an angle of from 45" to 70" with reference to the supporting member 100. If the angle of incline of such side surfaces exceeds 89°, the angle of that portion of the projecting layer 300A which is different in height becomes steep, and may readily lead to poor alignment. Moreover, if the angle of incline of the side walls is less than 30°, the film becomes too thin at the edge, such that such portion does not possess adequate light blocking properties. Moreover, if the film is too thin, the control of the width of the patterns during manufacture becomes difficult, and the reproducibility of the dimensions envisaged at design becomes poor.

The following describes the method by which the taper is added to the projecting layer 300A of the black matrix layer 300. Various methods have been considered in this regard, and a typical such method involves the provision of a gap between the photomask and the surface which is exposed to light. More specifically, an interval of from 0 μm to 30 μm is normally disposed between the surface which is exposed to light and the photomask, but this interval is expanded to between 200 μm and several hundred mm before exposure to light. If such method is employed, when the material is exposed to light, the light diffraction effect causes the light exposure pattern to be greater than the design value of the photomask, such that the layer of expanded portion is formed into the tapered shape illustrated in FIG. 12 by development. Alternative methods of forming such taper include for example the employment of surface reforming agents or surfactants in order to increase the cohesion between the resist layer that is exposed to light and the transparent conductive layer, thereby ensuring a certain degree of tapering.

The optimum angle of incline of the aforementioned side surface of the projecting layer 300A may be selected having regard to rubbing conditions and to the direction of rubbing.

Figure 13:
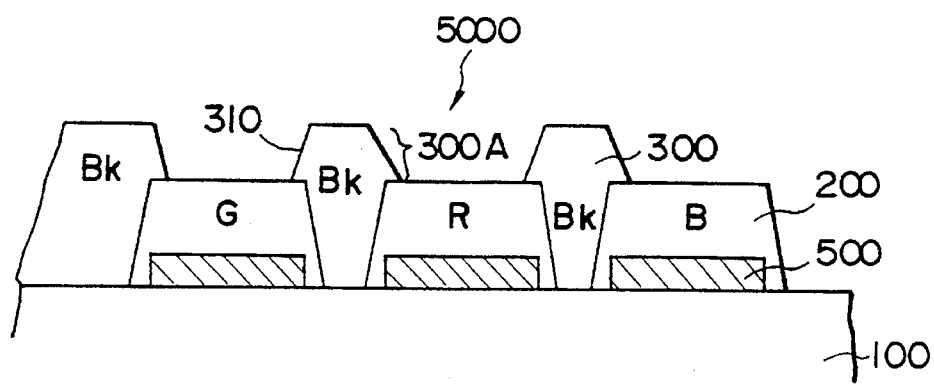
FIG. 13 is a cross-sectional view which illustrates a variant form of the second embodiment of the present invention.
Figure 14:
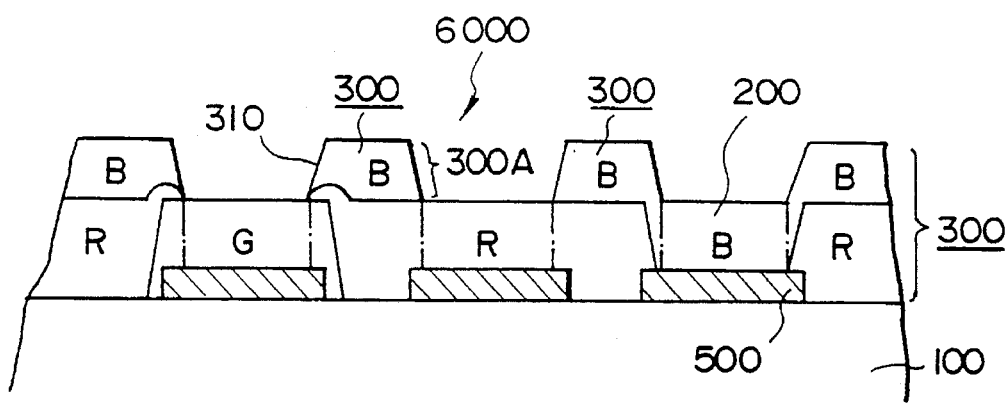
FIG. 14 is a cross-sectional view which illustrates a further variant form of the second embodiment of the present invention.
Figure 15A:
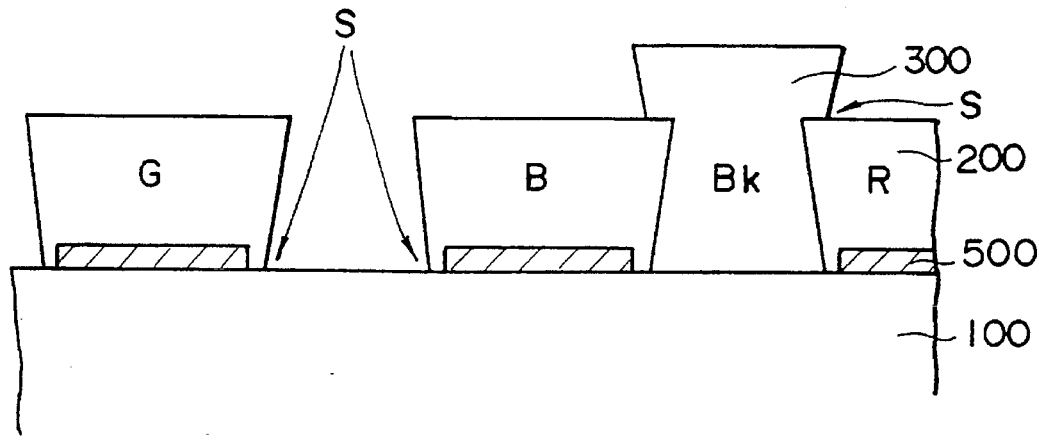
FIG. 15A is a view which illustrates the tapered shape of the colour layer and the black matrix layer.
Figure 15B:
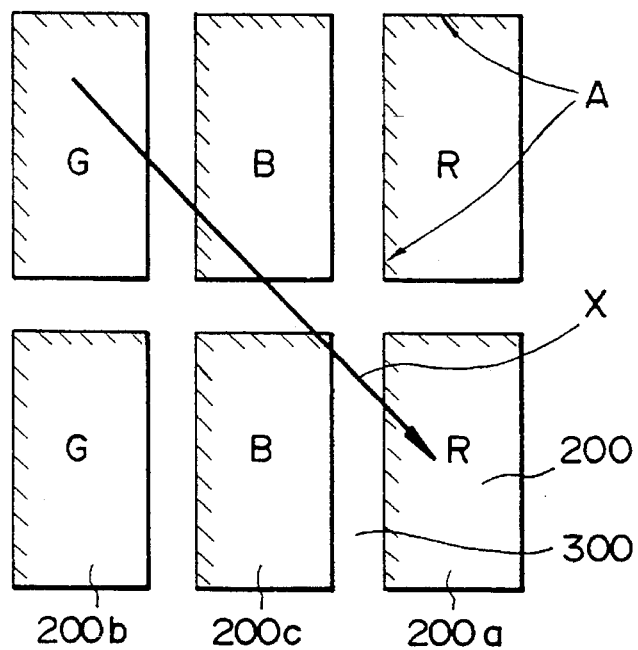
FIG. 15B is an explanatory diagram which illustrates the area of poor alignment when the colour filter illustrated in FIG. 15A is subjected to the rubbing treatment.

FIG. 13 and FIG. 14 illustrate variant forms of the present embodiment. In the colour filter 5000 in FIG. 13, the black matrix layer 300 is formed after the formation of the colour layer 200, and FIG. 14 illustrates the constitution of the colour filter 6000 wherein the black matrix layer is formed by means of the overlaying of red and blue colour layers without the use of black pigment. Such type of black matrix layer 300 is formed with a tapered shape in the side surfaces of the blue colour layer (300A) which is formed above the upper surface line of the colour layer 200.

Third Embodiment

Next, the third embodiment of the film-forming apparatus of the present invention is described by reference to FIG. 16 and FIG. 17.

Figure 16:
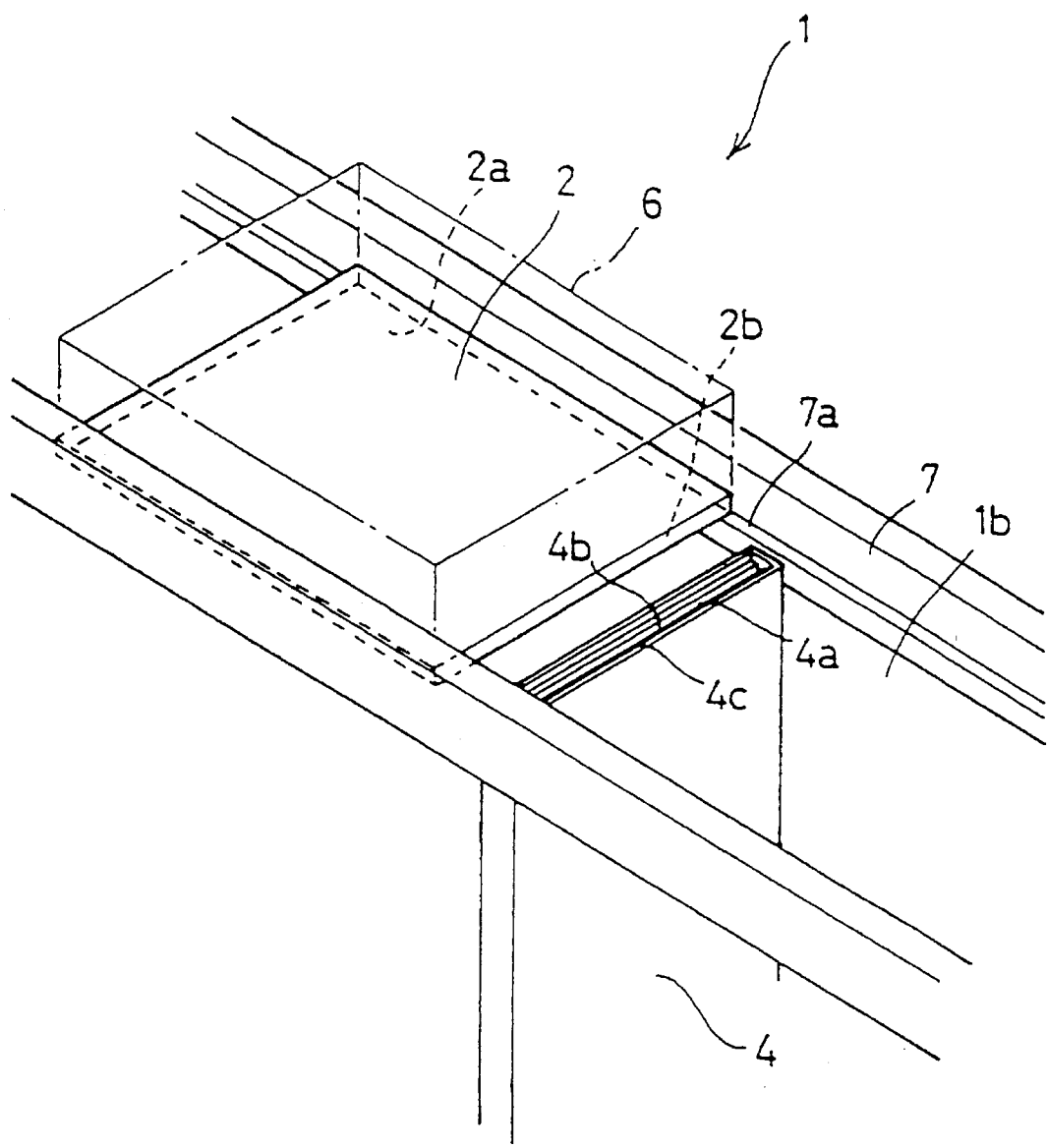
FIG. 16 is a perspective view of the main members of the film-forming apparatus of the third embodiment of the present invention.

FIG. 16 is a perspective view of the main members of the film-forming apparatus of the present embodiment, and FIG. 17A to FIG. 17D are cross-sectional views of the process of the formation of the film.

In these figures, a film-forming apparatus 1 of this embodiment is the apparatus employed in order to form coloured resist layers upon the surface of a rectangular glass substrate (supporting member) for the colour filter, and a plurality of rectangular colour filters are cut from the glass substrate. The film-forming apparatus 1 possesses a transport means 6 which transports a member to be coated 2 (glass substrate) with a surface to be coated 2a facing downwards, and a coating composition supply means 4 which is disposed below a transport path 1b for the member to be coated 2 and which supplies specified mounts of the coating composition (coloured resist) 3 across the full lateral width of the transport path 1b. In this case in FIG. 16, only a vacuum chuck which communicates with the transport robot arm (not illustrated) which moves horizontally at the sides of the transport path 1b is illustrated as the transport means 6. Moreover, the coating composition supply means 4 is connected to the measure pump disposed below (not illustrated), and is a rectangular nozzle with a slit 4a in its upper surface, while the surface upon which the slit 4a is formed is lower than the end of the side surfaces of the nozzle, and such recessed portion forms a coating composition supply member 4b. Thus the coating composition 3 emitted from the slit 4a is first held for a time in the coating composition supply member 4b and then the surface tension of the coating composition 3 causes such coating composition 3 to swell up and be supplied, such that the amount supplied in a lateral direction may be regulated. Moreover, rail members 7 having an L-shaped profile are disposed parallel to each other on either side of the transport path 1b for the member to be coated 2 in order to act as a separation distance adjustment and maintenance means which adjusts and maintains a specified separation distance between a leading surface 4c of the coating composition supply means 4 and the surface to be coated 2a, and wherein the upper surfaces 7a (guiding surface) of the steps of the rail members 7 support the member to be coated 2 with both ends of the surface to be coated 2a during transportation. Thus the upper surface 7a forms the transport reference plane 1a for the member to be coated 2. In this case, the separation distance $d_1$ between the upper surface 7a and the leading surface 4c of the coating composition supply means 4 is the distance in which a layer of the pool of coating composition may be formed between the leading surface 4c and the surface to be coated 2a when the member to be coated 2 passes over the coating composition supply means 4, as will be described later.

Next, the film-forming action of the film-forming apparatus 1 is described.

Figure 17A:
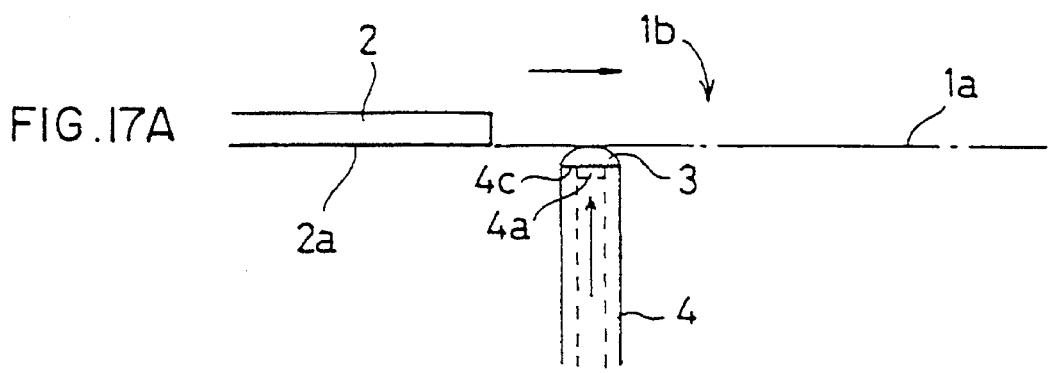
FIG. 17A to FIG. 17D are cross-sectional views which illustrate the process of the formation of the films when the film-forming apparatus illustrated in FIG. 16 is employed.
Figure 17B:
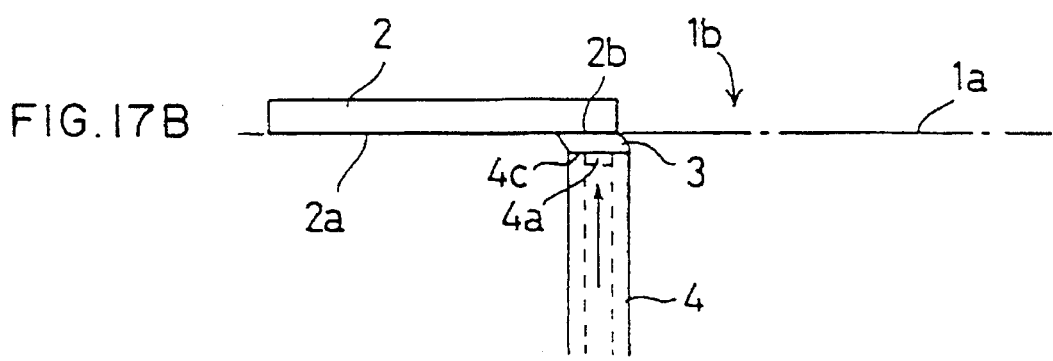

First, when the member to be coated 2 is transported by the transport means 6 at a specified vertical and horizontal position regulated by the rail members 7 as illustrated in FIG. 17A, and when the leading side 2b of the surface to be coated 2a reaches above the coating composition supply means 4 as illustrated in FIG. 17B, and when the leading side 2b of the surface to be coated 2a touches the coating composition 3, the transport action of the transport means 6 is stopped temporarily. For this reason, the coating composition 3 expands laterally due to surface tension, and crosses the distance between the leading side 2b of the surface to be coated 2a and the leading surface 4c of the coating composition supply means 4 to cover the entire area of the leading side 2b. As a result, a primary coating layer 5a of the coating composition 3 is formed upon the entire area of the leading side 2b (primary coating process).

Figure 17C:
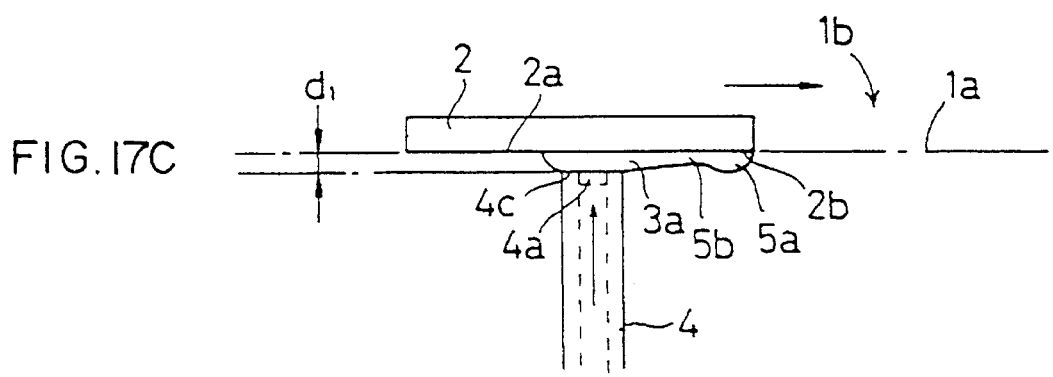
Figure 17D:
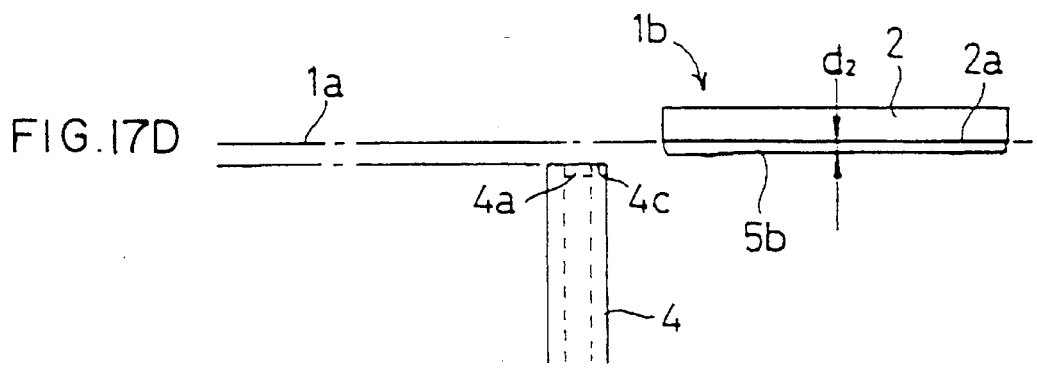

When this state has been achieved, the transport means 6 resumes horizontal movement, and the member to be coated 2 is transported as illustrated in FIG. 17C. In this case, the separation distance $d_1$ between the surface to be coated 2a and the leading surface 4c of the coating composition supply means 4 is previously set through the positioning of the rail members 7 in order to maintain that state in which the layer 3a consisting of the pool of the coating composition 3 is formed between the surface to be coated 2a and the leading surface 4c. Moreover, the velocity of movement of the transport means 8 and the rate at which the coating composition is supplied by the coating composition supply means 4 are set in such a manner as to prevent the interruption of the coating composition 3. Thus as the member to be coated 2 is transported, the coating layer 5a is extended to become a coating layer 5b upon the surface to be coated 2a (coating composition extension process), and hence when the member to be coated 2 has completed its passage over the coating composition supply means 4, the coating layer 5b having a uniform thickness $d_2$ is formed as illustrated in FIG. 17D. The amount of coating composition 3 that is supplied from the coating composition supply means 4 during this period is set in such a manner as to be equivalent to the amount of the coating composition 3 that is consumed for the coating layer 5b. However, even if an excess amount of the coating composition 3 is supplied, such excess amount of the coating composition merely drips back upon the side surfaces of the coating composition supply means 4 such that such excess of the coating composition 3 does not adhere to the surface to be coated 2a, and such that no variations are caused in the thickness $d_2$ of the coating layer 5b.

Thus in the present embodiment a coating layer 5b is formed by employing a layer consisting of a pool of coating composition 3a which is formed between the member to be coated 2 and the coating composition supply member 4, or in other words, a film is formed by wetting the surface to be coated 2a with the layer consisting of a pool of coating composition 3a and by extending the wetted surface by means of surface tension of the coating composition in an uncompressed state, without having resort to the compression of the coating composition upon the member to be coated as in the roll coater method. Moreover, if a film is formed initially by the use simply of wettability, there is a delay until a stable completely wetted state is achieved, such that the leading side 2b of the surface to be coated 2a is not to completely wetted at the initiation of film formation, such as to give rise to unevenness in the film. For this reason, the primary coating layer 5a is first formed and the coating layer 5b is extended from such origin. Thus such process consists of the extension and expansion of the coating layer 5b by the employment of the surface tension of such coating layer 5b rather than by the employment of an application process, and hence the thickness $d_2$ of the coating layer 5b is not affected by the application of pressure to the member to be coated as occurs in the roll coater method. Moreover, the effects upon the state of the surface of the leading surface 4c of the coating composition supply means 4, which corresponds to the effect of the roller surface of the coating roller in the roll coater method, are avoided. Thus as the layer consisting of a pool of coating composition 8a of a specified thickness is formed between the surface to be coated 2a and the leading surface 4c, the shear surface of the coating composition that is formed by the movement of the member to be coated 2 is formed in a position at which such shear surface of the coating composition is not affected by any variation in the state of the surface of the leading surface 4c, or in other words, a position at which such shear surface of the coating composition is not affected by the adhesive strength of the coating composition to the leading surface 4c. For this reason, the thickness of the coating layer 5b is determined by the balance among the shear force determined by the velocity of movement of the member to be coated 2, the adhesive force of the coating composition to the surface to be coated 2a, and the surface tension of the coating composition, and not by the adhesive force to the coating composition supply means 4. Moreover, as the coating composition is subjected to a light compression history, the residual stress in the coating composition is of a level which may be disregarded, and no fine air bubbles are included in the coating composition is this manner, those factors which affect the formation of the film, and more particularly those factors which are difficult to control, are few, such as to enable the stable formation of films.

Fourth Embodiment

The following is a practical description of the fourth embodiment of the film-forming apparatus of the present invention, by reference to the appended figures.

General Constitution

First, the outline of the constitution of the apparatus of this embodiment is described by reference to FIG. 18 to FIG. 21.

Figure 18:
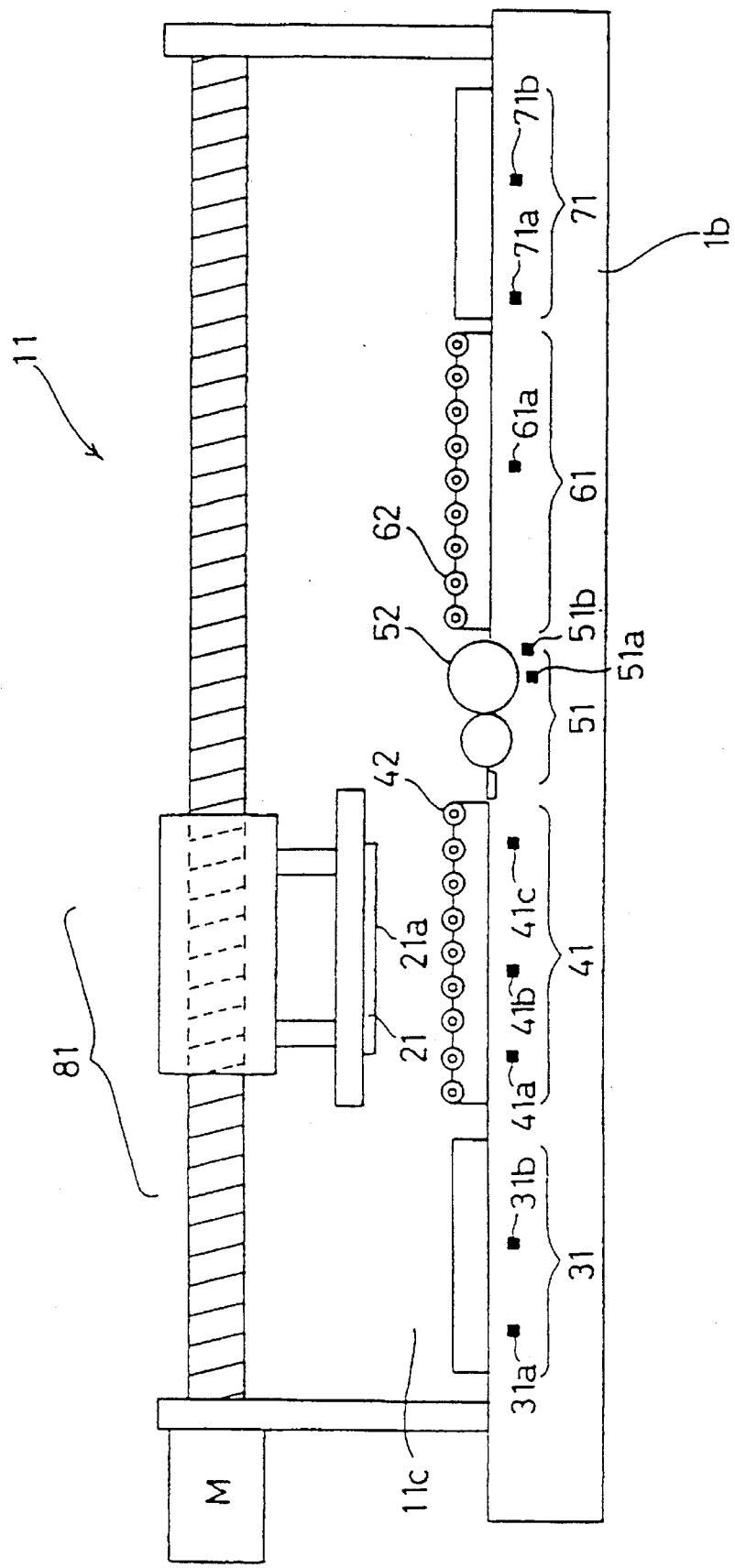
FIG. 18 is an outline constitutional diagram of the construction of the main members of the film-forming apparatus of the fourth embodiment of the present invention.
Figure 19:
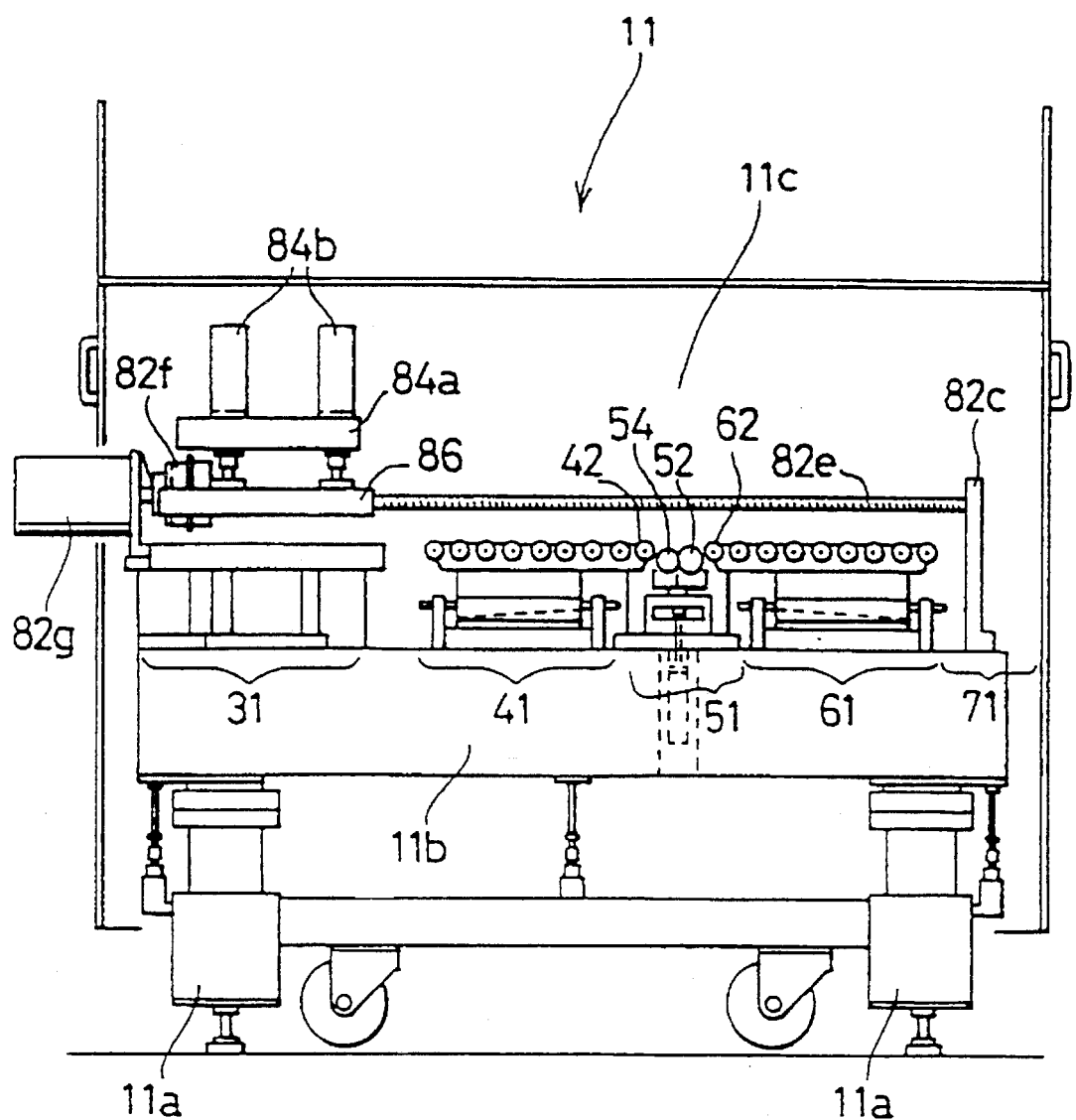
FIG. 19 is a front elevation of the film-forming apparatus of the fourth embodiment of the present invention.
Figure 20:
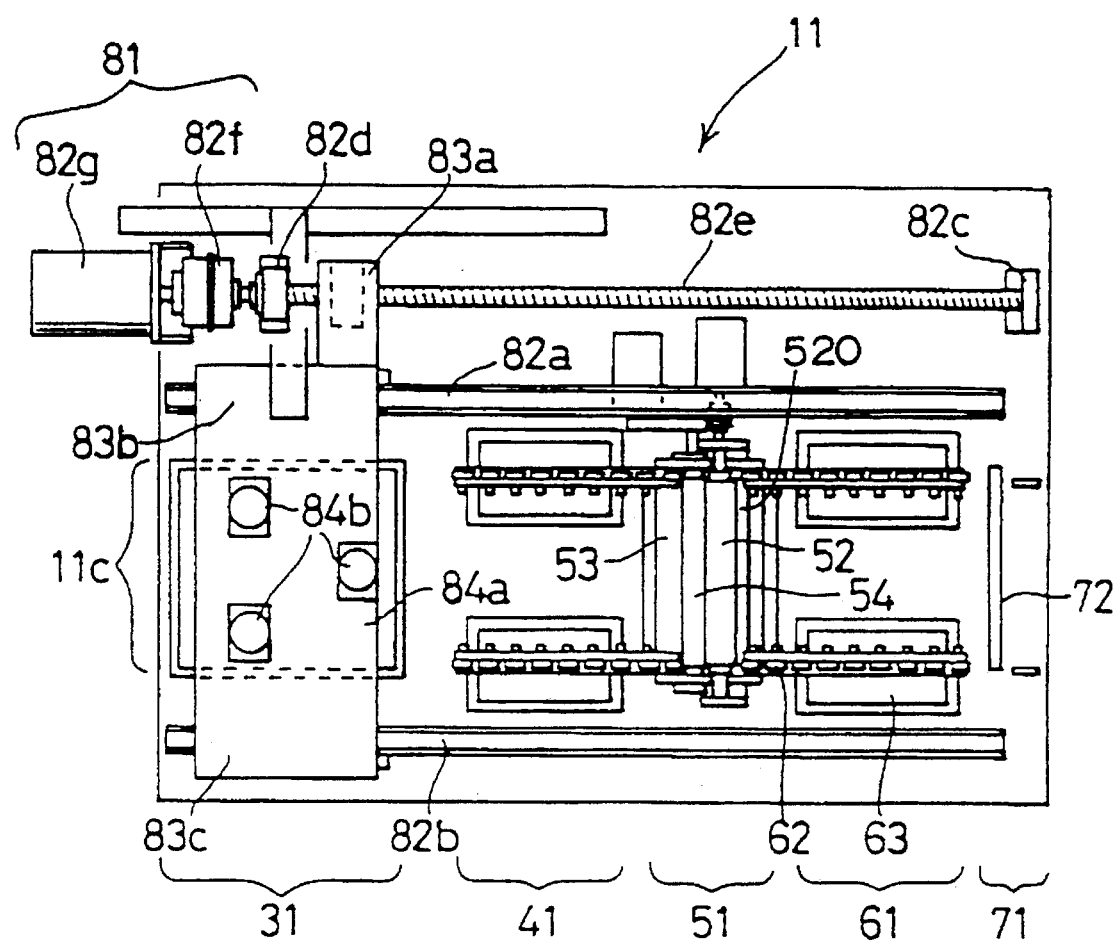
FIG. 20 is a plan view of the film-forming apparatus of the fourth embodiment of the present invention.
Figure 21:
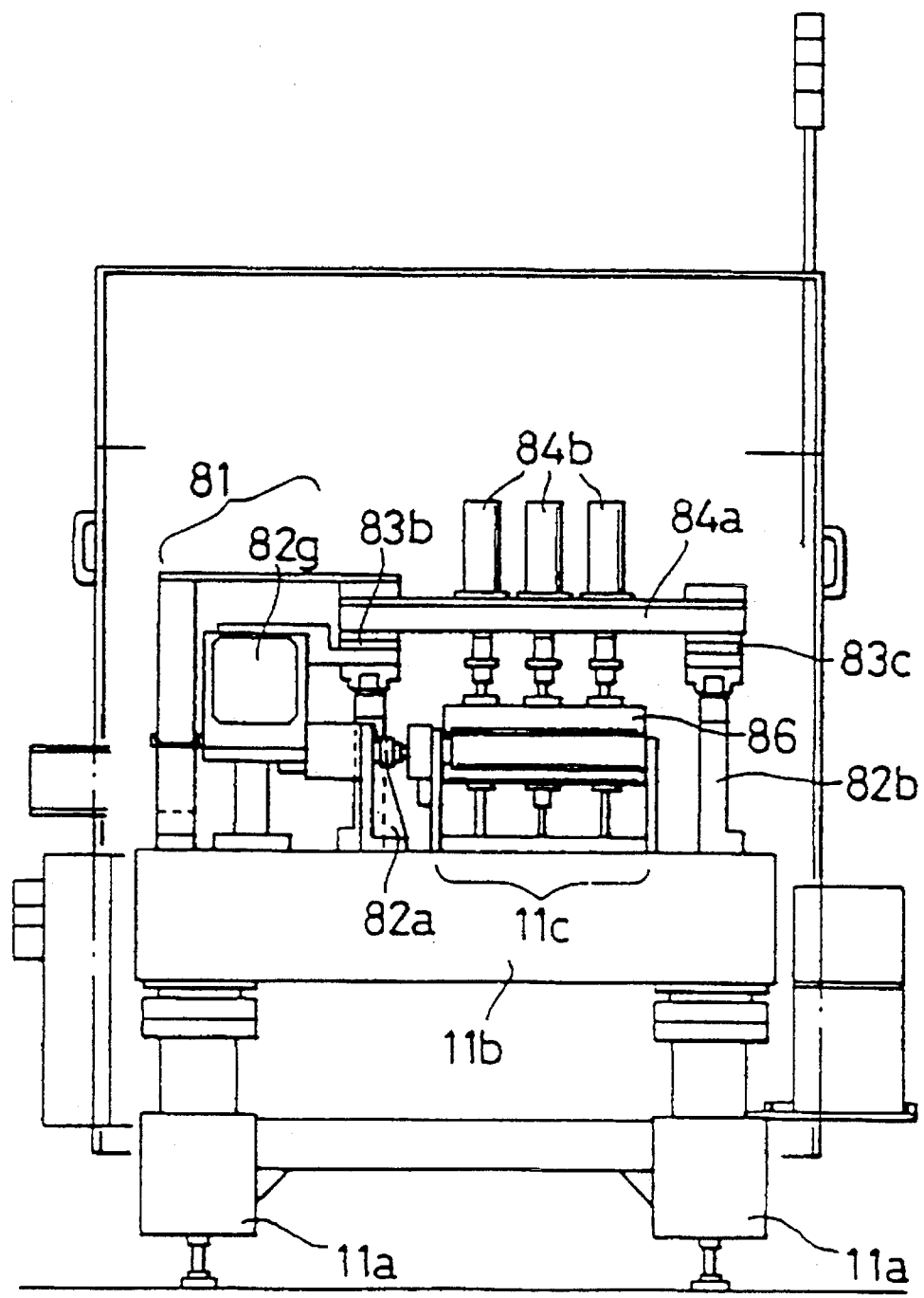
FIG. 21 is a side elevation of the film-forming apparatus of the fourth embodiment of the present invention.

FIG. 18 is an outline constitutional diagram of the film-forming apparatus, FIG. 19 is a front elevation, FIG. 20 is a plan view, and FIG. 21 is a side elevation of the upstream side of the transport path.

In these diagrams, a film-forming apparatus 11 of the present embodiment is an apparatus for applying coloured resist (coating composition) to a glass substrate (member to be coated) 21 for the rectangular colour filter, and a work supply stage 31, an upstream work guide member 41, a coating member 51, a downstream work guide member 61, and a work discharge member 71 are disposed, upon a marble base 11b which is supported by legs 11a which are provided with air damper mechanisms, from the upstream to the downstream of a transport path 11c of the glass substrate 21, while a transport mechanism 81 (transport means) which transports the glass substrate 21 according to a predetermined program is disposed above members described, from the upstream to the downstream. In this case, the glass substrate 21 which is supplied to the work supply stage 31 is then transported to the coating member 51 with the surface to be coated 21a at a specified position upon the roller surface of a guide roller 42 of the upstream work guide member 41. While the glass substrate 21 is at the coating member 51 and at the upper position of the composition supply roller 52 (coating composition supply roller) with its surfaces aligned by the guide roller 42 of the upstream work guide member 41 and also by a guide roller 52 of the downstream work guide member 61, the coating layer of coloured resist has been formed by contact with the coating composition, and the substrate is further transported upon the roller surface of the guide roller 62 of the downstream work guide member 61, to the work discharge member 71.

Various types of sensor are mounted upon each of the members of such film-forming apparatus 11, of which the main sensors are illustrated in FIG. 18.

First, a supplied material detection sensor 31a which detects the supply of the glass substrate 21, and a supplied material position detection sensor 31b which detects the position of the supplied glass substrate 21, are disposed in the work supply stage 31, and a vertical position detection sensor 41a which detects the vertical position of the glass substrate 21, a velocity sensor 41b which detects the speed reduction of the glass substrate 21, and a position detection sensor 41c which detects the position to which the leading side of the glass substrate 21 must be transported in order to stop at the upper position of the composition supply roller 52, are disposed in the upstream work guide member 41, a composition cut-off sensor 51a which detects the cutting off of the composition from the composition supply roller 52, and a level sensor 51b which detects the level of the coloured resist in the composition storage tank which supplies such composition to the coating member 51, are disposed in the coating member 51, a position detection sensor 61a which detects the position of the glass substrate 21 which has been transported to the downstream work guide member 61 is disposed in the downstream work guide member 61, and a position detection sensor 71a which detects the position of the glass substrate 21 which has been transported to the work discharge stage 71, and a vertical position detection sensor 71b which detects the elevation of the composition cut-off roller to the specified position, are disposed in the work discharge stage 71.

Transport Mechanism

The transport mechanism of the present apparatus is explained by reference to FIGS. 19 to 21 together with FIG. 22 and FIG. 23.

Figure 22:
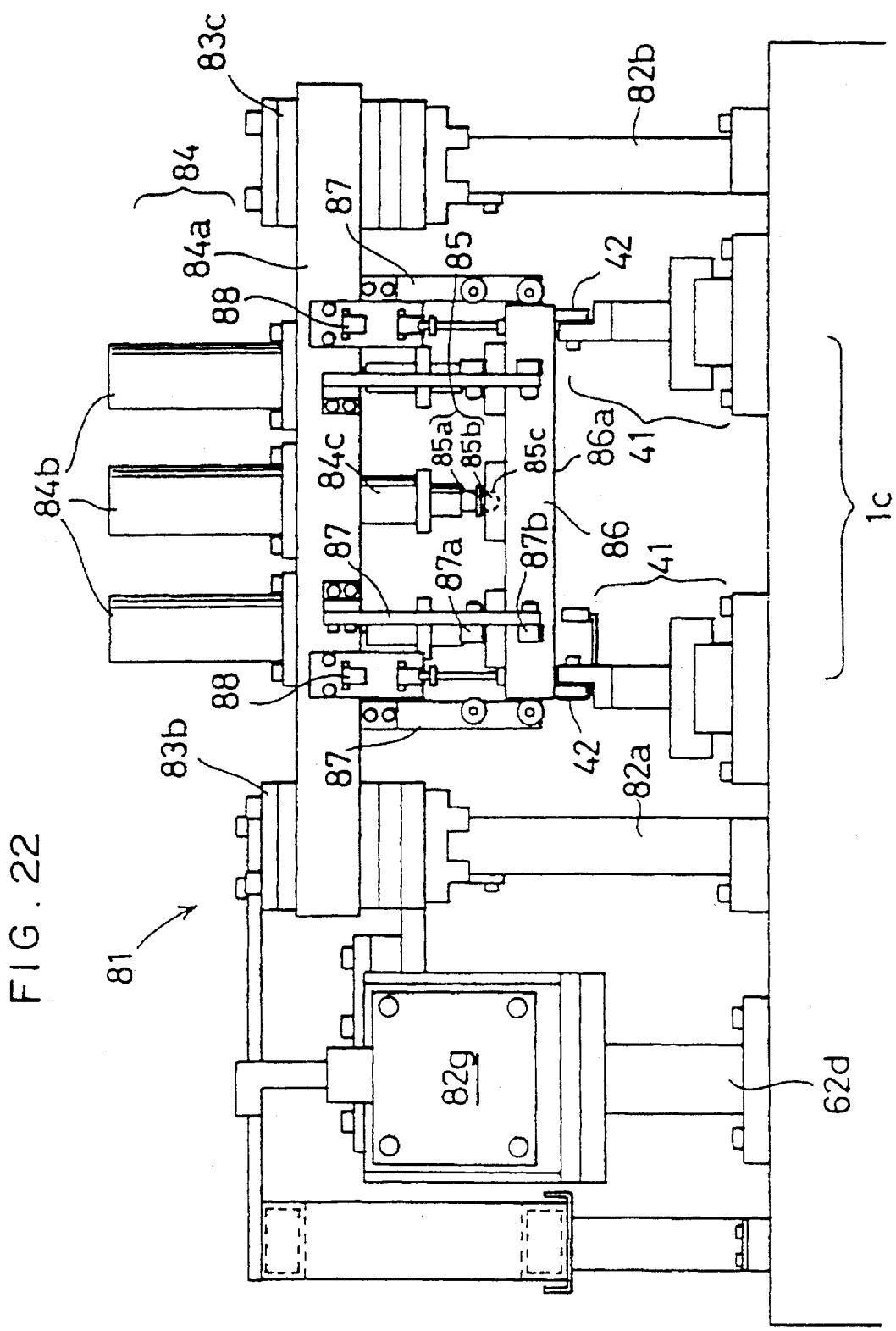
FIG. 22 is a side elevation which illustrates the construction of the transport mechanism of the film-forming apparatus illustrated in FIG. 18.
Figure 23:
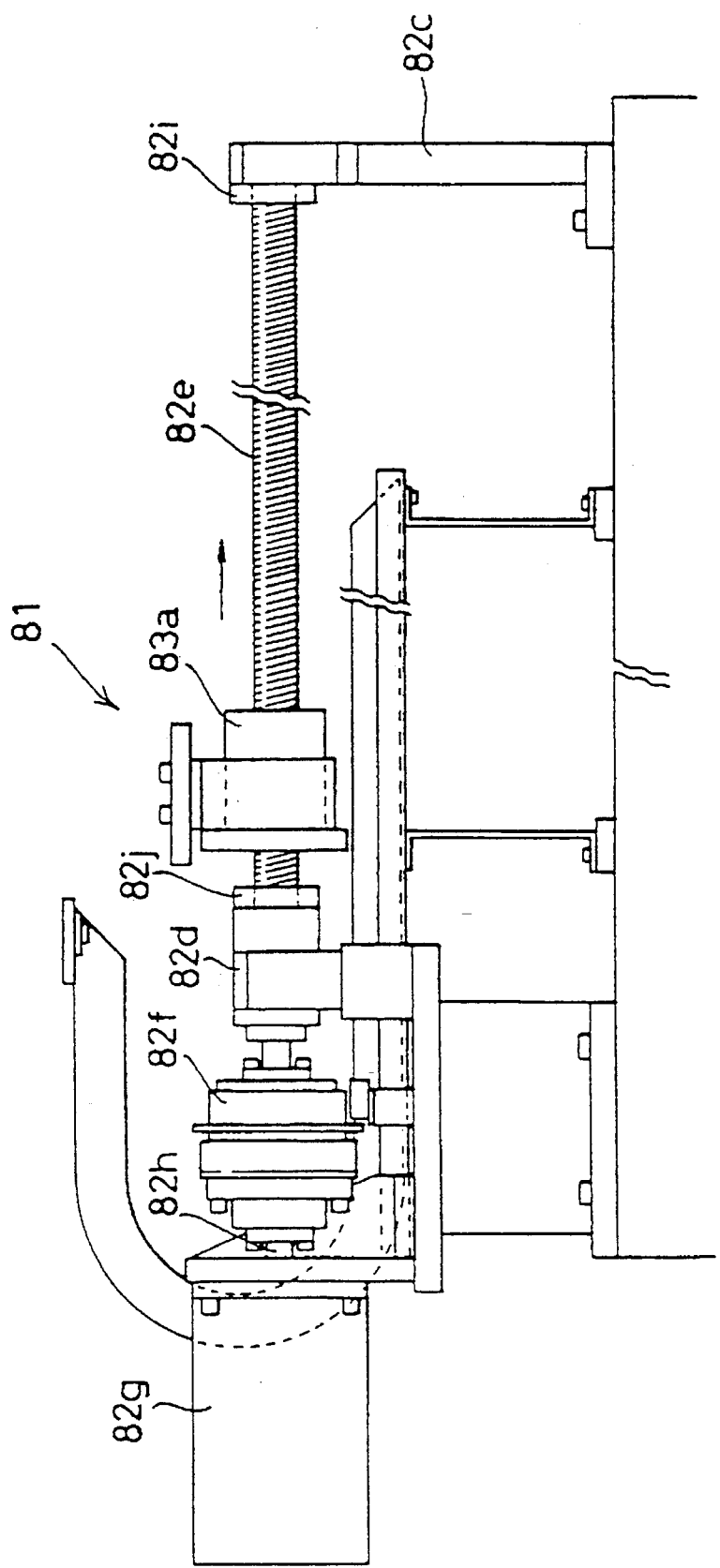
FIG. 23 is a front elevation of the construction of the horizontal transfer mechanism of the transport mechanism illustrated in FIG. 22.
Figure 28:
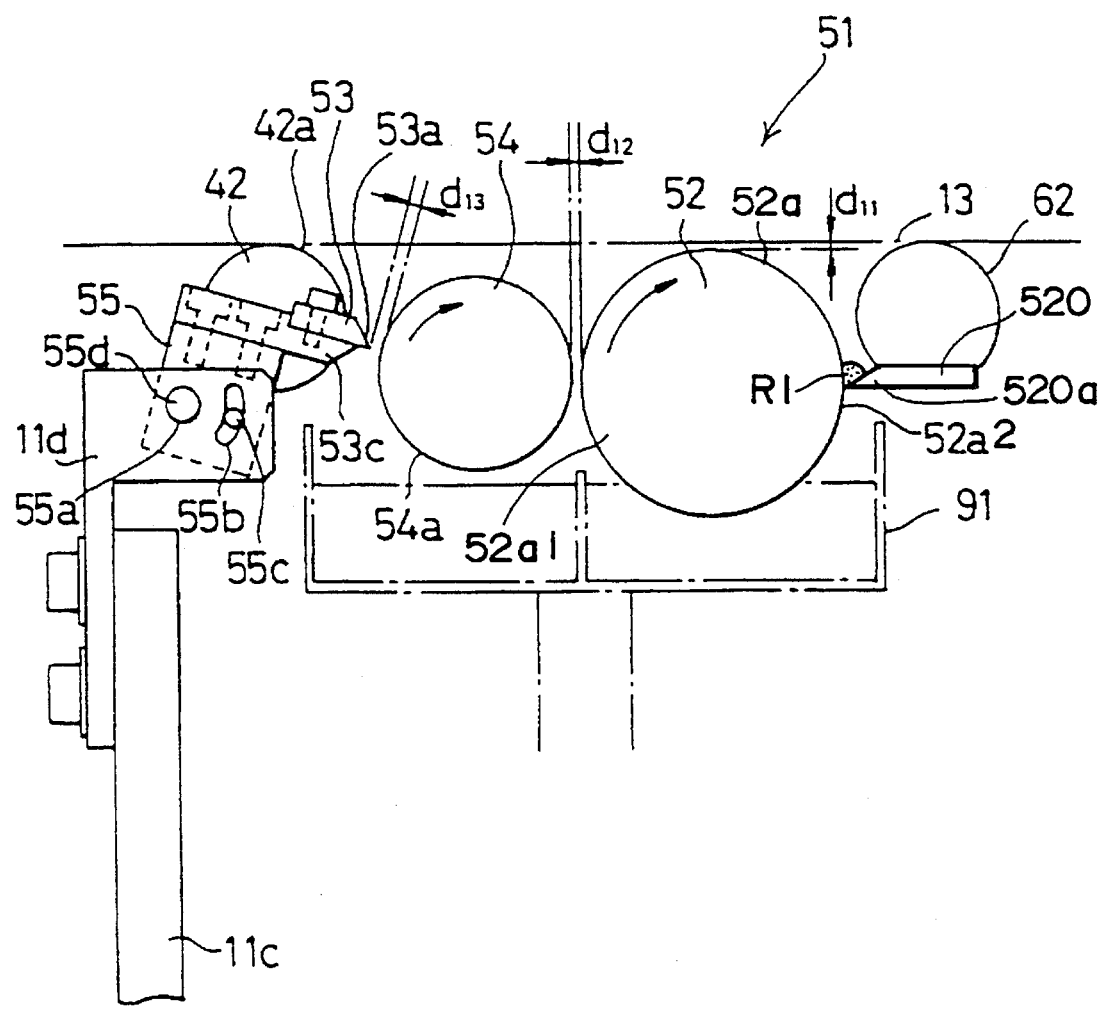
FIG. 28 is an outline constitutional diagram of the coating member of the film-forming apparatus illustrated in FIG. 18.

FIG. 22 is a side elevation which illustrates the upstream side of the transport mechanism, and FIG. 28 is a front elevation of the construction of the horizontal transfer means.

In these diagrams, two guide rails 82a and 82b are arranged from the upstream towards the downstream on both sides of a transport path 11c, and furthermore there is a screw shaft 82e between supporting units 82c and 82d on the outer side of the guide rail 82a. One end of the screw shaft 82e is connected through the supporting unit 82d to a reduction gear 82f, and the reduction gear 82f is connected to a drive shaft 82h of a transport member drive motor 82g. A slider 83a which contains a precision ball screw engaging the screw portion of the screw shaft 82e and which transmits the horizontal transport drive is disposed upon the screw shaft 82e, to form the horizontal transfer mechanism. The slider 83a communicates with a slider 83b on the guide rail 82a. Moreover, the slider 83b and a slider 83c on the guide rail 82b communicate through a supporting plate 84a of a vertical transfer mechanism (position fixing means) which is disposed in such a manner as to traverse the point above the transport path 11c. In this manner, the rotary drive of the drive shaft 82h (FIG. 23) of the transport member drive motor 82g rotates the screw shaft 82e and moves the slider 83a horizontally, while simultaneously moving the sliders 83b and 83c horizontally. At the leading end of the screw shaft 82e, a rubber sheet 82i is spread on the supporting unit 82c in such a manner as to enclose the circumference of the end of the screw shaft 82e, while at the opposite end of the screw shaft 82e, a rubber sheet 82j is placed on the supporting unit 82d in such a manner as to enclose the circumference of the opposite end of the screw shaft 82e, such as to moderate the shock caused by the contact of the slider 83a with the supporting units 82c and 82d.

Three air cylinder mechanisms 84b (vertical transfer means) are fixed to the upper surface of the supporting plate 84a such that leading end of a drive shaft 84c of the air cylinder mechanism 84b faces downwards, and a porous sintered chuck plate 86 which is larger than the glass substrate 21 communicates with the leading end of the drive shaft 84c through the universal joint 85 which is free to move in all directions. The lower surface of the chuck plate 88 forms an adsorption surface 86a (vacuum chuck surface), and by exerting suction within the chuck plate 86 through pipes which communicate with the exterior, the adsorption surface 86a fixes the entire reverse surface of the glass substrate 21 thereon. Moreover, the universal joint 85 forms a ball damper which is composed of a spherical leading end 85b of a shaft member 85a which communicates with the leading end of the drive shaft 84c, and the bearing 85c which has an aperture which corresponds to such spherical leading end member 85b. Hence, if for example, there are variations in the thickness of the glass substrate 21, and also if the upper surface of such glass substrate forms an inclined surface, the universal joint 85 bends to follow such inclined surface and the upper surface of the glass substrate 21 and the adsorption surface 86a of the chuck plate 88 are held securely together and retained there. Moreover, when such adsorption surface 86a is holding the glass substrate 21, and when the glass substrate 21 is positioned on the roller surface of the guide roller 42 of the upstream work guide member 41, the surface to be coated 21a of the glass substrate 21 may be held against the roller surface of the guide roller without any interval. Moreover, because the adsorption surface 86a exerts suction upon the entire region of the reverse surface of the glass substrate 21 and thereby retains it, the central portion of the glass substrate 21 is unable to bend when the glass substrate 21 is positioned on the roller. Furthermore, if there is a difference in temperature between the glass substrate 21 and the chuck plate 86, no irregularity in temperature can occur upon the surface to be coated 21a of the glass substrate 21 because there is contact across the entire region, such that the entire surface of the glass substrate remains in the same state. As a consequence, variations in the formation of film which are caused by irregularity in temperature in the surface to be coated 21a of the glass substrate 21 do not occur. Guides 87 to the chuck plate 86 are fixed with their leading ends facing downwards to the front, rear, left, and right surfaces of the supporting plate 84a, with guide rollers 87a disposed upon the guides 87 and guide rollers 87b disposed at the leading ends of the guides 87. Moreover, a photosensor mechanism 88 is mounted upon the front surface of the supporting plate 84a, which is able to detect the relative position of the chuck plate 86.

Work Supply Stage

Figure 24:
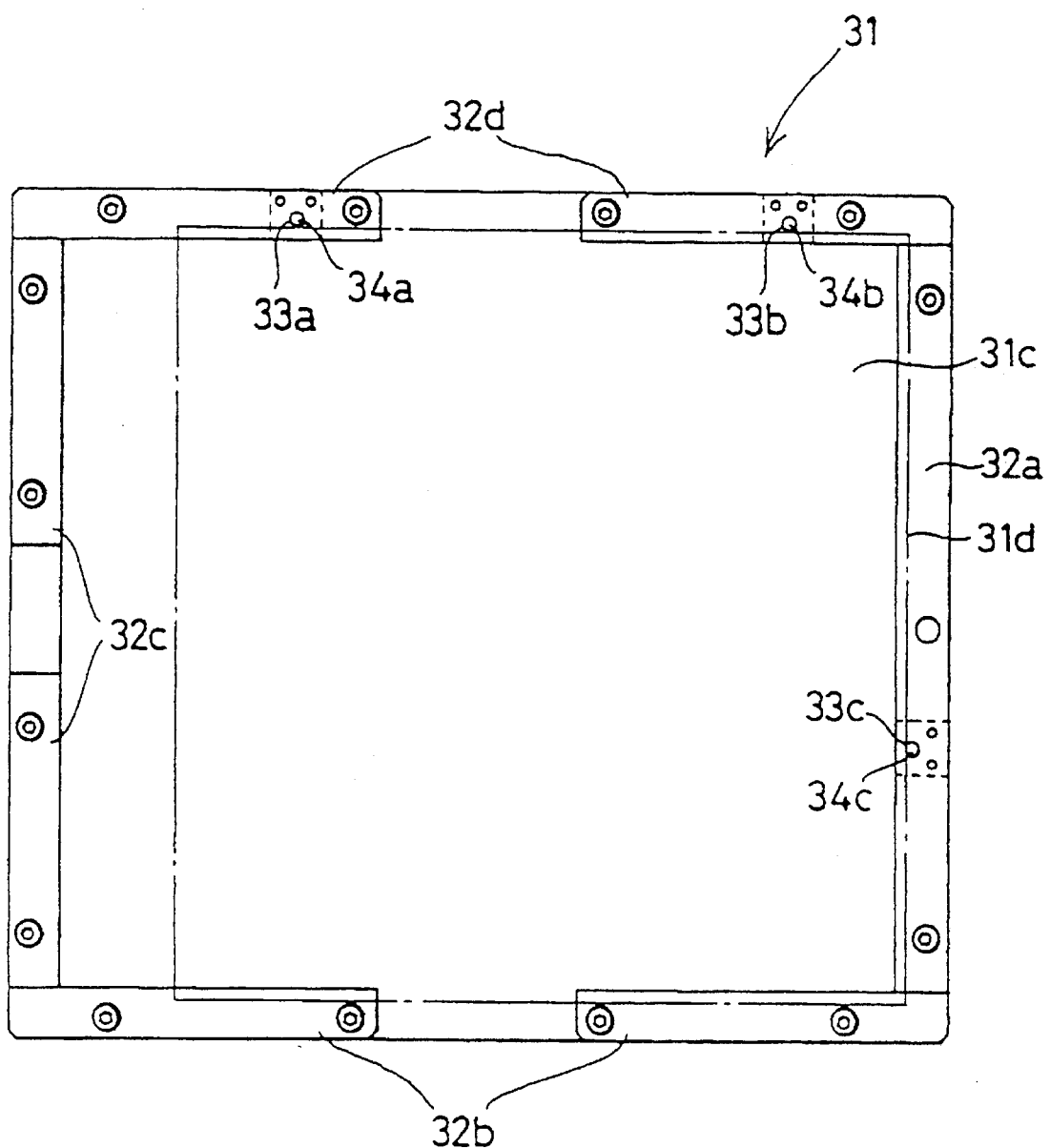
FIG. 24 is a plan view of the work supply stage of the film-forming apparatus illustrated in FIG. 18.

FIG. 24 is a plan view of the work supply stage 31.

The work supply stage 31 is disposed at the extreme upstream side of the film-forming apparatus 11, and frames 32a to 32d are mounted upon the upper surface of a supporting plate 31c of the work supply stage 31. Mounting apertures 33a, 33b and 33c which are provided with springs in their base surfaces are formed in the frames 32a and 32d, and base pins 34a, 34b and 34c which are directed towards the glass substrate 21 are mounted in such mounting apertures 33a, 33b and 33c. The two sides of the glass substrate 21 are positioned within the base pins 34a, 34b and 34c and the glass substrate 21 is loaded upon the frames 32a, 32b, and 32d, while the area 31d indicated by the dotted line forms the area in which the glass substrate 21 is loaded.

Thus when the chuck plate 86 is acting as a vacuum chuck for the glass substrate 21, the glass substrate 21 is held in contact with the chuck plate by the depression of the base pins 34a, 34b and 34c. Moreover, the supporting plate 31c is fixed to the side of the base lib through springs. Thus when the chuck plate 86 is acting as a vacuum chuck for the glass substrate 21, excessive force is not applied to the glass substrate 21. If an elongated glass substrate which is longer than the glass substrate 21 is employed, such glass substrate is supported by the frames 32a to 32d, and if the width of such glass substrate is similar to that of the glass substrate 21, no adjustment of the positions is required.

Upstream Work Guide Member

The upstream flow work guide member of the present apparatus is explained by reference to FIGS. 25 to 27, together with FIG. 19 to FIG. 22.

Figure 25:
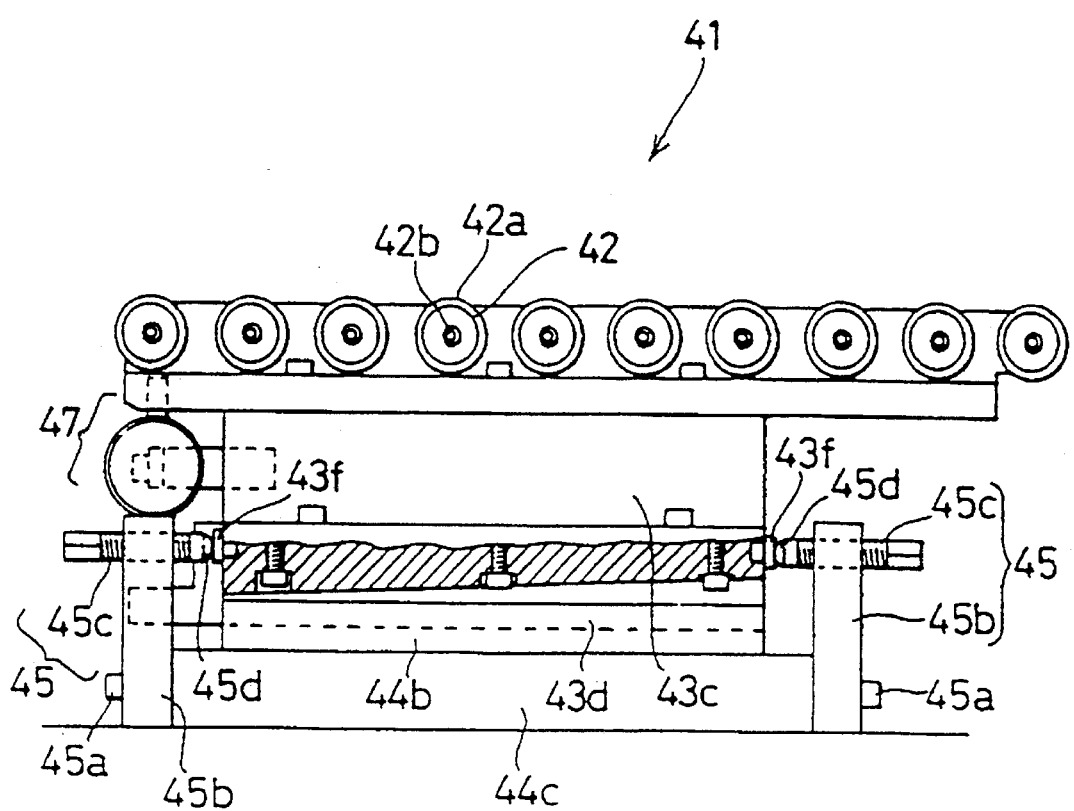
FIG. 25 is a front elevation of the upstream flow work guide member of the film-forming apparatus illustrated in FIG. 18.
Figure 26:
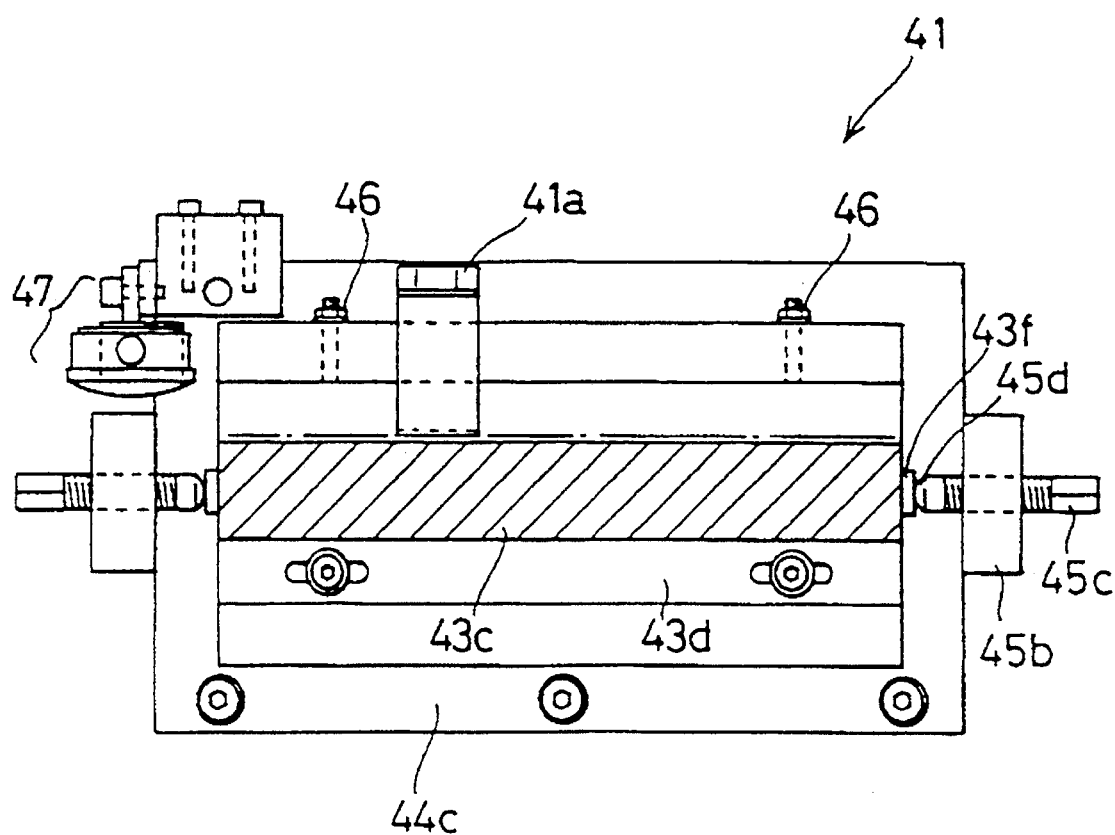
FIG. 26 is a cross-sectional plan view of the upstream flow work guide member of the film-forming apparatus illustrated in FIG. 18.
Figure 27:
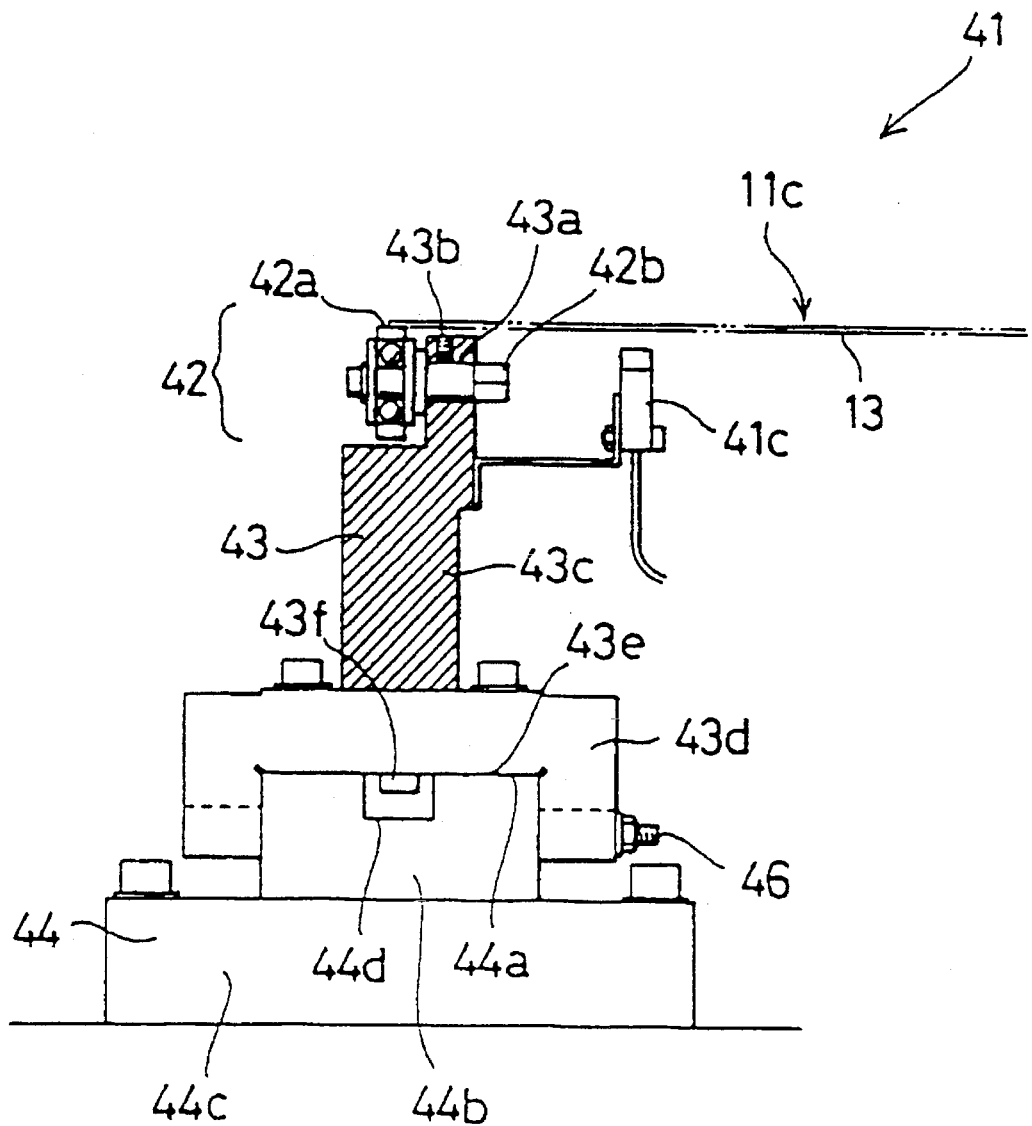
FIG. 27 is a cross-sectional view of the upstream flow work guide member of the film-forming apparatus illustrated in FIG. 18.

FIG. 25 is a front elevation of the upstream flow work guide member, FIG. 26 is a cross-sectional plan view of the upstream flow work guide member, and FIG. 27 is a cross-sectional view of the upstream flow work guide member.

In these figures, two sets of ten guide rollers 42 are disposed at either end of the transport path 11c in the upstream work guide member 41. Here, the guide rollers are disposed in two sets such that the roller surfaces 42a of the guide rollers 42 form a transport reference plane 13 for the glass substrate 21, and the width of such guide rollers is so set that the guide rollers 42 are able to support the ends of the glass substrate 21, and thus, as illustrated in FIG. 27, the ends of the glass substrate 21 are located at the centres of the roller surfaces 42a. For this reason, the ends only of the glass substrate 21 are uncoated regions, such that most of the area of the glass substrate can be effectively employed. Moreover, as the glass substrate 21 is directly positioned upon the roller surfaces 42a, the surface to be coated 21a becomes the standard for transport, such that other portions such as the reverse surface (supporting surface side) of the glass substrate 21 are not employed as the standard, and hence even if there are undulations or irregularities in the thickness of the glass substrate 21, the surface to be coated 21a can always be made to follow the roller surface 42a.

In the present embodiment, the positions of the two sets of guide rollers 42 may be disposed in such a manner that one row of rollers not to be in direct opposition to rollers of the other row, so that variation in the positioning of the glass substrate 21 that is being transported can be minimized. Eccentric shafts 42b (roller position adjustment mechanisms) are provided for such guide rollers 42 which always locate the axial centre at the position deviated from the centre of rotation, while such eccentric shafts are inserted in the mounting apertures 43a of an upper guide roller support 43, and screws 43b are employed to fix the eccentric shafts 42b to point different directions so that the vertical heights of roller surfaces 42a may be set individually for each guide roller 42.

Moreover, the upper guide roller support 43 provides a support block 43c to which a guide roller 42 is fixed, and a slide block 43d which acts as a base, while an inclined surface 43e having a gradient of approximately 2° longitudinally is formed upon the lower surface of the slide block 43d. A lower guide roller support 44 is disposed beneath the upper guide roller support 43, and such lower guide roller support 44 provides a slide block 44b which on its upper surface provides an inclined surface 44a which possesses a gradient of approximately 2° which corresponds to the inclined surface 43e, and a base block 44c which supports the slide block 44b. A groove 4d is formed upon the central portion of such inclined surface 44a of the slide block 44b, while when the support block 43c and the slide block 43d are fixed at the bottoms by the bolt 43f to the upper guide roller support 43, the head of the bolt projects, such that the inclined surface 43e of the slide block 43d and the inclined surface 44a of the slide block 44b are enabled to come into close contact. For this reason, by employing such inclined surfaces, the upper guide roller support 43 can be made to slide over the lower guide roller support 44, such that the vertical positions of all the roller surfaces 42a of the upper guide rollers 42 which are fixed to the upper guide roller support 43 can be adjusted together.

In the film-forming apparatus 11, in order to slide the upper guide roller support 43 and the lower guide roller support 44, a pair of delivery mechanisms 45 (support adjustment fixing means) which employ screw mechanisms is disposed in the two end surfaces of the upper guide roller support 43. Such delivery mechanisms 45 are formed of fixing blocks 45b which are fixed to the lower guide roller support 44 through bolts 45a, and delivery shafts 45c which consist of fine screw mechanisms and tapped holes formed in the upper portions of the fixing blocks 45b. The leading ends 45d of the delivery shafts 45c are spherical in shape, and bearings 43c whose shape is adapted to the shapes of such leading ends 45d are fixed in the slide block 43b. Thus, the position of the upper guide roller support 43 may readily be adjusted by employing the delivery mechanism 45, and the positions of the roller surfaces 42a of the guide rollers 42, which is to say the transport reference plane 13 for the glass substrate 21, may be set. Two sets of fixing spring mechanisms 46, which fix the upper guide roller support 43 and the lower guide roller support 44 by contact with the slide block 44b through the tapped hole that are formed in the slide block 43d, are formed in the side surfaces of the slide block 43d. The fixed position of the upper guide roller support 43 may be adjusted by employing the small dial gauge 47 which is mounted upon one of the fixing blocks 45b.

Coating Member

FIG. 28 is an outline diagram of the coating member 51.

In this figure, the doctor blade 53, the doctor roller 54, the coating composition supply roller 52, and the blade 520 which acts as the coating composition removal means for the coating composition supply roller 52, all of such being formed of stainless steel, are disposed along the transport path for the glass substrate 21 from the upstream side to the downstream side. In this embodiment, the coating composition supply roller 52 rotates in a clockwise direction with reference to FIG. 28, and with the composition storage tank 91 disposed at the position indicated by the lower dotted line, the roller surface 52a of the coating composition supply roller 52 rotates while immersed in the coloured resist, such as to lift the coloured resist upwards.

Moreover, the lateral position of the coating composition supply roller 52 is set such that, with the doctor roller 54 rotating in the same direction, the roller surface 54a of the doctor roller is interposed at a set distance $d_{12}$ from the roller surface 52a of the coating composition supply roller 52. For this reason, a part of the coloured resist that is raised by the coating composition supply roller 52 is removed from the surface of the roller 52a and transferred to the roller surface 54a, and such that an amount only of coloured resist which corresponds to the separation distance $d_{12}$ is carried upwards and is delivered in an approximately measured amount.

Moreover, the doctor blade 53 is situated adjacent to the lateral position of the doctor roller 54, and the coloured resist that is transferred to the roller surface 54a is then raised up and falls back into the composition storage tank 91. The leading edge 53a of the doctor blade 53 is interposed at a set separation distance $d_{13}$ from the roller surface 54a of the doctor roller 54, and hence the coloured resist which is raised up is a portion of that amount which adhered to the roller surface 54, while the amount of coloured resist that adheres to the roller surface 54a and is supplied upwards is determined by the separation distance $d_{13}$ and is delivered in an approximately measured amount, such that overall, the amount of coloured resist that is supplied upwards by the coating composition supply roller 52 is approximately measured. If the leading edge 53a of the doctor blade 53 in contact with the roller surface 54a, the full amount of the coloured resist can be raised up from the roller surface 54a, but by moving the apparatus in that state, such movement and friction cause the state of contact to change, and the amount of coloured resist that is supplied is thereby changed, which is the reason that the leading edge 53a is separated from the roller surface 54a. The guide roller 42 at the extremity of the upstream work guide member 41 is shown on the reverse side of the doctor blade 53, and the guide roller 62 of the downstream work guide member 61 is shown at the downstream side of the coating composition supply roller 52, while the surface to be coated 21a of the glass substrate 21 that is transported from the upstream work guide member 41 while positioned at the roller surface 42a of the guide roller 42 passes the coating member 51 and is moved beside the guide roller 62. In the present embodiment the guide rollers 42 and 62 are disposed adjacent to the coating member 51 such that any variation in the transport attitude of the glass substrate 21 may be controlled. Moreover the vertical positions of the roller surfaces of the guide roller 42 and of the guide roller 62 are set in such a manner that the transport reference plane 13 for the glass substrate 21 formed by such roller surfaces maintains the specified distance $d_{11}$ from the roller surface 52a of the coating composition supply roller 52, or in other words, as will be explained subsequently, such as to maintain the distance $d_{11}$ which enables the formation of the layer consisting of a pool of coloured resist between the glass substrate 21 and the roller surface 52a of the coating composition supply roller 52.

Figure 29A:
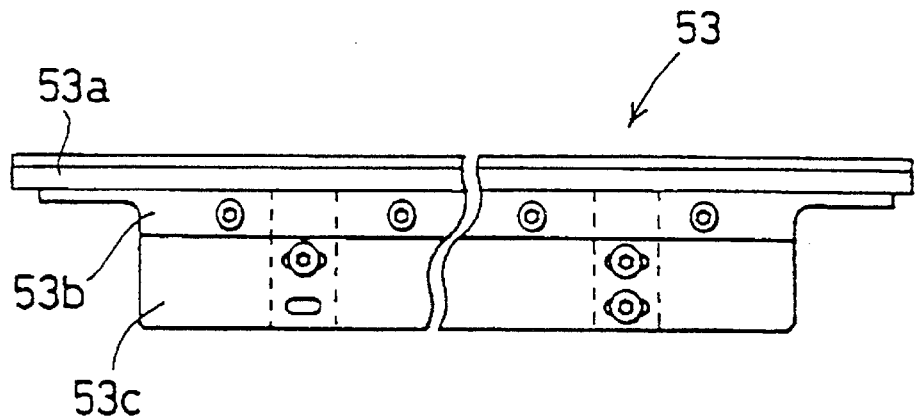
FIG. 29A is a plan view of the doctor blade of the coating member illustrated in FIG. 18.
Figure 29B:
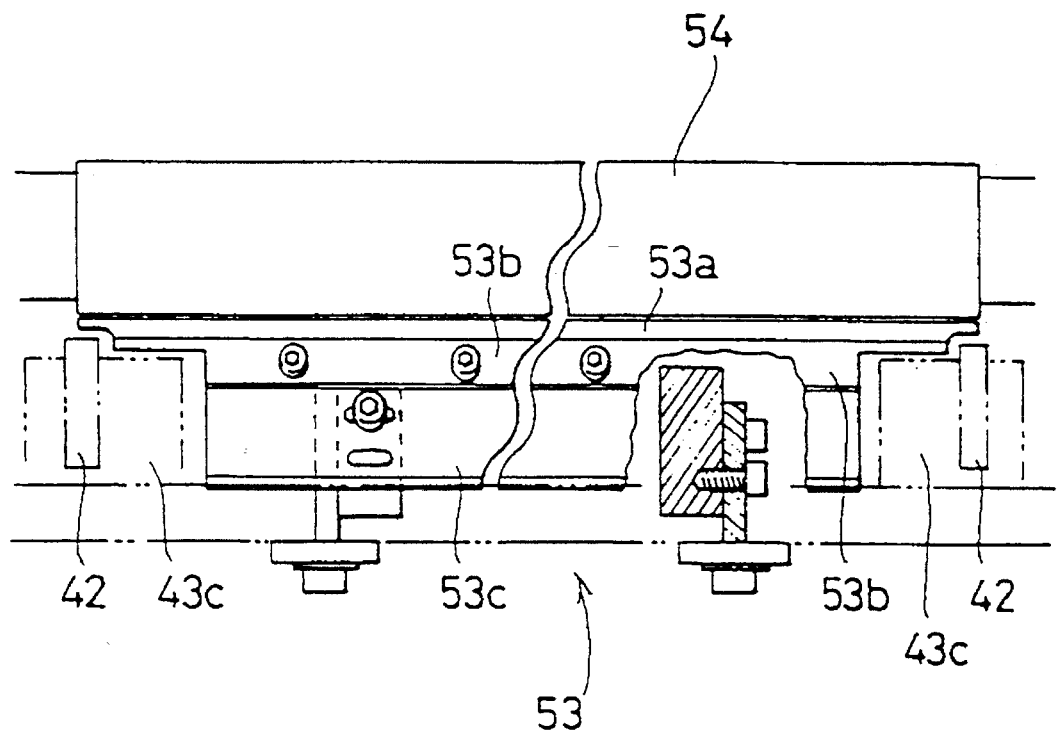
FIG. 29B is a plan view which illustrates the positional relationship of the doctor blade and the doctor roller of the coating member illustrated in FIG. 18.

Next the constitution of the doctor blade 53 is explained by means of reference to FIG. 28, together with FIGS. 29A and 29B.

FIG. 29A is a plan view of the doctor blade 53, and FIG. 29B is a plan view which illustrates the positional relationship of the doctor blade 53 with reference to the doctor roller 54.

In these figures, the doctor blade 53 consists of a leading member 53a which is approximately as wide as the doctor roller 54, a support plate 53b which is in part narrower and which communicates with the leading member 53a, and a support plate 53c to which the support plate 53b is fixed by a screw and whose width is approximately the same as the narrow portion of the support plate 53b, and wherein such support plate 53c forms the fixing member to the base lib of the doctor blade 53. In this manner, the base extremity of the doctor blade 53 is narrow and the guide rollers 42 of the upstream work guide 41 are disposed at the two sides of such narrow base extremity, and thus the constitution of the doctor blade is such that the glass substrate 21 may be transferred from the guide roll 42 towards the downstream work guide 81 without any variation in the transport attitude of the glass substrate 21. The upper surface of the edge of the leading member 53a is inclined in such a manner as to render thin such edge of the leading member 53a, and the lower surface of the leading side of the support plate 53c is an inclined surface so formed that the leading side becomes narrow towards the leading edge. Such leading edge of the leading member 53a is fixed in such a manner as to project outwards from the leading side of the support plate 53c.

As illustrated in FIG. 28, the doctor blade 53 having the constitution described in the foregoing through the fixing plate 55 which fixes the support plate 53c with screw is fixed to the support members 11c and 11d which rise from the side of the base 11a. The round aperture 55a and the position adjustment elongated aperture 55b are formed in the fixing plate 55, and the fixing plate 55 is fixed to the support member 11d through the fixing shaft 55c which is mounted in the round aperture 55a and through the fixing shaft 55d which is mounted in the elongated aperture 55b, such that the axis of rotation of the fixing plate 55 is the fixing shaft 55d, while the mounting attitude of the doctor blade 53 may be varied, and the distance $d_{13}$ between the roller surface 54a of the doctor roller 54 and the leading member 53a may be adjusted, by adjusting the fixing position of the fixing shaft 55c with reference to the elongated aperture 55b.

Figure 30A:
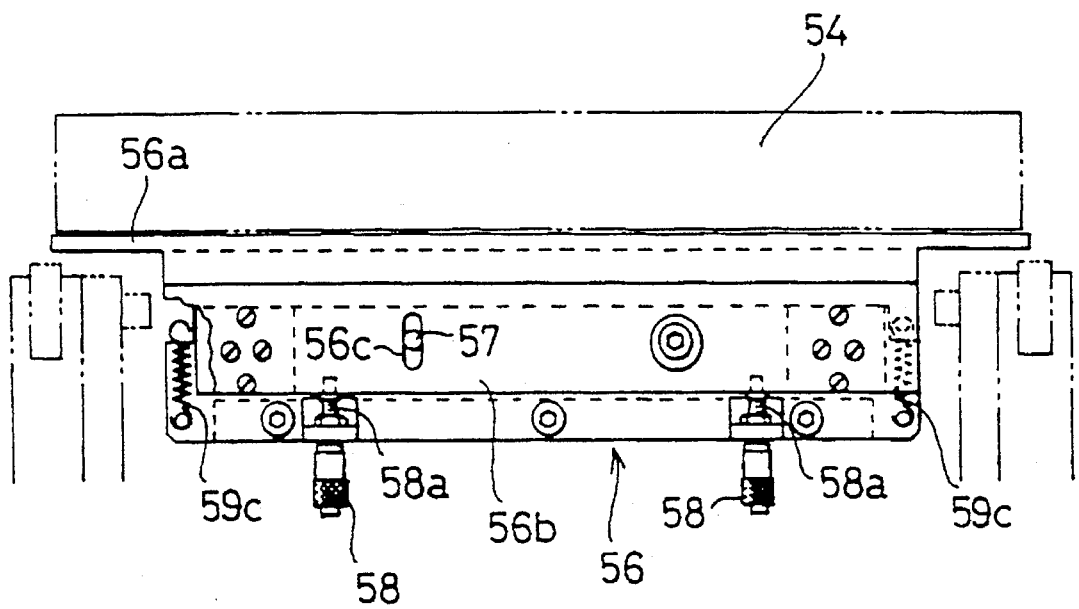
FIG. 30A is a plan view of an alternative doctor blade to the doctor blade illustrated in FIG. 29A.
Figure 30B:
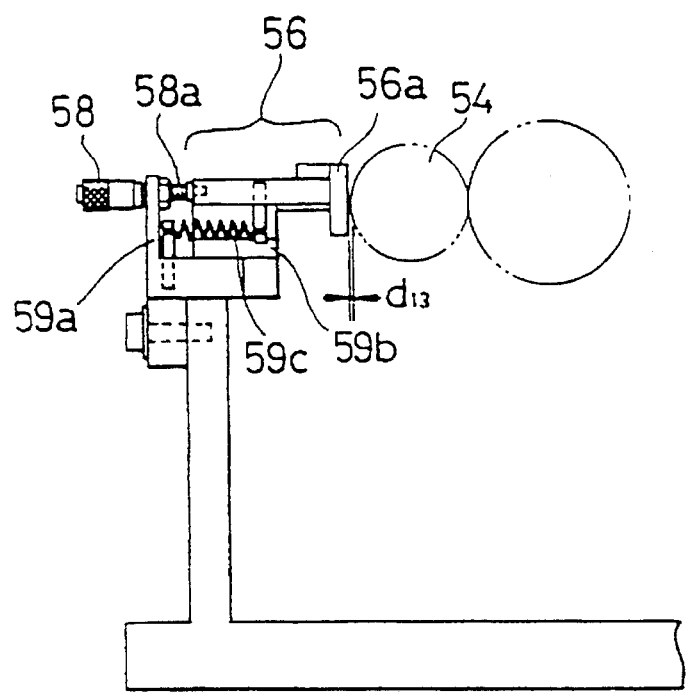
FIG. 30B is a side elevation which illustrates the disposition and constitution of such doctor blade.

The constitution shown in FIG. 30A and FIG. 30B may also be employed for the doctor blade.

FIG. 30A is a plan view of an alternative doctor blade, and FIG. 30B is a side elevation which illustrates the disposition of such doctor blade.

As these diagrams show, the leading side of the doctor blade 56 possesses a plate member 56a, and the leading surface of the plate member 56a is disposed in opposition to the roller surface of the doctor roller 54 in such a manner as to maintain the specified interval $d_{13}$ thereto. In this manner, it is possible to ensure with certainty that the coloured resist which is raised up falls back with certainty. The position adjustment mechanism for the doctor blade 56 is formed of the elongated aperture 56c which is mounted in the base extremity 56b of the doctor blade 56, the tightening bolt 57 which is mounted in the elongated aperture 56c, the micrometer 58 whose head 58a is in contact with the rear extremity of the doctor blade 56, and the spring 59c which is disposed between the support member 59a which supports such micrometer 58 and the support member 59b which supports the doctor blade 56. When such constitution of the doctor blade is employed, the micrometer 58 is employed in order to establish the separation interval between the doctor blade 56 and the doctor roller such as to facilitate adjustment. Moreover, when the doctor roller 54 and the doctor blade 56 are repeatedly moved horizontally relative to each other, the development of stripes and other irregularities in the thickness of the coloured resist upon the roller surface of the doctor roller 54 may also be prevented. Such mechanism may also be employed with the relationship between the doctor roller 54 and the coating composition supply roller 52 which will be described subsequently.

Figure 31:
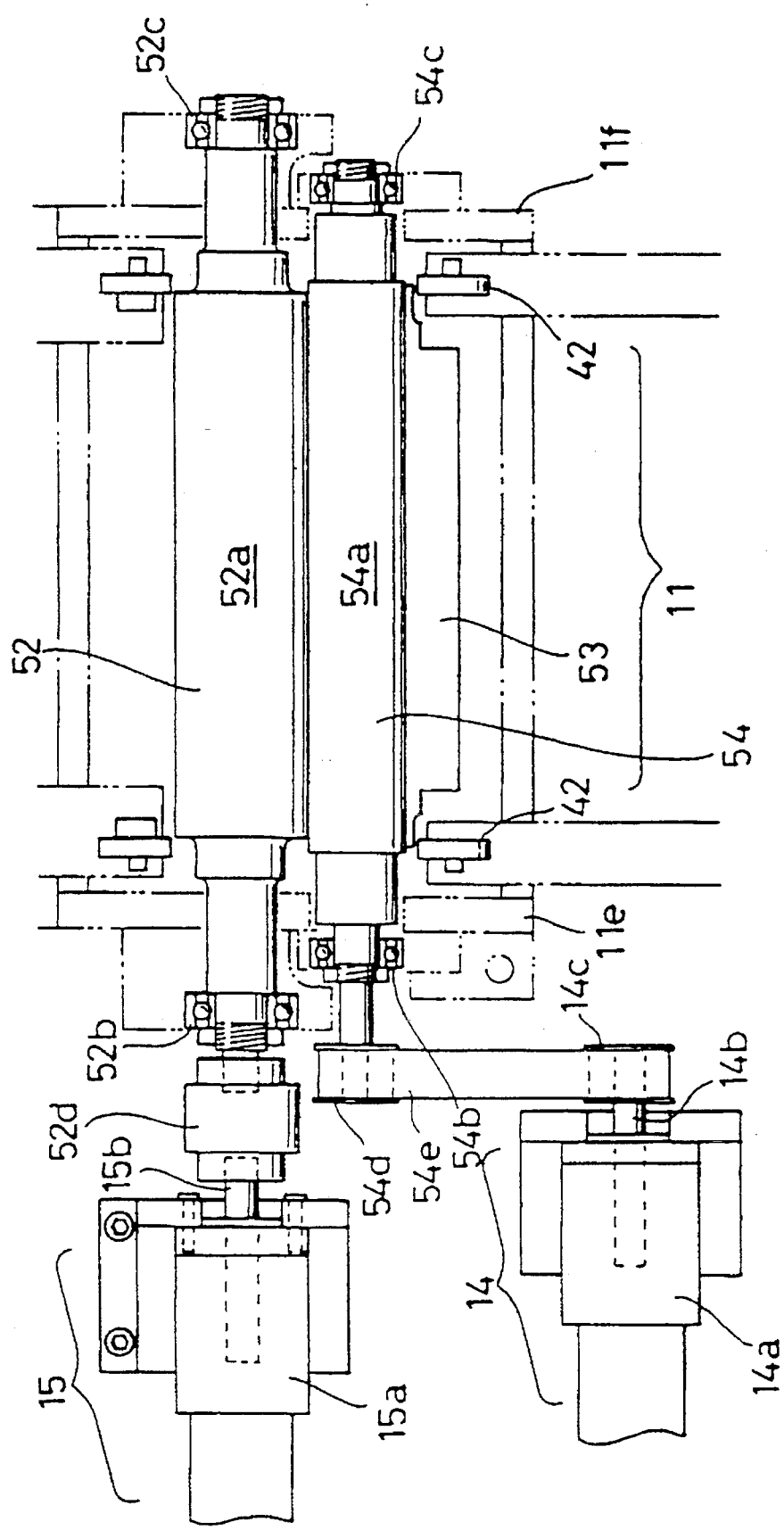
FIG. 31 is a plan view of the doctor roller, coating composition supply roller, and their drive systems for the coating member illustrated in FIG. 18.

Next, the constitution of the doctor roller 54 is described by reference to FIG. 31 and FIG. 32.

Figure 32:
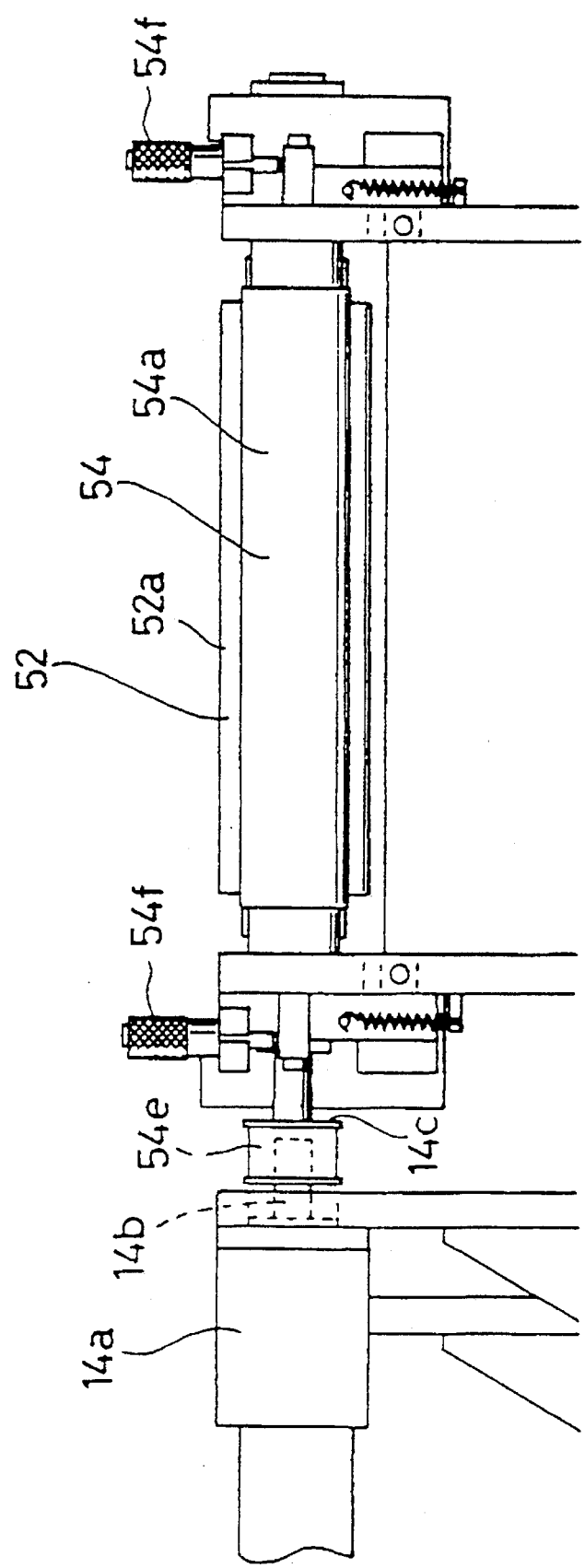
FIG. 32 is a side elevation of the doctor roller and the coating composition supply roller of the coating member illustrated in FIG. 18.
Figure 33:
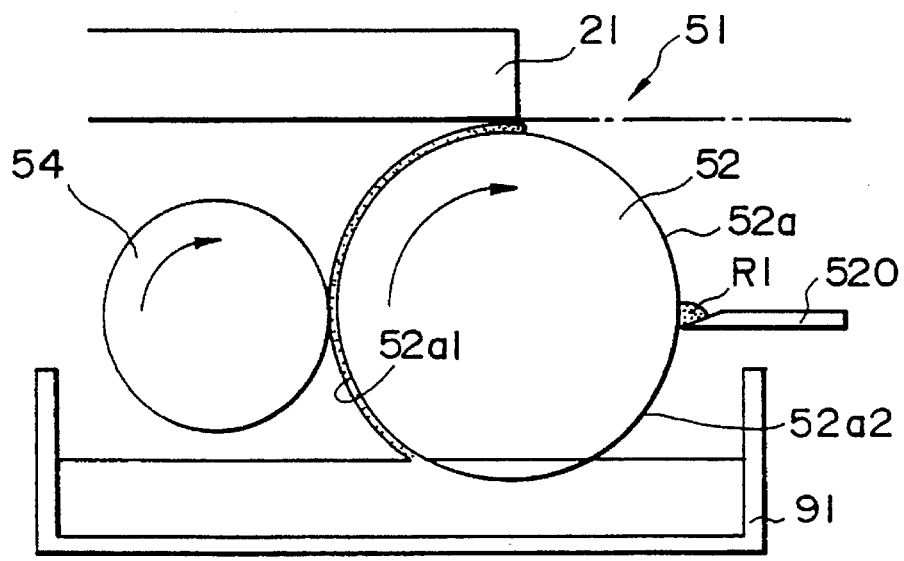
FIG. 33 is a diagram which illustrates the action of the coating member illustrated in FIG. 18.
Figure 34:
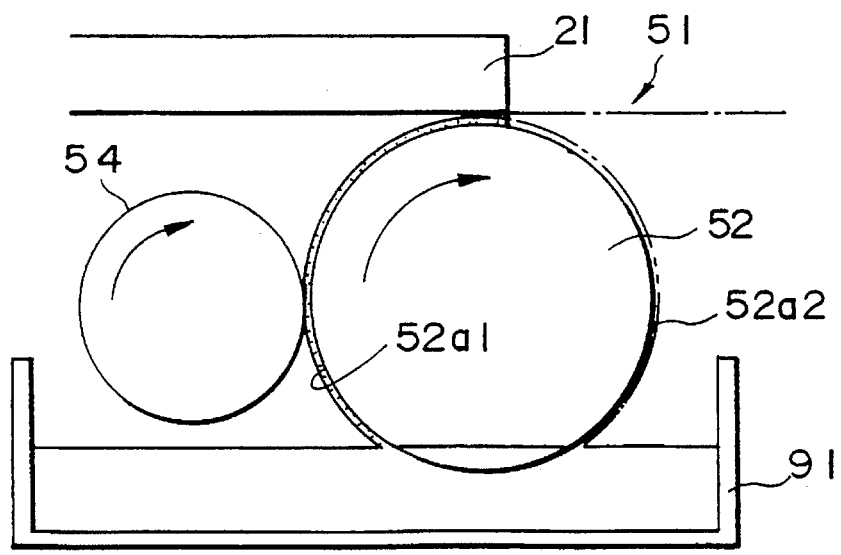
FIG. 34 is a diagram which illustrates the action of a comparative example of the coating member.

FIG. 81 is a plan view of the doctor roller 54, the coating composition supply roller 52, and their drive systems, and FIG. 32 is a side elevation from the upstream of the preceding.

In these figures, the doctor roller 54 possesses a roller surface 54a which possesses a smooth surface of approximately the same width as the glass substrate 21, and both ends of the shaft of the doctor roller 54 are supported by the bearings 54b and which are fixed to the frames 11e and 11f which are disposed on both sides of the transport path 11c for the glass substrate 21, while the pulley 54d fixed to the leading extremity of one of the ends of the shaft is connected to the doctor roller drive system 14 through the rotary timing belt 54e. The doctor roller drive system 14 possesses a constitution in which the rotary timing belt 54e is connected to the pulley 14c which is fixed to the drive shaft 14b of the drive motor 14a. The fixing position of the doctor roller 54 is adjusted by employing the micrometer 54f whose head is in touch with the end of the shaft of the doctor roller 54.

Next, the constitution of the coating composition supply roller 52 is described by reference to FIG. 31 and FIG. 32.

In these figures, the coating composition supply roller 52 possesses a roller surface 52a whose width is approximately the same as that of the glass substrate 21, such surface being smooth. The two ends of its shaft are supported by bearings 52b and 52c which are fixed to the frames 11e and 11f and which are located further to the outside than the bearings 54b and 54c, and the leading extremity of one end of such shaft is connected to the coating composition supply roller drive system 15 through the junction 52d. The coating composition supply roller drive system 15 possesses a constitution wherein the drive shaft 15b of the drive motor 15a communicates with the junction 52d. The width of the coating composition supply roller 52 is less than that of the glass substrate 21, and hence excess coating does not adhere to the outer edge of the coating zone (marginal zone), such that the entire coated surface is employed and material efficiency is good.

Next, the blade 520 which removes the coloured resist from the surface of the coating composition supply roller 52 is described.

As illustrated in FIG. 28, the blade 520 is disposed downstream from the coating member 51, and the leading end 520a of the blade 520 is placed in such a manner as to touch the roller surface 52a of the coating composition supply roller 52. The constitution and support means of the blade 520 are basically identical with those of the doctor blade 53 which was described in the foregoing, and therefore are not described in detail. Thus a blade 520 which is similar to the doctor blade 53 which is illustrated in FIG. 29A may be employed, and moreover, a support mechanism having the same constitution as that illustrated in FIG. 28 may be employed as the support mechanism for such blade 520.

In this manner, in the downstream side from the coating member 51, the blade 520 is placed in such a manner as to touch the roller surface 52a of the coating composition supply roller 52, such that the resist adhering to the surface 52a of the coating composition supply roller 52 may be removed at the upstream side of the composition storage tank 91. As a result, the state of the roller surface 52a is made always uniform immediately before its immersion in the coloured resist in the composition storage tank 91. The operation of removal of the coating composition by the blade 520 cannot completely remove all the coloured resist upon the roller surface 52a of the coating composition supply roller 52, but at this stage the most important consideration is that the surface condition of the coating composition supply roller 52 which is immersed in the composition storage tank 91 should be uniform. By making uniform the surface of the coating composition supply roller 52 in this way, when the coating composition supply roller 52 passes through the composition storage tank 91 and forms a new coating, it is virtually unaffected by the coating formed in the previous cycle, such that the doctor roller 54 is able to supply a coating of a precisely controlled thickness along the transport path to the glass substrate 21.

Such blade 520 may appropriately be constituted of for example stainless steel or polystyrene. For stainless steel, SUS 304 should preferably be employed. As the aforementioned coating composition supply roller 52 is always formed of stainless steel, if the blade 520 is formed of stainless steel, the contact characteristics of both will be good, and it will be possible to remove with certainty the coloured resist that adheres to the surface of the coating composition supply roller 52. However, if a blade formed of stainless steel is employed for a long period such as for example 50 hours or more, the surface of the coating composition supply roller becomes scratched. While such scratches are very fine, if the coating that is formed upon the glass substrate is examined, it will be found that parallel stripe-shaped irregularities in the thickness of the coating appear upon the glass substrate in the direction of the transport of the glass substrate. Such differences in the thickness of the coating are of several hundred Å in size, but it can be confirmed by transmitted light for some type of colour.

In order to overcome such problem, the material employed for the blade 520 should preferably be polystyrene, which is not as hard as stainless steel. As polystyrene is more flexible than stainless steel, the contact characteristics of the blade 520 with the coating composition supply roller 52 are improved, and such blade may be employed for a longer period. However, when a blade that employs polystyrene is employed, such blade is readily chipped through impact or the like, and for example the edge of the blade may become chipped through fragments of glass that become caught in the coating composition supply roller. In order to minimise such problems caused by the employment of a blade formed of stainless steel or of a blade formed of polystyrene, the parts should be replaced frequently.

Figure 35:
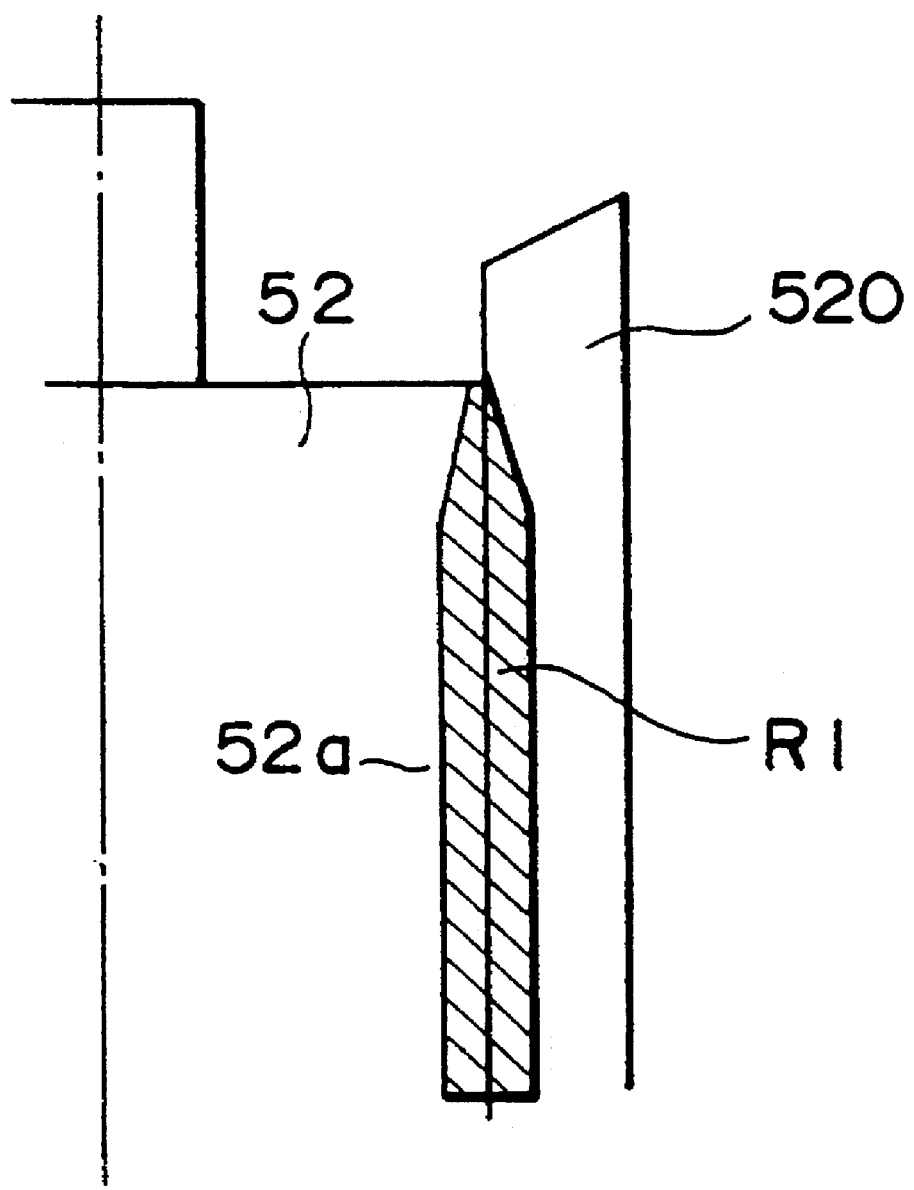
FIG. 35 is a diagram which illustrates the relationship between the coating composition supply roller and the doctor blade illustrated in FIG. 28.

The following inconvenience is caused by the employment of the blade 520. Thus the coloured resist R1 which is carried up by the blade 520 as illustrated in FIG. 35 remains in the void created between the roller surface 52a of the coating composition supply roller 52 and the blade 520, and drops from the extremity of the coating composition supply roller 52 into the composition storage tank 91. In this case, different amounts of retained coloured resist R1 are retained at the centre and at the extremities of the coating composition supply roller 52. For this reason, in a strict sense, local variations occur in the thickness of the film which remains upon the surface of the coating composition supply roller 52, and this causes a discrepancy in the amount of resist that is developed at the next cycle of the coating application process. This causes the problem to arise of the greater thickness of the resist film at the two edges of the glass substrate than in the middle of the glass substrate. Such disparity in the thickness of the film is very slight, but the uniformity of the film is lost when an extremely thin coating is formed.

Next, the following describes an alternative embodiment of a constitution of the coating composition removal means in order to resolve such problems of the blade 520 as were described in the foregoing.

Figure 36:
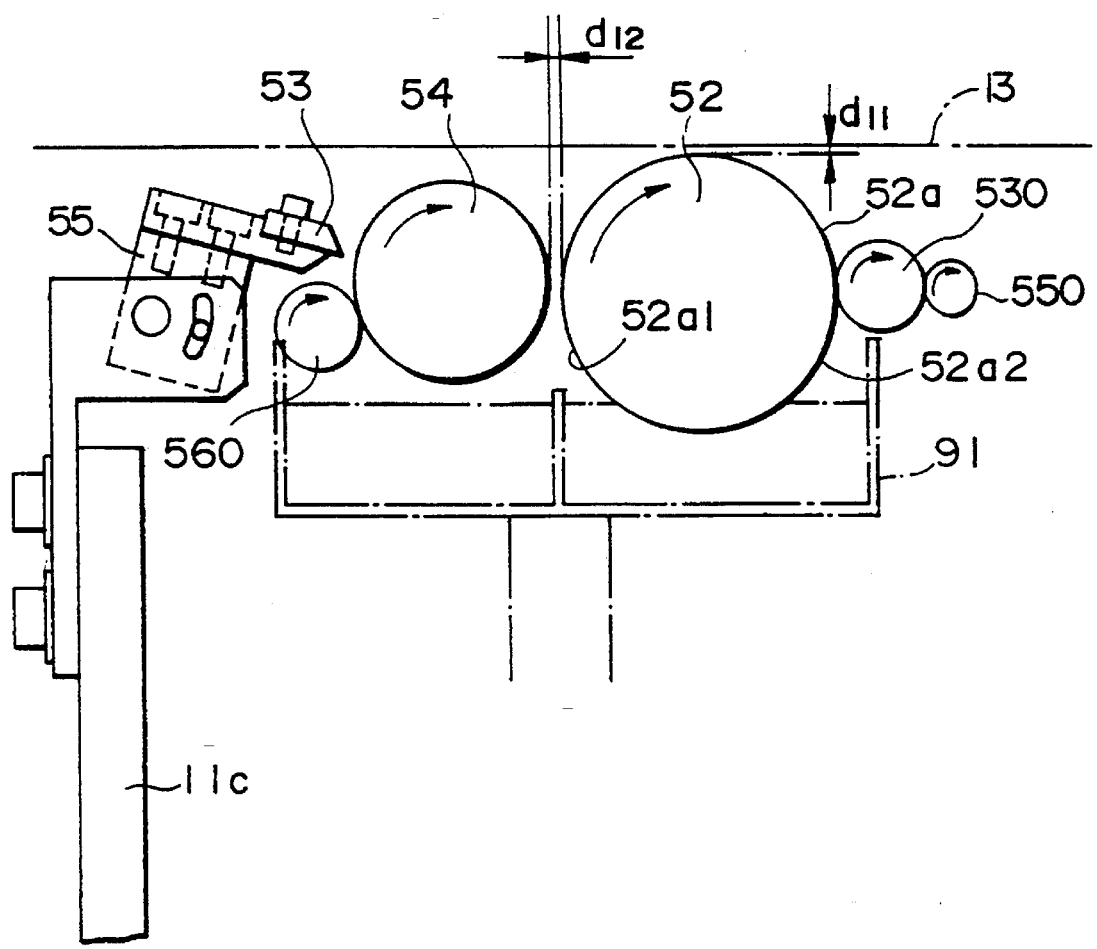
FIG. 36 is an outline diagram which illustrates an alternative example of the constitution of the coating composition removal means.
Figure 37:
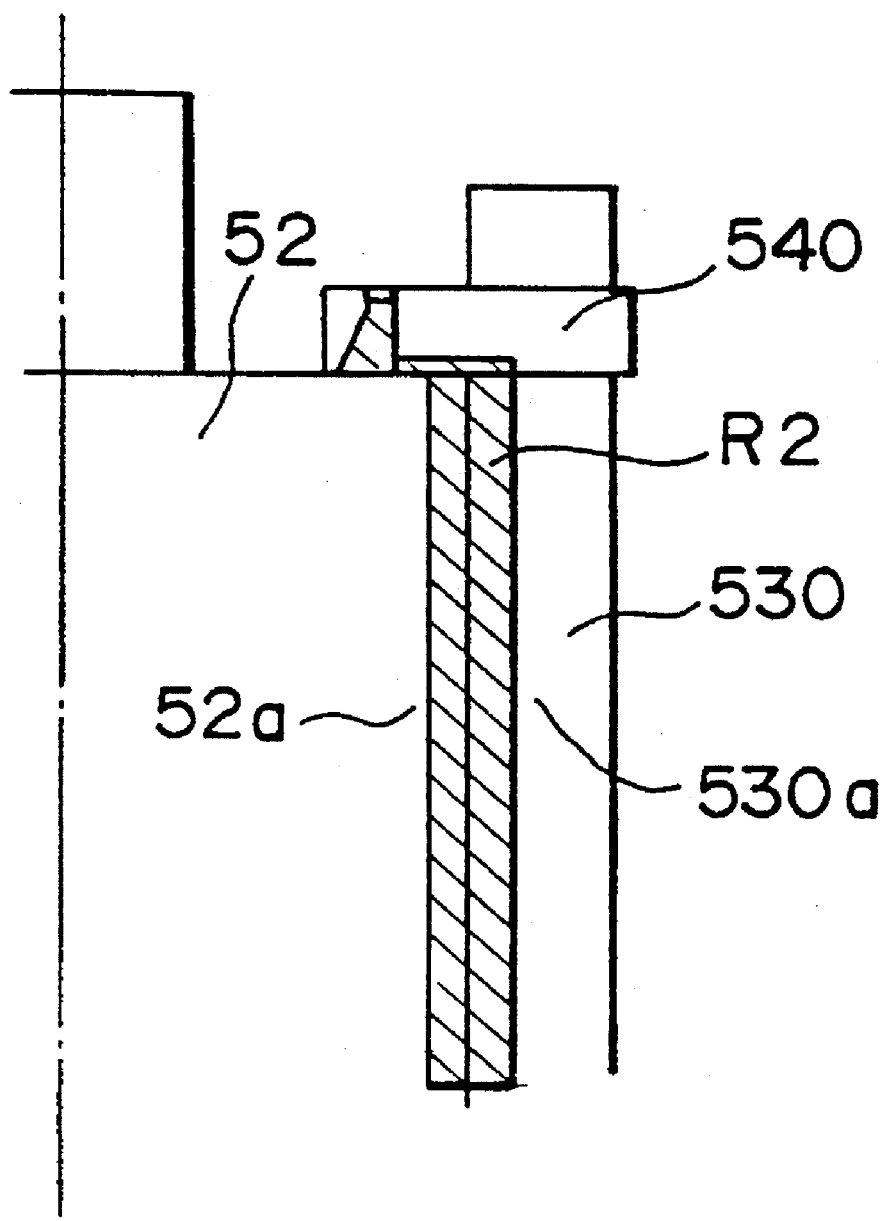
FIG. 37 is a diagram which illustrates the relationship between the coating composition supply roller and the coating composition removal roller of the coating member illustrated in FIG. 36.

FIG. 36 illustrates the disposition of a removal roller 530 being an alternative embodiment of a constitution of the coating composition removal means, and FIG. 37 is a partial plan view of the essential members of the removal roller 530.

Figure 38:
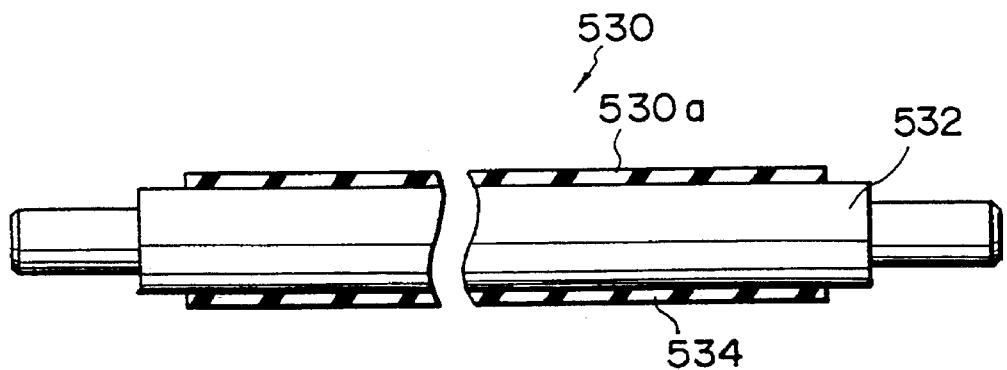
FIG. 38 is a cross-sectional view which illustrates the constitution of the removal roller.

The removal roller 530 is formed of a shaft 532 which is formed of for example SUS 304 stainless steel, and a covering layer 534 which is formed upon the exterior of the shaft 532, as illustrated in FIG. 38. The material of which the covering layer 534 is formed must possess a sufficient resistance to wear such as to be capable of withstanding contact over a long period with the coating composition supply roller 52, and must be resistant to the solvents for the coloured resist. The solvents for the coloured resist may be organic solvents such as MNP, IPA, ethyl alcohol, methyl alcohol, γ-butyrolactone, ECA, cyclohexanone, xylene, or butyl acetate, or aqueous solvents such as water, acetic acid, potassium hydroxide, or aminosilane. As a result of tests on various materials in order to select materials which had adequate resistance to organic solvents and to acids and alkalis, it was adjudged that silicone rubber, nitrile rubber and fluororubber may satisfactorily be employed to form the covering layer 534.

Figure 39A:
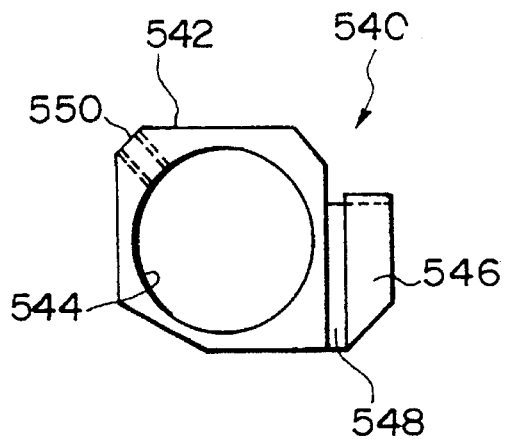
FIG. 39A is a view of the composition stop adjustment mechanism viewed from one end.
Figure 39B:
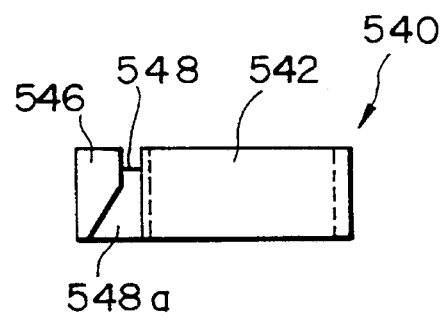
FIG. 39B is a plan view of the composition stop adjustment mechanism illustrated in FIG. 39A.

Moreover, composition retaining adjustable members 540 are disposed at the ends of the removal roller 530 in such a manner as to contact the ends of the coating composition supply roller 52 as illustrated in FIG. 37 (only one adjustable member illustrated). Such composition retaining member 540 possesses a mounting member 542 which possesses an insertion aperture 544 into which is inserted the shaft 532 and a composition receiving member 546 which extends to the side of the mounting member 542 and which is capable of contacting the extremity of the removal roller 530, as is illustrated in FIG. 39A and FIG. 39B. A groove member 548 which receives the coloured resist R2 which accumulates between the coating composition supply roller 52 and the removal roller 530 is disposed in the composition receiving member 546. A coloured resist receiving member 548a which faces the supply roller 52 and which is wide, is formed in the upper surface of the groove member 548. Such receiving member 548a is so designed as to cause the accumulation of a specified amount of coloured resist. Moreover, a screw communicating member 550 which is employed in order to fix the composition retaining adjustable member 540 is provided in the coating member 542.

By the provision of such composition retaining adjustable member 540, it is possible to supply the amount of coloured resist that is retained in the void formed between the roller surface 52a of the coating composition supply roller 52 and the removal roller 530 uniformly along the width of the coating composition supply roller 52 as illustrated in FIG. 37, and hence to ensure that the roller surface 52a of the coating composition supply roller 52 remains in a uniform state.

For reasons of ease of formation, the avoidance of damage by wear to the coating composition supply roller 52, resistance to solvents, and the minimisation of the generation of wastes, a polyethylene or teflon resin of very high molecular weight should preferably be employed as the material for the composition retaining adjustable member 540.

Figure 40:
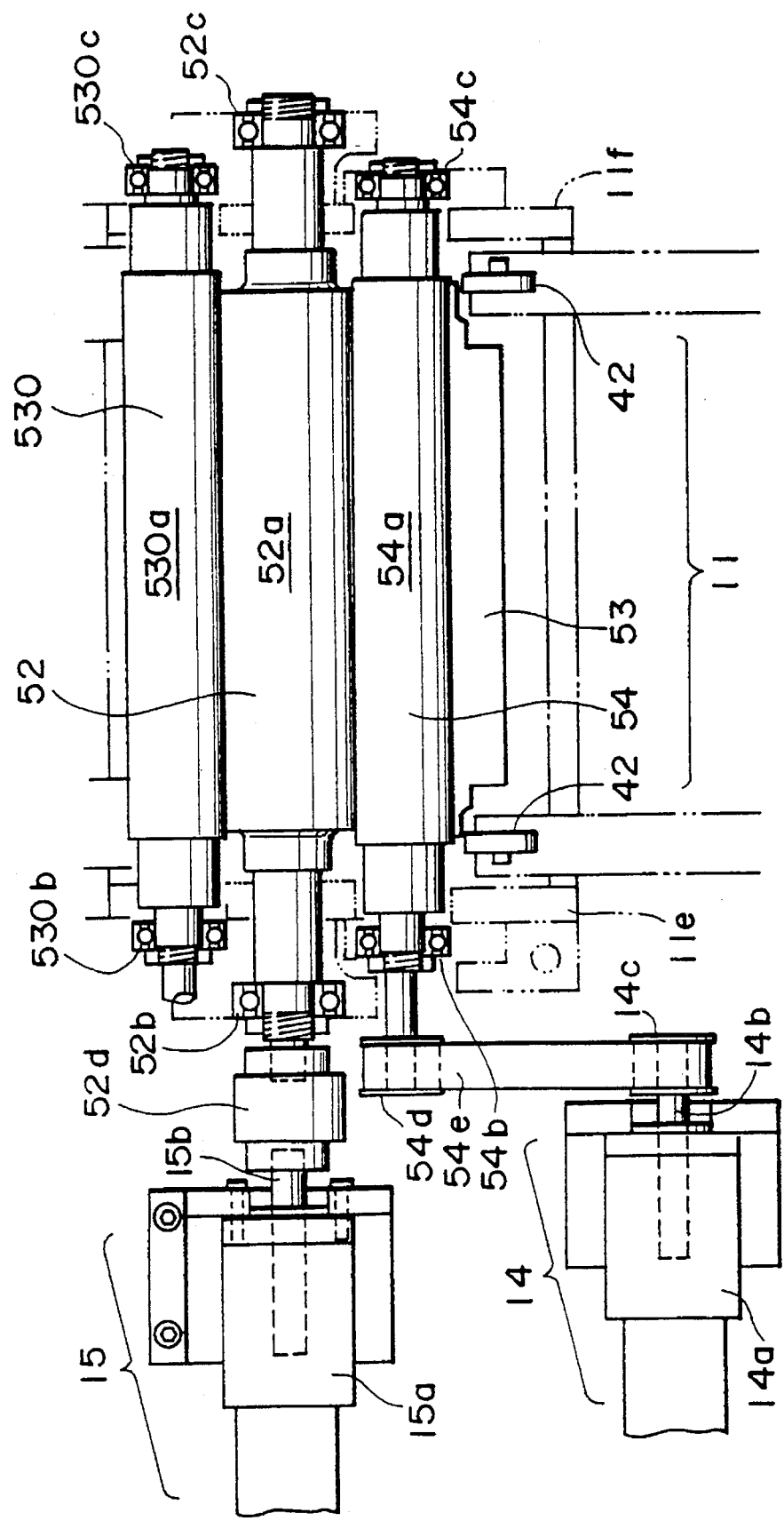
FIG. 40 is a plan view of the doctor roller, coating composition supply roller, and removal roller and of their drive mechanisms.

The removal roller 530 is supported at both ends by bearings 530b and 530c in the same manner as the coating composition supply roller 52 and the doctor roller 54, as illustrated in FIG. 40, in such a manner that it may be rotated by the motor which is not illustrated. Thus the removal roller 530 is so disposed that under a specified pressure it contacts the coating composition supply roller 52. When the removal roller 530 is pressed into contact with the coating composition supply roller 52, the areas of contact surfaces of both rollers are expanded, and the coloured resist upon the roller surface 52a of the coating composition supply roller 52 may be lifted up without unevenness.

In this case, it is important that a uniform pressure be applied to all points of the removal roller 530 with reference to the coating composition supply roller 52.

Moreover, the doctor roller 54 and the removal roller 530 should preferably be provided with cleaning rollers 560 and 550 as illustrated in FIG. 36. Such provision of cleaning rollers 560 and 550 allows the uniform lifting up of the resist from the doctor roller 54 and from the removal roller 580, and enables a further enhanced uniformity of the coating upon the roller surface 52a1 of the coating composition supply roller 52.

Moreover, a flat plate-like member such as a glass plate may be employed as the coating composition removal means for the coating composition supply roller 52. The doctor blade 56 and its position adjustment mechanism as illustrated in FIG. 30A and FIG. 30B may be employed as such plate-like member and its supporting mechanism. The plate-like member formed of glass is preferable if the solvent for the resist is an organic solvent which would attack rubber. Moreover, such plate-like member may be formed of the same material as the glass substrate 21.

Downstream Work Guide Member

The downstream work guide member 61 possesses guide rollers 62 which are disposed on both sides of the transport path 11c and which are disposed downstream of the coating member 51 and a vertical adjustment mechanism which allows the roller surfaces of the guide rollers 62 to be set to a specified height, which consists of a vertical adjustment mechanism for each of the guide rollers 62 which employ eccentric shafts for the guide rollers 62 and a general vertical adjustment mechanism for the guide rollers 62 by supports 63 for the guide rollers 62, as illustrated in FIG. 19 and FIG. 20. Because the principal members of the downstream work guide 61, being the guide rollers 62 and the supports 58 et cetera, possess the same constitution as the upstream work guide member 41 which is illustrated in FIG. 25 to FIG. 27, the description of such members is omitted.

Discharge Member

Figure 41:
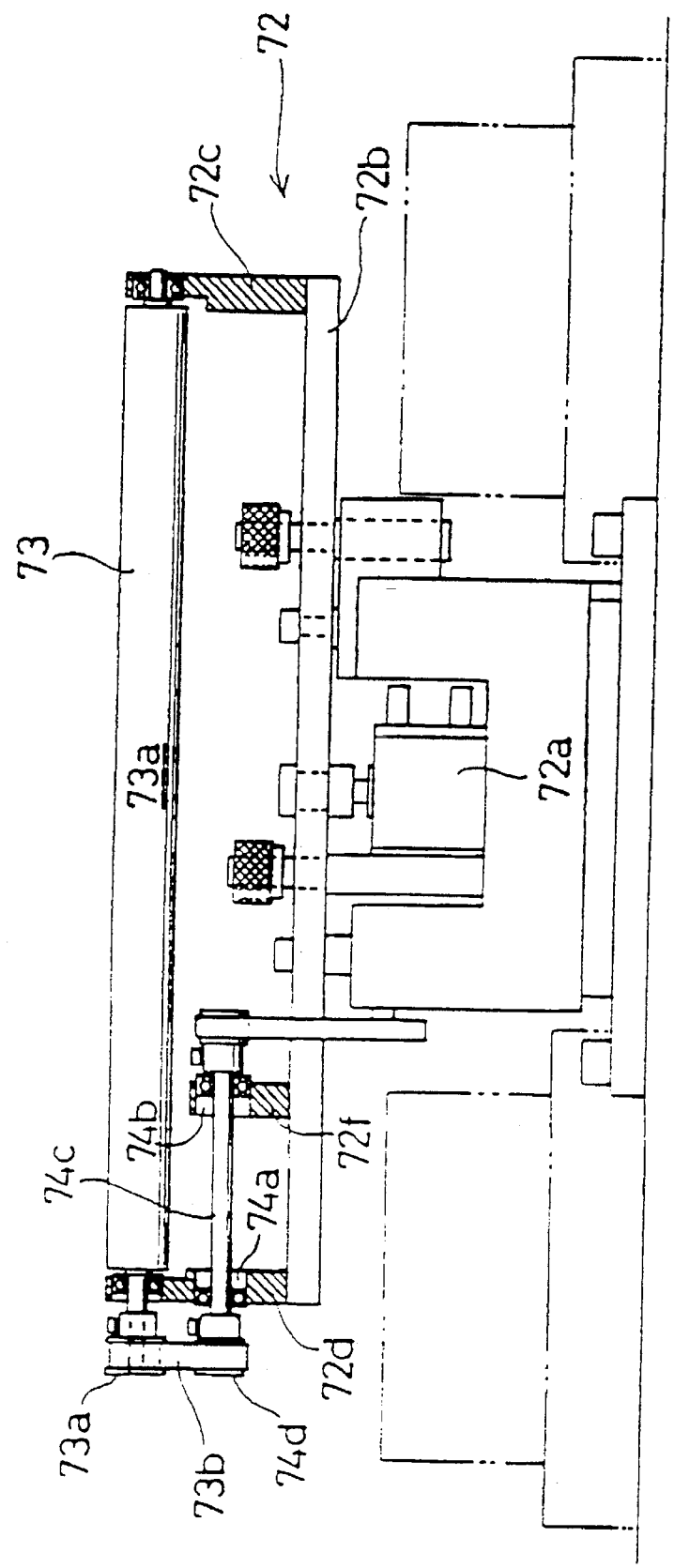
FIG. 41 is a front elevation of the composition removal mechanism of the film-forming apparatus illustrated in FIG. 18.
Figure 42:
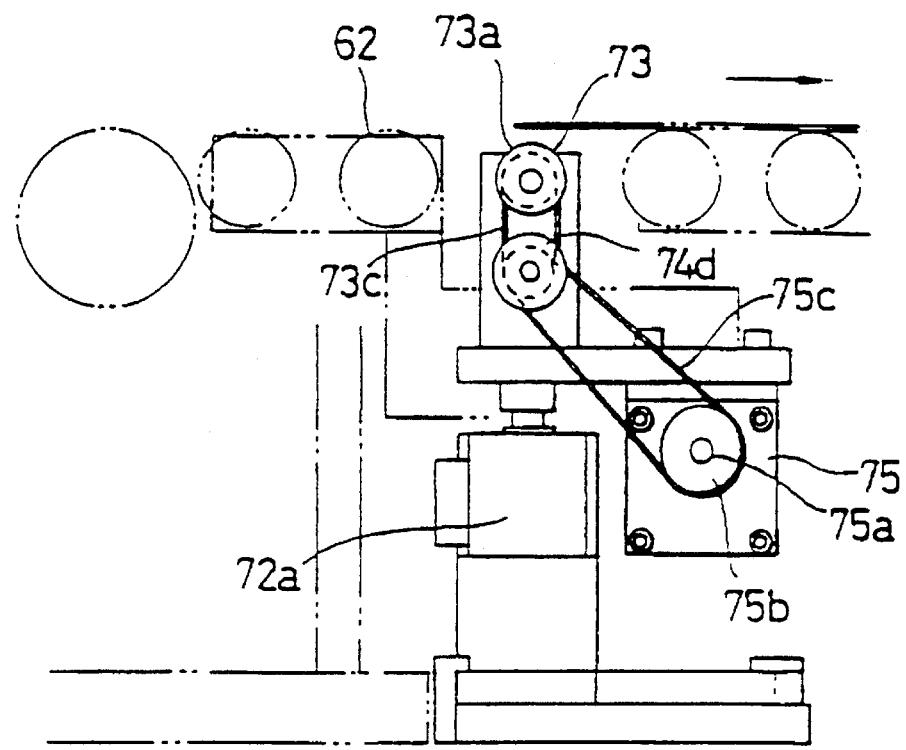
FIG. 42 is a side elevation of the composition removal mechanism illustrated in FIG. 41.

In the present embodiment of the film-forming apparatus 11, the work discharge member 71 is disposed at the extreme downstream side of the transport path for the glass substrate 21, and thereafter the glass substrate 21 upon which the film has been formed is discharged from the film-forming apparatus 11 to the next process by the discharge mechanism, as illustrated in FIG. 19 and FIG. 20. In this case, a composition removal mechanism 72 which contacts the leading or rear end of the glass substrate 21 and which removes the surplus coloured resist which adheres to the glass substrate 21 is disposed immediately prior to the point of discharge from the film-forming apparatus 11. The constitution of such composition removal mechanism is illustrated in FIG. 41 and FIG. 42. As known mechanisms are employed for such discharge mechanism, drawings and explanation thereof are omitted.

FIG. 41 is a front elevation of the composition removal mechanism, and FIG. 42 is a side elevation of the composition removal mechanism.

Figure 43:
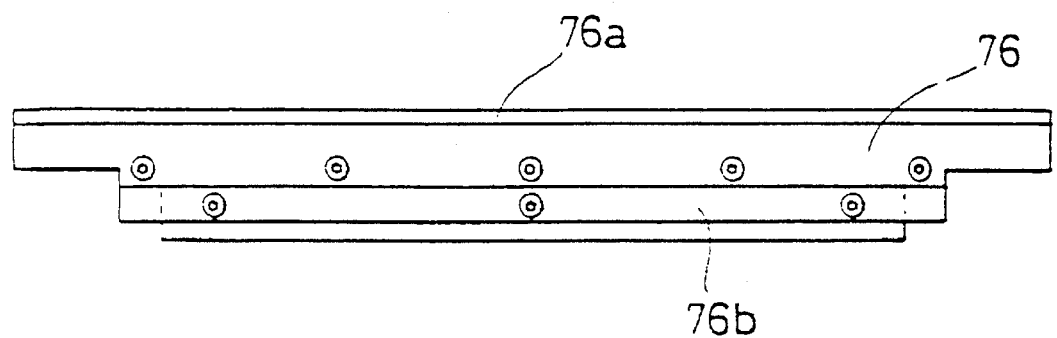
FIG. 43 is a plan view of the doctor blade that is disposed in the composition removal mechanism illustrated in FIG. 41.

In these diagrams, the composition removal mechanism 72 possesses a cylinder mechanism 72a (composition removal member movement means) which is affixed to the base 1ib, a support plate 72b which is affixed to the leading side thereof, roller bearing plates 72c and 72d which extend upwards from both sides of the support plate 72b, and a composition removal roller 73 (composition removal member) the ends of whose shaft are supported by the roller bearing plates 72c and 72d. The shaft bearings 74a and 74b are mounted at an intermediate position upon one of the roller bearing plates 72d and upon the support plate 72f which rises from an intermediate position upon the support plate 72b, and such shaft bearings 74a and 74b support the transmission shaft 74c. The differential pulley 74d is affixed to one end of the transmission shaft 74c, and as illustrated in FIG. 42, a rotary timing belt 73c is extended between one differential surface of such differential pulley 74d and the pulley 73a which is affixed to the end of the shaft of the composition removal roller 73, while a rotary timing belt 75c is extended between the other differential surface of such differential pulley 74d and the pulley 75b which is affixed to the end of the drive shaft 75a of the drive motor 75 for the composition removal roller, and while the roller surface 73a of the composition removal roller 73 is rotating, it may come into contact with the rear end of the glass substrate 21, and if required, the leading end of the glass substrate 21. Moreover, the doctor blade 76 which is illustrated in FIG. 43 is disposed in opposition to the roller surface 73a of the composition removal roller 73 in such a manner as to remove the coloured resist which adheres to the roller surface 73a of the composition removal roller 73. Such doctor blade 76 possesses a leading member 76a which possesses a width corresponding to the width of the roller surface of the composition removal roller 73, and a fixed member 76b which acts as a base and whose width is less than that of the composition removal roller 73, in a similar manner to the doctor blade 53 which is illustrated in FIG. 29A and FIG. 29B, and such doctor blade 76 is affixed through such fixed member 76b in such a manner as to fit the specified separation interval between the composition removal roller 73 and the leading member 76a. A cleaning pad such as a suction pad may also be employed in place of the doctor blade 76, or in addition to the doctor blade 76.

The composition removal mechanism 72 having such constitution comes into contact with the rear end of the glass substrate 21 from below, and if necessary at the leading end of such glass substrate, and removes the surplus coloured resist from the rear end or from the leading end, and does not make contact with the other surface.

Thus when composition removal treatment is performed, the cylinder mechanism 72a raises the glass substrate 21 to the transport reference plane 13, but if such composition removal treatment is not required, the glass substrate may be removed downwards from such transport path 13.

Composition Storage Tank and Pipes

The composition storage tank which stores the coloured resist and the pipes are explained by reference to FIG. 44 to FIG. 46.

Figure 44:
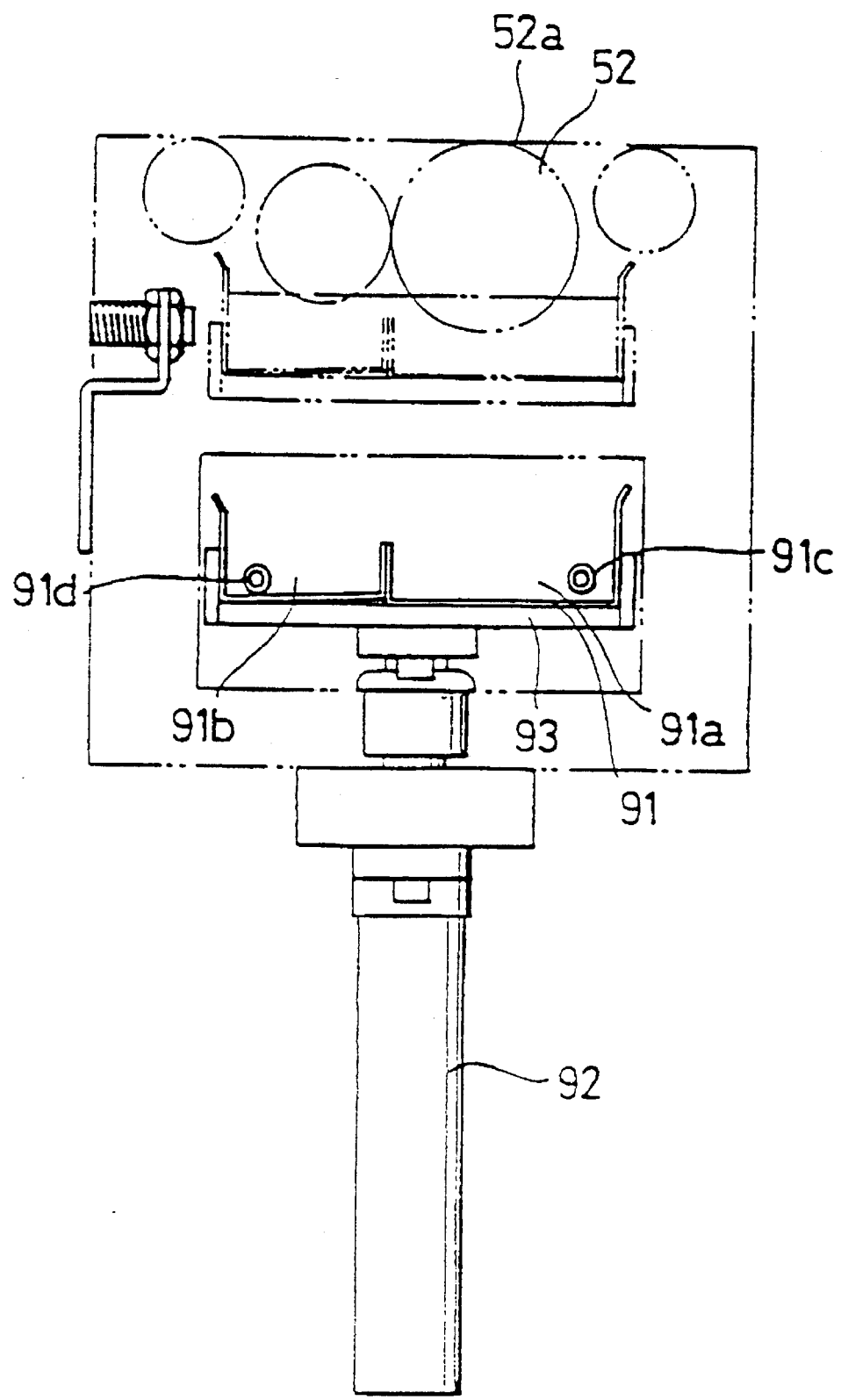
FIG. 44 is a sectional front elevation of the composition supply tank of the film-forming apparatus illustrated in FIG. 8.
Figure 45:
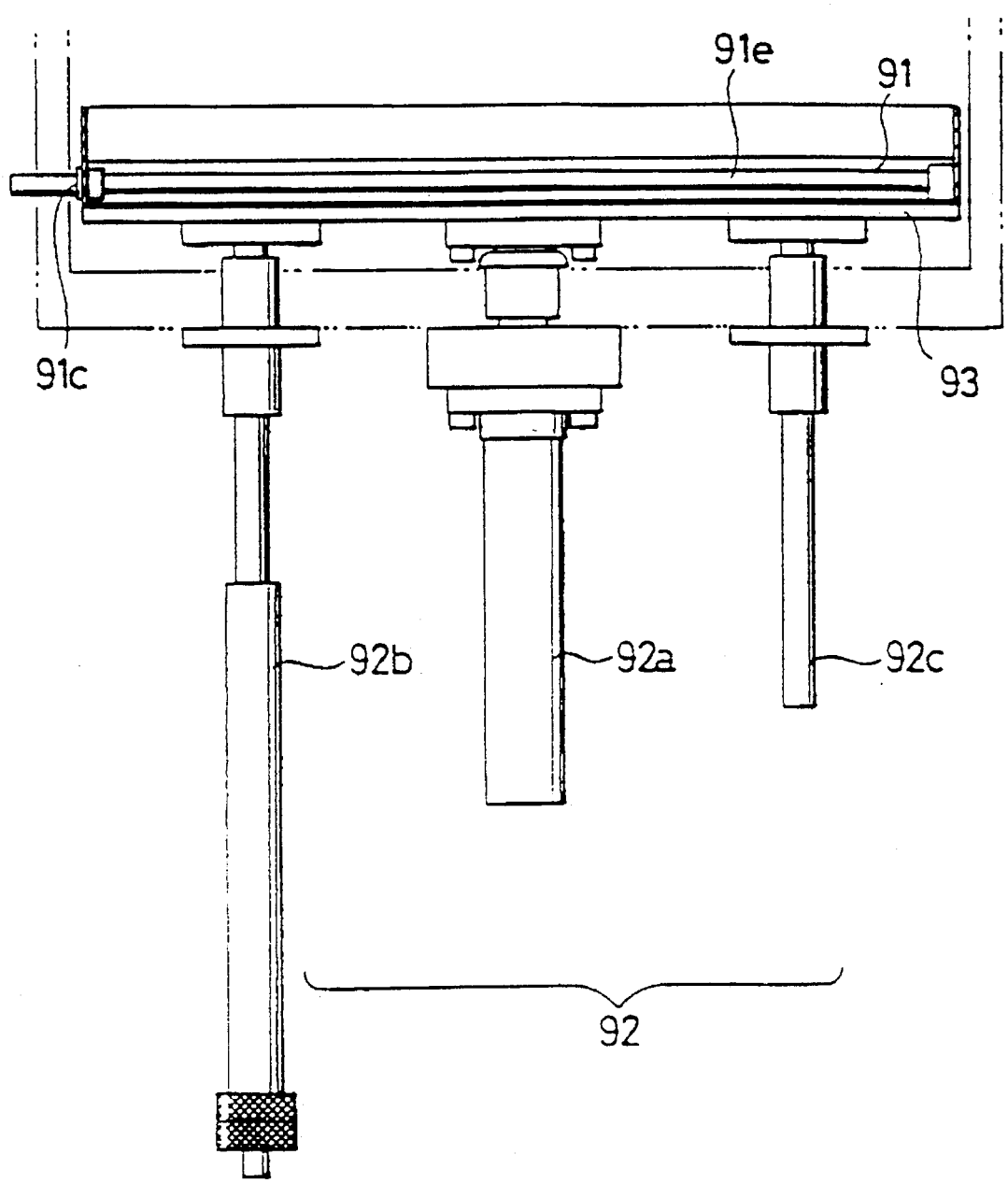
FIG. 45 is a sectional side elevation of the composition supply tank illustrated in FIG. 44.
Figure 46:
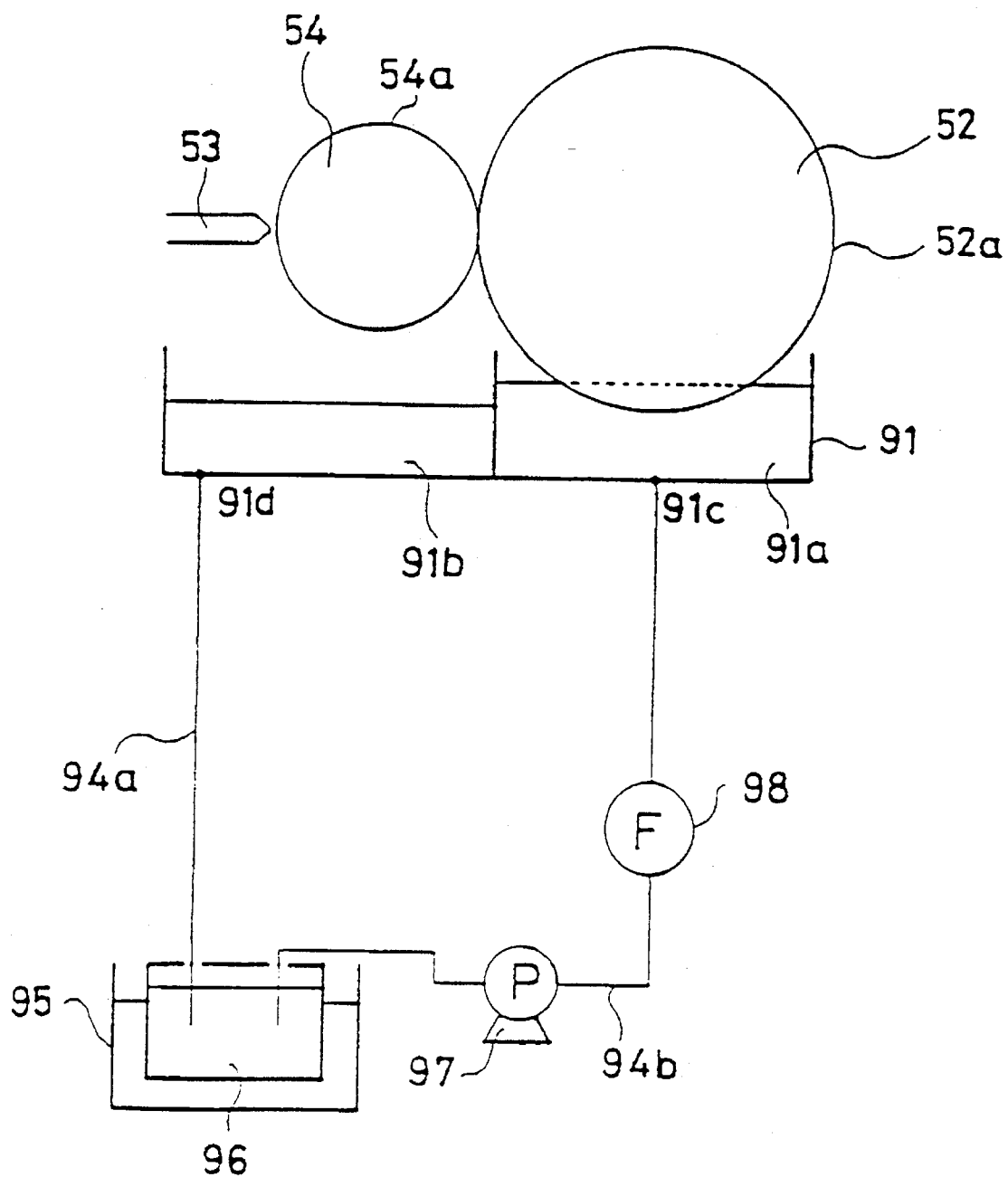
FIG. 46 is an outline constitutional diagram of the piping disposed in the film-forming apparatus illustrated in FIG. 18.

FIG. 44 is a sectional front elevation of the composition storage tank, FIG. 45 is a sectional side elevation, and FIG. 46 is an outline diagram of the pipes.

In these diagrams, the composition storage tank 91 is employed as a rectangular vessel which is disposed upon the tank holder 93 and whose lower surface is connected to the lifting mechanism 92, and such composition storage tank is divided into composition supply member 91a (first storage member) in which the roller surface 52a of the coating composition supply roller 52 is immersed, and to which the coloured resist is supplied, and a composition recovery member 91b (second storage member) which recovers the coloured resist which falls to a position below the doctor roller 54 and the doctor blade 53. In this case, the lifting mechanism D2 provides a cylinder mechanism 92a which is affixed to the base lib, and guide shafts 92b and 92c. Moreover, a supply aperture 91c is formed in the composition supply member 91a, while a composition discharge aperture 91d is formed in the composition recovery member 91b. Moreover, a pipe-shaped nozzle 91e which is connected to the supply aperture 91c is disposed within the composition supply member 91a, and a jet which is formed in the side surface of such nozzle 91e replenishes coloured resist to all positions of the composition supply member 91a, and such jet is intended by such replenishment to homogenise the components of the coloured resist within the composition supply member 91a and to restrict surges of the coloured resist. The pipe path 94a which is connected to the composition discharge aperture 91d is connected to the composition storage tank 98 which is disposed within the cooling tank 95 in order to prevent unnecessary evaporation of those solvent components, and the pipe path 94b extends from such composition storage tank 96 and passes through a high pressure composition transmission means such as a bellows pump 97 (pressure transmission means) to reach the supply aperture 91c. Moreover a filter 98 is inserted in the pipe path 94b between the bellows pump 97 and the supply aperture 91c in order to remove from the coloured resist any impurities such as solid portions of coloured resist that were formed when such coloured resist was employed previously, and such filter 98 enables the reuse of the coloured resist.

The coloured resist that is employed in this embodiment is stored at a storage temperature of approximately 5° C., and in order that such resist may be employed directly from the stored state, the temperature of the cooling tank 95 is set at 5° C. This also prevents the evaporation of the solvent component during use and provides a stable film formation.

Film Formation Action

Figure 47:
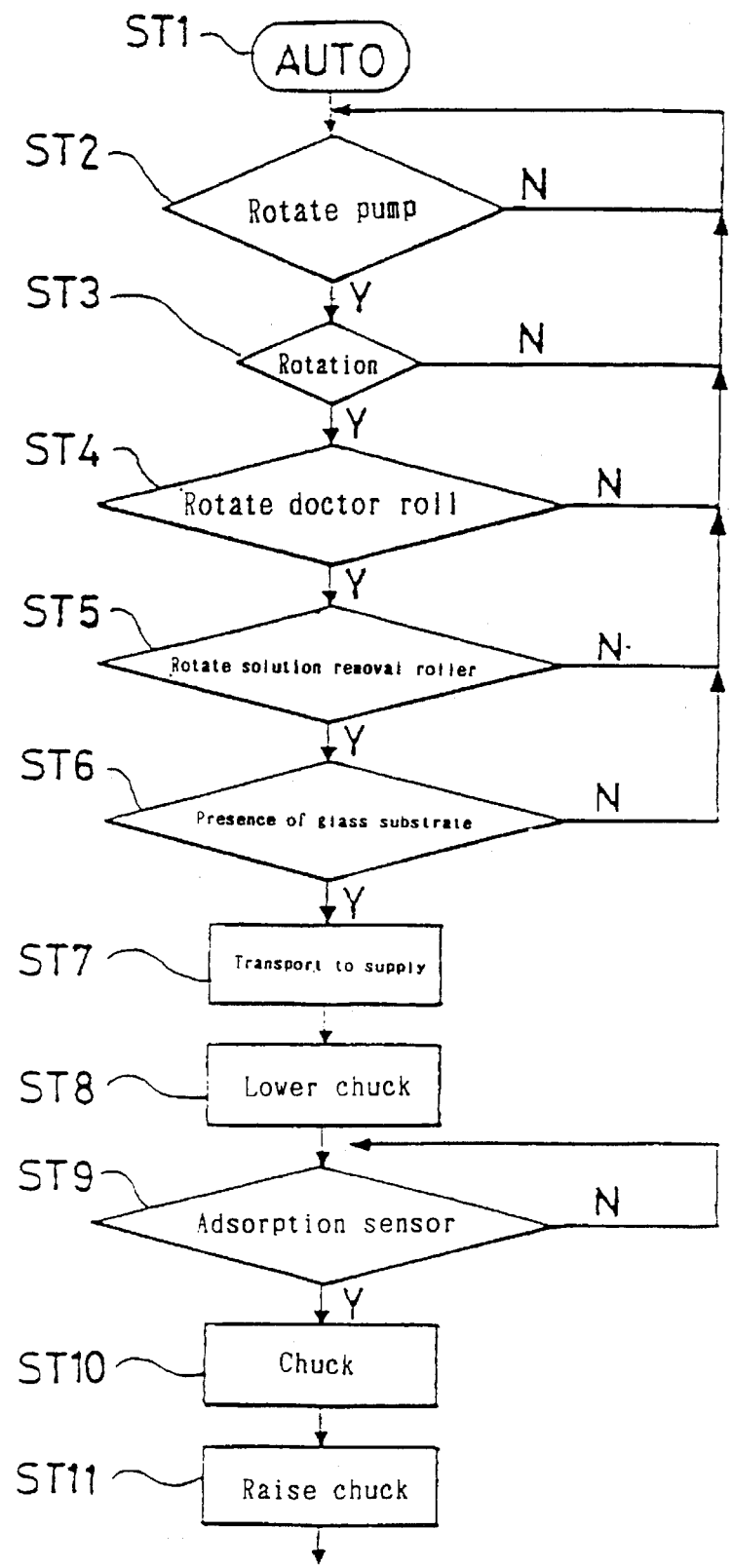
FIG. 47 is a portion of a flow chart which illustrates the film formation action of the film-forming apparatus illustrated in FIG. 18.
Figure 48:
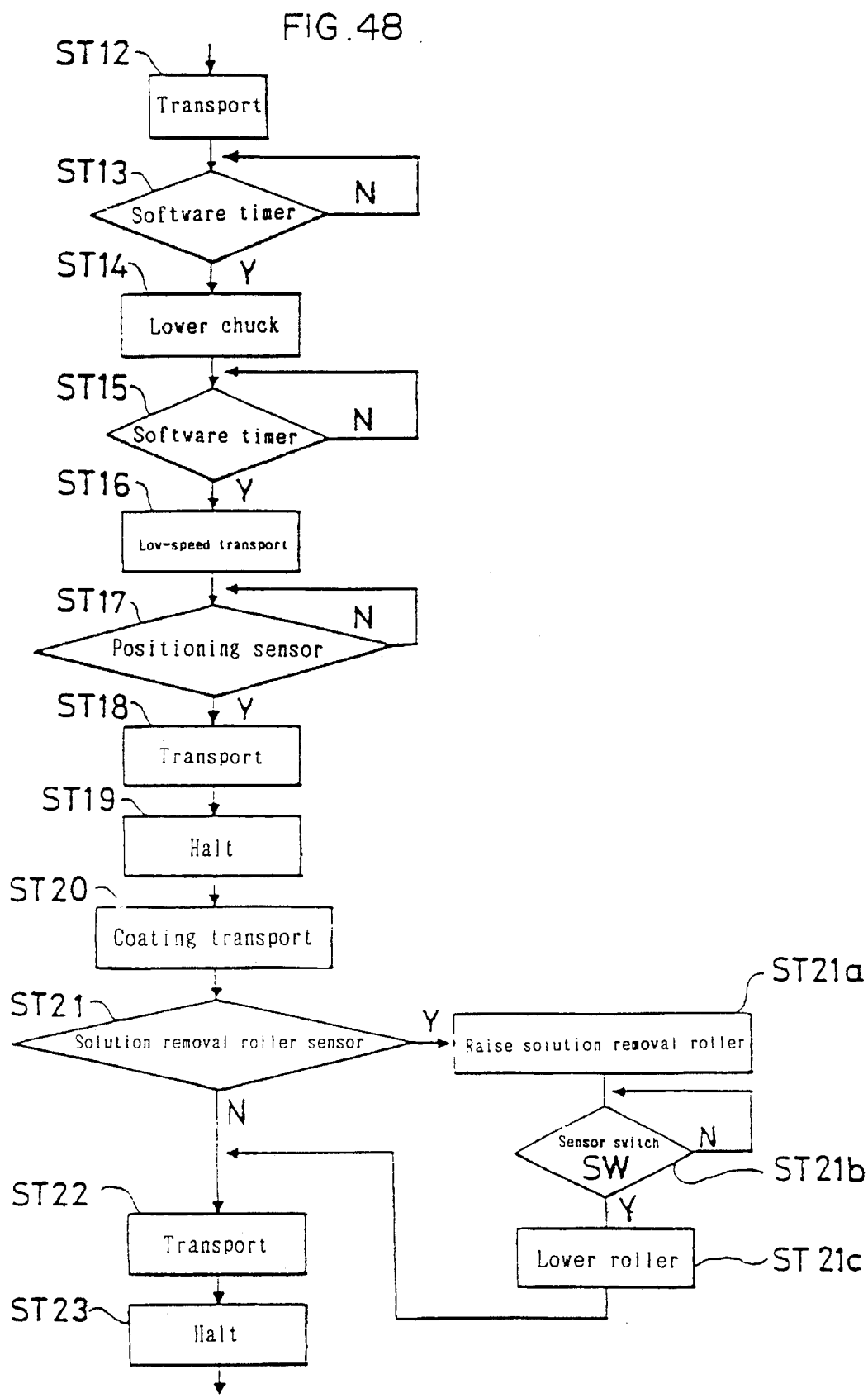
FIG. 48 is a portion of a flow chart which illustrates the film formation action of the film-forming apparatus illustrated in FIG. 18.
Figure 49:
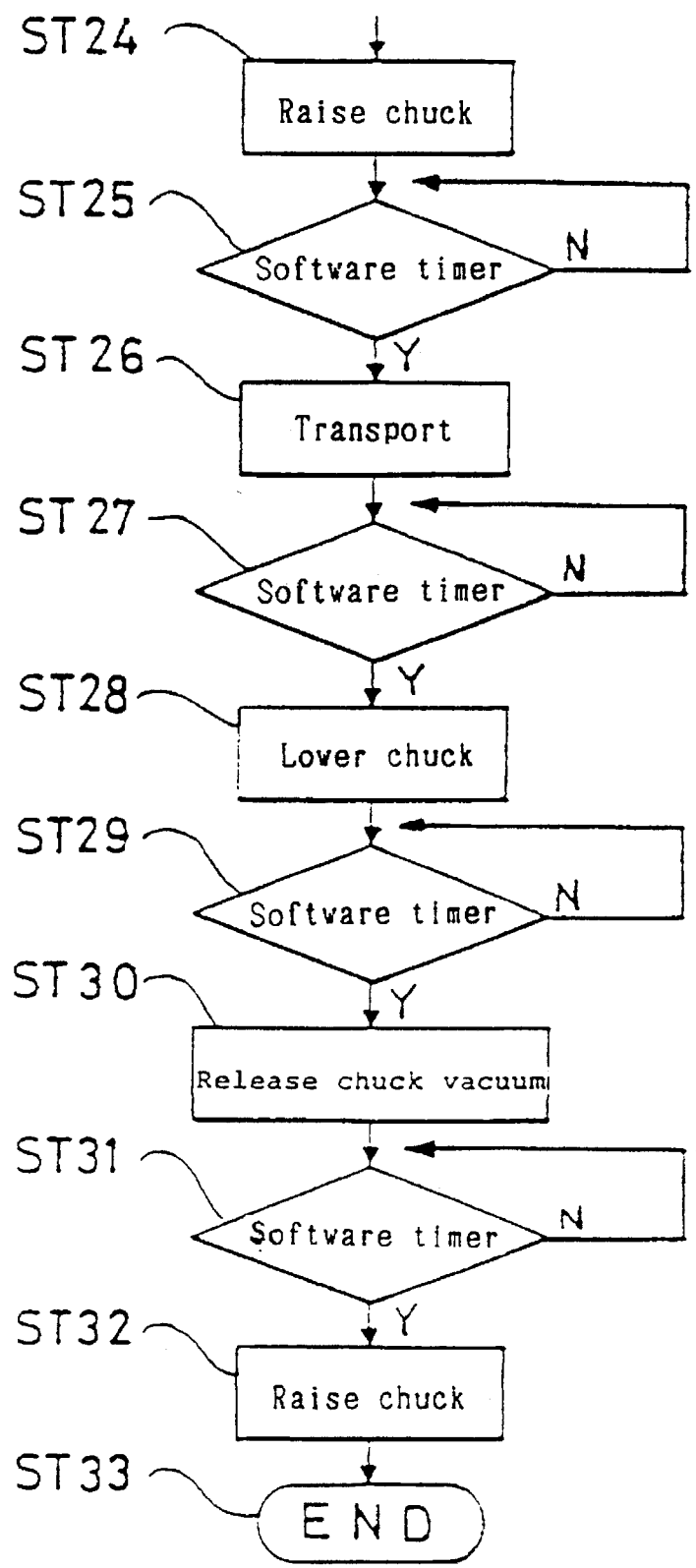
FIG. 49 is a portion of a flow chart which illustrates the film formation action of the film-forming apparatus illustrated in FIG. 18.

The film formation action of the film-forming apparatus 11 having the constitution described in the foregoing is described by reference to the flowcharts illustrated in FIG. 47 to FIG. 49, and the process cross-sections shown in FIG. 50A to FIG. 50E.

Each step of the transport action of the glass substrate 21 in the film forming apparatus 11 may be processed either manually or automatically, but the following description is of the automatic process. The composition storage tank 91 is already set in the upper position through the lifting mechanism 92, and the roller surface 52a of the coating composition supply roller 52 is immersed in the coloured resist in the composition storage member 91a.

Figure 50A:
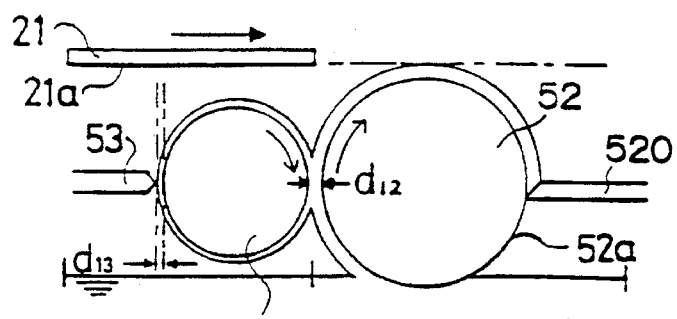
FIG. 50A to FIG. 50E are progressive cross-sectional diagrams which illustrate the film formation action of the film-forming apparatus illustrated in FIG. 18.

First, when the processing mode is set to automatic at step ST1, the drive motors of the roller pump 97, the coating composition supply roller 52, the doctor roller 54, and the composition removal roller 73 begin rotary action (step ST2 to step ST5). In this manner, the coloured resist is lifted up by the roller surface 52a of the coating composition supply roller 52 as illustrated in FIG. 50A, whereupon the coloured resist is drawn down by the doctor roller 54, and an amount only of coloured resist equivalent to the separation distance $d_{12}$ between the roller surface 52a of the coating composition supply roller 52 and the doctor roller 54 is supplied upwards. The coloured resist which adheres to the doctor roller 54 is drawn down by the doctor blade 53, and an amount only of coloured resist equivalent to the separation distance $d_{13}$ between the doctor roller 54 and the doctor blade 53 is supplied upwards, such that a layer of coloured resist of a specified thickness is formed on the circumference of the roller surface 52a of the coating composition supply roller 52.

Moreover, as the blade 520 which is upstream of the composition storage tank 91 draw down the coloured resist which adheres to the roller surface 52a of the coating composition supply roller 52 the state 52a2 (FIG. 86) of the roller surface before immersion in the composition storage tank 91 is kept uniform, in such a manner that such action improves the uniformity of the layer of coloured resist that is formed upon the roller surface 52a1 (FIG. 36) which lifts up the coloured resist.

Next, at step ST6, the apparatus confirms that there is no glass substrate 21 at the work discharge member 71, and then activates the transport member drive motor 82g (FIGS. 19 and 20), moves laterally the sliders 83a, 83b and 83, and moves the chuck plate 86 to a position directly above work supply stage 31, and then the air cylinder mechanism 84b is activated and the chuck plate 86 is lowered (steps ST7 and ST8). In this embodiment, the adsorption sensor detects the relative positions of the chuck plate 86 and the glass substrate 21 (step ST9), and when it has been confirmed that the adsorption surface 86a (FIG. 22) of the chuck plate 86 is in contact with the glass substrate 21, vacuum suction is created within the chuck plate 86, and once a vacuum chuck has been formed upon the adsorption surface 86a which affects the glass substrate 21 such that the glass substrate 21 is held in place, the chuck plate 86 is moved upwards (step ST10 and step ST11), Next, in step ST12, the chuck plate 86 is transported horizontally to the upstream work guide member 41, at which position the chuck plate 86 is held until the vibration is moderated based on the software timer, whereupon the chuck plate 86 is lowered (step ST13 and step ST14). The glass substrate 21 is positioned by bouncing its ends upon the roller surfaces 42a (FIG. 27) of the guide roller 42 (transport reference plane 13). The glass substrate is halted in this state until the vibration has ceased in step ST15, whereupon with the chuck plate 86 with the glass substrate 21 positioned upon the roller surfaces 42a of the guide rollers 42, the glass substrate 21 is transported laterally at low speed towards the coating member 51 (step ST16). In step ST17, once the positioning sensor has confirmed that the glass substrate 21 has been transported to the specified position, the glass substrate 21 is moved over a distance sufficient to bring it to a position at which its leading end is directly above the coating composition supply roller 52, whereupon the glass substrate 21 is halted for a specified period (step ST19).

Figure 50B:
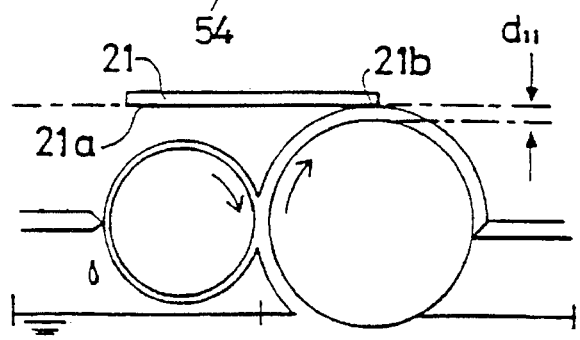
Figure 50C:
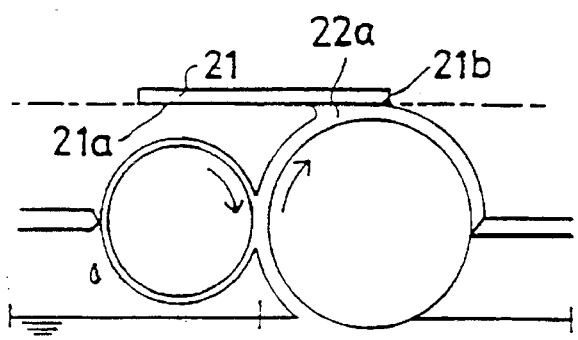

In this embodiment, as illustrated in FIG. 50B, a coloured resist layer is formed upon the circumference of the roller surface 52a of the coating composition supply roller 52, and the transport reference plane 13 of the glass substrate 21 is placed at a specified separation interval d11 from the roller surface 52a such that the surface of the colored resist layer is in contact with the glass substrate 21. Thus, the glass substrate passes over the coating composition supply roller 52 without stopping, and because of the delay until the leading extremity 21b of the surface to be coated 21a is completely moistened with the coloured resist, an area across the width of the glass substrate 21 is formed which are not moistened with the coloured resist. Then, in step ST19, the glass substrate 21 is halted for a specified period and the coloured resist crosses the whole of the gap between the glass substrate 21 and the coating composition supply roller 52 through the surface tension of the coloured resist as illustrated in FIG. 50c, such as to enable the formation of a primary coating layer upon the entire area of the leading extremity 21b (primary coating layer formation process).

Figure 50D:
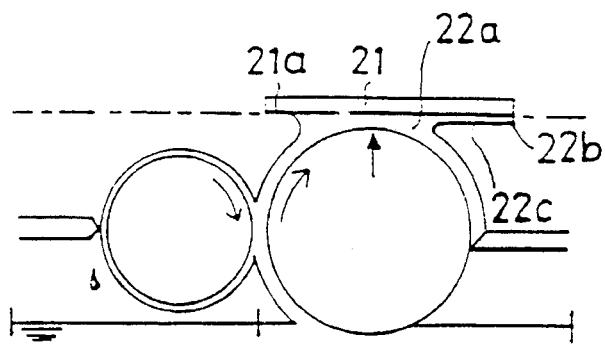
Figure 50E:
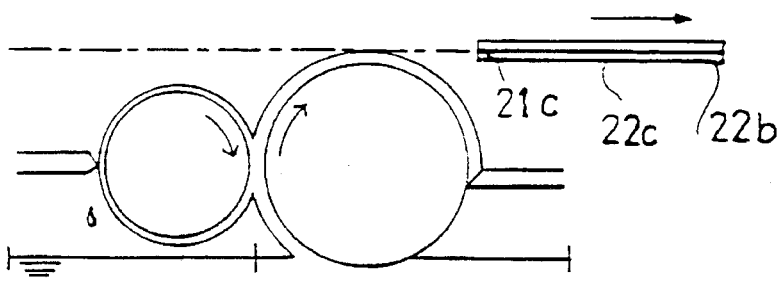

Next, in step ST20, the glass substrate 21 is again transported towards the downstream work guide member 61 and passes over the coating composition supply roller As illustrated in FIG. 50D, at this point the separation distance $d_{11}$ between the transport reference plane 13 and the roller surface 52a is set at a sufficient distance to enable the maintenance of a state in which a layer consisting of a pool of coloured resist 22a is formed between the glass substrate 21 which is being transported and the roller surface 52a, and moreover, the transport velocity of the glass substrate 21 and the amount of composition supplied by the coating composition supply roller 52 are set such that no interruption to the application of the coloured resist occurs. Thus, as distinct from the transfer methods of film formation such as the roller coater method, the layer consisting of a pool of composition 22a is in a nearly uncompressed state, and the layer of coloured resist is extended from the primary coating layer 22b at the leading extremity 21b by means of the surface tension of the layer of coloured resist, and the coating layer 22c is drawn towards the end of the glass substrate 21 Thus once the glass substrate 21 has passed as illustrated in FIG. 50E, the formed layer upon the glass substrate 21 is formed as an extended and developed film rather than as a coated film and a transferred film. Thus in the present embodiment, a pool of composition 22c is sufficiently thick, and the formation position of the shear surface occurs at a position at which the adhesive strength to the roller surface 52a is not sufficient to reach. Thus, the position of the shear surface is not affected by the adhesive strength of the coloured resist to the roller surface 52a, but is determined by the balance between the shear strength, the adhesive strength to the glass substrate 21 and the surface tension of the coloured resist, and because changes in the surface condition of the roller surface 52a do not affect the thickness of the extended and developed film, a stable film formation can be achieved.

Next, in step ST21, when the position detection sensor in the rear end of the downstream work guide member 61 confirms that the glass substrate 21 has been transported, the composition removal roller 73 (FIG. 41) is raised by the cylinder mechanism 72a, and is raised up to the position at which the sensor switch is activated (step ST21a and step ST21b), at which it contacts the rear extremity 21c and the leading extremity 21b of the glass substrate 21. After the excess coloured resist which adheres to the rear extremity 21c and the leading extremity 21b has been removed in this manner, the composition removal roller 73 is lowered (step ST21c). Under normal conditions, no excess coloured resist adheres to the leading extremity 21b, such that the contact between the composition removal roller 73 and the leading extremity 21b may be omitted from such actions.

Next in step ST22 the glass substrate 21 is transferred and is halted while being retained by the roller surface 62a of the downstream guide roller 62 (step ST23). Next, the chuck plate 86 is raised in Step ST24 while the glass substrate 21 is being retained, and when vibration has ceased (step ST25), the chuck plate 86 is transferred to directly above the work discharge member 71 (step ST26), and the chuck plate 86 is held directly above the work discharge member 71 until the vibration has ceased (step ST27). Next, in step ST28, the chuck plate 86 is lowered and held there until the vibration has ceased (step ST29), whereupon in step ST30, the vacuum in the chuck plate 86 is released, and the transfer is made to the discharge mechanism.

Next, in step ST31, it is held in that position until the vibration has ceased, whereupon the chuck plate 86 is raised, and the film formation action is completed. There necessary, a planarizing process which releases facing upwards the coated surface 21b of the glass substrate 21 may be performed for the coating of coloured resist formed in this manner, whereupon the normal processes such as prebaking, measurement of the thickness of the film, exposure to light and development are performed. However, as the roller surface 52a of the coating composition supply roller 52 is smooth in the present film-forming apparatus, variations in thickness are confined to approximately 0.1 μm, and if such value is acceptable, the planarizing process may be omitted. Thus, when the coating roller employed in the roller coater method is employed, the amount of coating composition to be applied is guaranteed by inversion, such that V-shaped irregularities are formed by cutting et cetera and the planarizing process is required, but in the process by the present invention, the planarizing process is performed only if required in order to achieve the desired level of irregularities.

Effects of the Fourth Practical Embodiment of the Invention

Thus, with the film-forming apparatus 11, the surface to be coated 21a of the glass substrate 21 is transported facing downwards, and the film is formed in this state. Hence, dust, fluff and the like that fall from above do not adhere, and it is possible to form a highly reliable film. Moreover, during the formation of the film, the glass substrate 21 and the roller surface 52a are maintained at the fixed separation interval $d_{11}$ and the layer consisting of the pool of composition is formed to form the film, such that excessive force such as by wringing is not applied to the coloured resist, and such that problems of quality change in the material, of residual stress, and of fine bubbles being trapped in the film and the like do not occur. It is very difficult to apply a fixed compression to the glass substrate while it is being transported, and this is a cause of variations in the thickness of the film in the transfer film-forming method; in this embodiment, however, when the film-forming method which employs the film-forming apparatus 11 is employed, there is no need to apply such compression and hence a stable film may be formed.

Moreover, as this is a non-contact method of film-forming in which only the coating composition contacts the surface to be coated and on which the coating is formed, the member to be coated which is subjected to film-forming is not restricted to a flat surface such as the glass substrate 21, but such member may possess an irregular surface. Thus, in such cases when if a further layer of coloured resist is to be formed upon a glass substrate surface, upon which a specified pattern consisting of a layer of coloured resist has been formed such as to form a colour filter upon a surface, or when a further photoresist layer is to be formed upon a semi-conductor surface upon which a wiring layer has already been formed, such that the pressure that the member to be coated applies to the coating composition in the inversion method must inevitably vary due to surface irregularities, while in the film-forming process of the present embodiment, in principle no pressure is employed in the formation of the film, and the coating is extended while in a moistened state such that a uniform film is formed regardless of any irregularities in the surface to be coated, and such as to provide good differential covering. Moreover, the coating surface is not subjected to scratching. Furthermore, as distinct from the spin coater method wherein the coating composition is extended in a single direction by centrifugal force, the present method has no directionality, such as not to form banded patterns on the reverse side of protrusions.

Figure 51A:
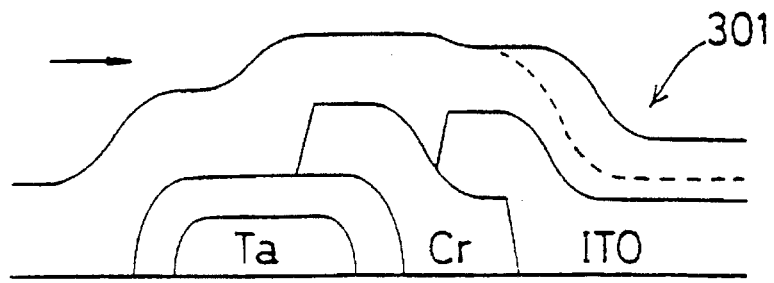
FIG. 51A is a cross-sectional view which illustrates a panel display substrate which is formed by the film-forming apparatus illustrated in FIG. 18.
Figure 51B:
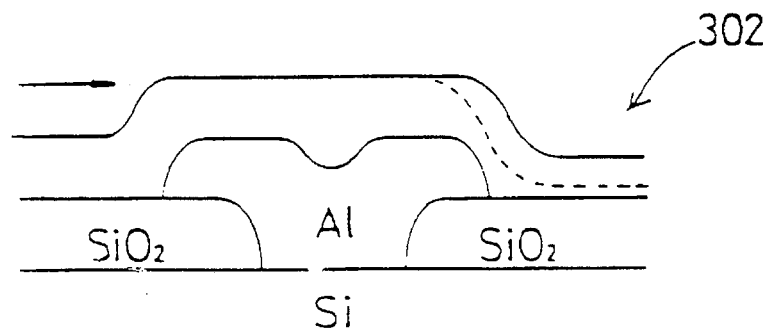
FIG. 51B is a cross-sectional view of a semiconductor apparatus which is formed by the film-forming apparatus illustrated in FIG. 18.
Figure 51C:
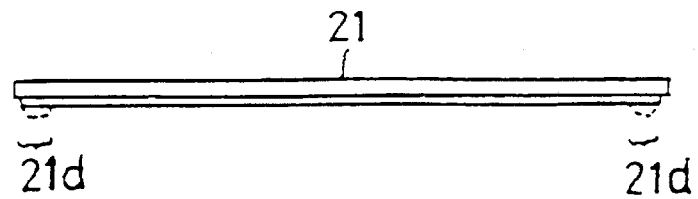
FIG. 51C is a cross-sectional view of a glass substrate which is formed by the film-forming apparatus illustrated in FIG. 18.
Figure 52:
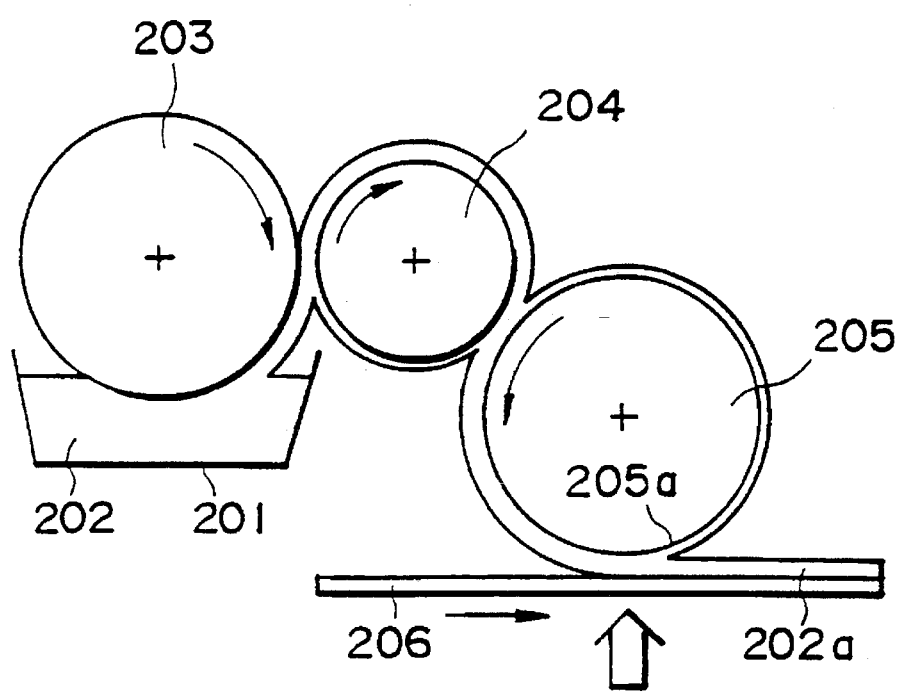
FIG. 52 is an outline constitutional diagram which illustrates a roller coater apparatus of the prior art.

For example, as shown in the cross-section of the MIM-type panel display substrate 301 illustrated in FIG. 51A, and in the cross-section of the semi-conductor apparatus 302 illustrated in FIG. 51B, when the film-forming method envisaged by the present embodiment is employed a uniform overcoat layer (surface protective layer and the like) can be formed, regardless of differing heights or of surface irregularities, and with good differential coverage. On the other hand, when the spin coat method is employed, such method forms the coating directionally in the direction indicated by the arrow, such that an extremely thin layer is formed behind the projections as indicated by the broken lines. Moreover, as can be seen from the cross-section of the leading extremity 21b of the glass substrate 21 illustrated in FIG. 51C a coating of stable thickness can be formed except for the area which corresponds to the guide roller. As a consequence, with the present embodiment, the material may be employed up to the two extremities. However, in reverse methods such as the roll coater method, broad marginal zones 21d are formed as indicated by the broken lines wherein both sides of the coating are thick, and such zones cannot be employed.

The following is a description of an example wherein an actual coating is formed with a dispersed pigment type resist by employing the film-forming apparatus 11 as described in the foregoing.

Figure 53:
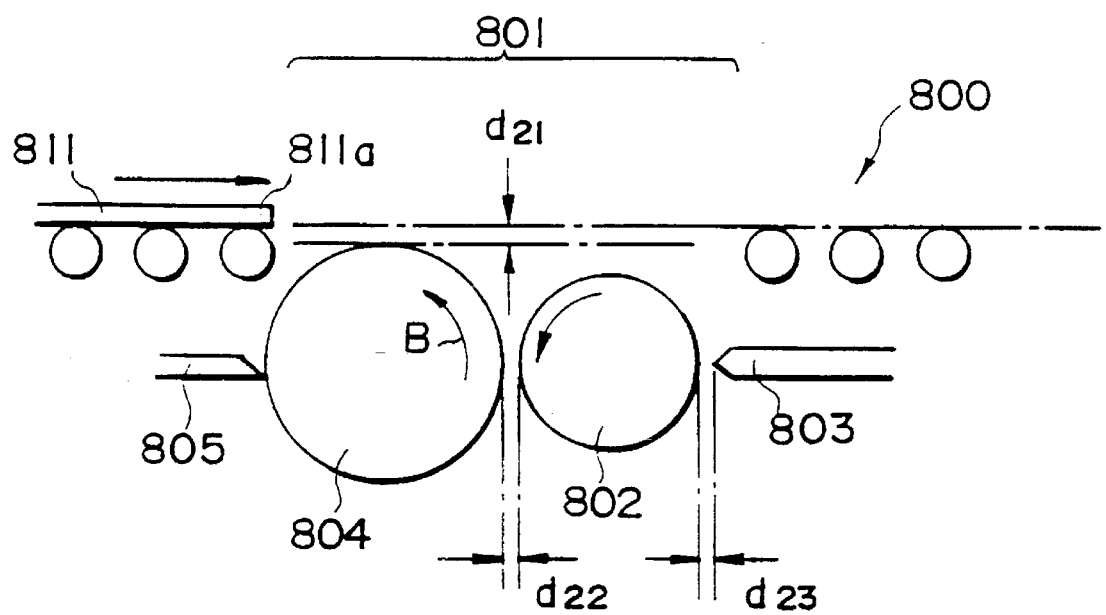
FIG. 53 is an outline constitutional diagram which illustrates the coating member of a variant form of the film-forming apparatus of the fourth embodiment of the present invention.

The velocity of advance of the glass substrate 21 is set at 13.8 mm, the rate of rotation of the doctor roller 54 is set at 5 mm/second, and the distance between the coating composition supply roller 52 and the doctor blade 54 is set at 150 μm±10 μm. The rate of rotation of the coating composition supply roller 52 may be set according to the thickness of the film that is desired. Corning 7059 glass Nippon Denki Glass OA2 glass and NH Technoglass NA45 glass 1.1 mm thick, 300 mm long and 300 mm wide is employed as the glass substrate 21. Fuji Hanto Colour Mosaic Series pigment, Nippon Gosei Gomu JCR Series pigments and samples from several other manufacturers were employed as the dispersed pigment type resist. It was found that all such types of resist could be coated, and that such coatings were approximately 1.0 μm thick after prebaking. Moreover, the thickness profile of the coating was contained to not more than 10%. Moreover, no vertical striped irregularities in thickness, no lateral irregularities in thickness, and no irregularities in colour such as are produced with the roll coater method of the prior art were observed. Moreover, when the coating was observed as a whole, it was confirmed that the coating tended to be rather thin in a zone of approximately 20 mm from the point at the extremity of the glass substrate at which coating was commenced, but that subsequent to that zone, a coating of a resist layer with a very precise thickness was formed. Variant Form of the Fourth Practical Embodiment In the fourth practical embodiment of the invention as described in the foregoing, the member to be coated is transported in the same direction as the direction of rotation of the coating composition supply roller, which is to say that the coating composition may be supplied towards the direction of transport of the member to be coated, but the member to be coated may also be transported in the opposite direction to the direction of rotation of the coating composition supply roller, such that the coating composition is supplied against the direction of transport of the member to be coated. In such case, either of the following is possible. In the film-forming apparatus 11, the relative method of transfer between the member to be coated and the coating composition supply roller may be varied such that the sequence of the transport mechanism 81 is varied, and once the member to be coated has been transported to the downstream work guide member 61, the member to be coated is transported from the downstream towards the upstream. Alternatively, in the coating member 801, the doctor roller 802 and the doctor blade 803 are disposed in opposition to the coating composition supply roller 804 in the downstream side of the direction of transport of the member to be coated, while the direction of the rotation of the coating composition supply roller may be in the direction indicated by the arrow B, as illustrated in FIG. 53. In such case, the coating composition removal means 805 which is employed to remove the resist from the coating composition supply roller 804 may be disposed upstream of the coating composition supply roller 804. The constitution of the other members of such film-forming apparatus 800 are similar to the members of the film-forming apparatus of the fourth practical embodiment, and hence the drawings and descriptions of such members are omitted.

What I claim is:

1. A colour filter for a liquid crystal display comprising:

an optically transparent supporting member;

a transparent conductive layer formed upon said supporting member; and a colour layer of a specified pattern of red, green and blue picture elements which is formed upon said transparent conductive layer wherein pigments are employed as the colouring agents to constitute said picture elements of said colour layer, said colour layer has a dielectric constant of at least 2.0 under measurement conditions of an alternating current having a voltage of 5 V and a frequency of from 1 kHz to 100 kHz, and each of said red, green and blue picture elements which form said colour layer has a dielectric constant being within a range of ±25% of a mean value of the dielectric constants of said red, green and blue picture elements and said colour layer has a thickness of from 0.4 μm to 1.0 μm.

2. A colour filter for a liquid crystal display as defined in claim 1 wherein the dielectric constant of each of said red, green and blue picture elements is within a range of ±20% of the mean value of the dielectric constants of said red, green and blue picture elements.

3. A colour filter for a liquid crystal display as defined in claim 1 wherein the dielectric constant of each of said red, green and blue picture elements is within a range of 3.5±0.5 under an alternating current of 5 V and a frequency of 1 kHz, and is within a range of 3.0±0.5 under an alternating current of 5 V and a frequency of 100 kHz.

4. A colour filter for a liquid crystal display as defined in claim 1 wherein differences in thickness between the red, green and blue picture elements which form said colour layer are within 0.25 μm.

5. A colour filter for a liquid crystal display as defined in claim 1 wherein said colour layer contains pigment in the range of from 40 percent by weight to 50 percent by weight.

6. A colour filter for a liquid crystal display as defined in claim 1 wherein a partially brominated phthalocyanine green into which bromine atoms have been introduced is employed as the pigment which forms said green picture element.

7. A colour filter for a liquid crystal display as defined in claim 6 wherein from one to thirteen bromine atoms have been introduced into said partially brominated phthalocyanine green pigment.

8. A colour filter for a liquid crystal display as defined in claim 6 wherein a brominated and chlorinate phthalocyanine green into which chlorine atoms have been introduced in addition to bromine atoms is employed as the pigment which forms said green picture element.

9. A colour filter for a liquid crystal display as defined in claim 6 wherein a chlorinated phthalocyanine green into which from 14 to 16 chlorine atoms have been introduced (Pigment Green 7, C.I. 74260) is employed in addition to said partially brominated phthalocyanine green as the pigment which forms said green picture element.

10. A colour filter for a liquid crystal display as defined in claim 6 wherein phthalocyanine green 6Y (Pigment Green 36, C.I. 74265) is employed in addition to said partially brominated phthalocyanine green as the pigment which forms said green picture element.

11. A colour filter for a liquid crystal display as defined in claim 1 wherein a chlorinated phthalocyanine green into which from 14 to 16 chlorine atoms have been introduced (Pigment Green 7, C.I. 74260) and disazo yellow HR (Pigment Yellow 83, C.I. 21108) are employed as the pigment which forms said green picture element.

12. A colour filter for a liquid crystal display as defined in claim 11 wherein 9 chromaticity of said green picture element by the CIE standard chrorimetric system when measured employing a C light source is $0.3 \geq x$ and $y \leq 40$ when a thickness of the green picture element is between 0.8 m and 1.0 μm.

13. A colour filter for a liquid crystal display as defined in claim 6 wherein said red picture element is composed of a mixture of PV red 2B (Pigment Red 208, C.I. 12514) and disazo yellow HR (Pigment Yellow 83, C.I. 21108).

14. A colour filter for a liquid crystal display as defined in claim 6 wherein said blue picture element is composed of a mixture of at least one selected from phthalocyanine blue R (Pigment Blue 15:1, 15:2, C.I. 74160, C.I. 74250), and phthalocyanine blue G (Pigment Blue 15:3, 15:4, C.I. 74160), and dioxazine violet (Pigment Violet 23, C.I. 51319).

15. A colour filter for a liquid crystal display as defined in claim 1 further comprising a black matrix layer formed between said red, green and blue picture elements having an impedance of which a resistance component value is between $1.0 \times 10^2$ (Ω·m) to $1.2 \times 10^6$ (Ω·m) under an alternating current of 5 V and a frequency of from 100 Hz to 100 kHz, and a dielectric constant of 3.0 or more at the aforementioned voltage and range of frequencies.

16. A colour filter for a liquid crystal display as defined in claim 15 wherein said black matrix layer comprises a pigment and carbon as a colouring agent.

17. A colour filter for a liquid crystal display as defined in claim 16 wherein said carbon is contained within a range of between 10 percent by weight to 20 percent by weight of said black matrix layer.

18. A colour filter for a liquid crystal display as defined in claim 15 wherein said black matrix layer varies in thickness from a thicknesses of the red, green and blue picture elements which form said colour layer by at most 0.5 μm.

19. A colour filter for a liquid crystal display as defined in claim 1 further comprising a black matrix layer disposed between the red, green and blue picture elements which form said colour layer, and a layer which forms a portion of said black matrix layer and which protrudes above said colour layer has side surfaces which are tapered off towards a top end.

20. A colour filter for a liquid crystal display as defined in claim 19 wherein said tapered side surfaces are at an angle of between 30° to 89° relative to a surface of said supporting member.

21. A colour filter for a liquid crystal display as defined in claim 20 wherein said tapered side surfaces are at an angle of between 45° to 70° relative to the surface of said supporting member.

22. A method of manufacturing a colour filter for a liquid crystal display, comprising the steps of:

forming a transparent conductive layer having a specified pattern upon a supporting member;

forming a colour layer having specified patterns of red, green and blue picture elements upon said transparent conductive layer, the colour layer having a dielectric constant of at least 2.0 under measurement conditions of an alternating current having a voltage of 5 V and a frequency of from 1 kHz to 100 kHz, each of said red, green and blue picture elements having a dielectric constant within a range of ±25% of a mean value of the dielectric constants of said red, green and blue picture elements; and forming a black matrix layer consisting of specified patterns between said picture elements;

wherein said colour layer and said black matrix layer are patterned by the exposure to light of a resist layer containing pigment, and wherein, in said exposure to light, a gap of from 200 μm to several mm is disposed between a layer to be exposed to light and a photomask.

* * * * *